(12) United States Patent
Wilson

(10) Patent No.: US 10,670,362 B2
(45) Date of Patent: Jun. 2, 2020

(54) SUPPRESSORS AND THEIR METHODS OF MANUFACTURE

(71) Applicant: Bert John Wilson, Tauranga (NZ)

(72) Inventor: Bert John Wilson, Tauranga (NZ)

(73) Assignee: Bert John Wilson, Tauranga (NZ)

( * ) Notice: Subject to any disclaimer, the term of this patent is extended or adjusted under 35 U.S.C. 154(b) by 0 days.

(21) Appl. No.: 15/902,456

(22) Filed: Feb. 22, 2018

(65) Prior Publication Data

US 2018/0328689 A1  Nov. 15, 2018

Related U.S. Application Data

(63) Continuation of application No. 14/745,949, filed on Jun. 22, 2015, now abandoned, which is a
(Continued)

(30) Foreign Application Priority Data

Dec. 21, 2012 (NZ) ........................................ 605144
Oct. 22, 2013 (NZ) ........................................ 616919
(Continued)

(51) Int. Cl.
*F41A 21/30* (2006.01)
*F41A 21/36* (2006.01)
*B23K 35/30* (2006.01)
(Continued)

(52) U.S. Cl.
CPC .......... *F41A 21/30* (2013.01); *B23K 35/0238* (2013.01); *B23K 35/0244* (2013.01);
(Continued)

(58) Field of Classification Search
CPC ........... F41A 21/30; F41A 21/36; B23K 35/30
(Continued)

(56) References Cited

U.S. PATENT DOCUMENTS 4,510,843 A  4/1985 Rabatin
4,893,426 A  1/1990 Bixler
(Continued)

FOREIGN PATENT DOCUMENTS

EP    2325594 A2 * 5/2011 .............. F41A 21/30
WO   2007/069086   6/2007

*Primary Examiner* — Stephen Johnson
(74) *Attorney, Agent, or Firm* — Kramer Amado, P.C.

(57) ABSTRACT

A suppressor having a body and a first connector half coupled to the body, wherein the first connector half includes a first component that includes at least one channel and a first surface; and wherein the body provides a second surface, wherein a gap between the first surface and the second surface defines at least one track; wherein the gun includes a second connector half comprising at least one protrusion, wherein the protrusion and channel have corresponding shapes that allow the protrusion to be inserted through the channel and into alignment with the track, wherein the first component may be rotated with respect to the protrusion and the body to bring the protrusion out of alignment with the channel so that the first and second surfaces clamp the protrusion to thereby secure the first connector half and second connector half with respect to each other.

11 Claims, 97 Drawing Sheets

Related U.S. Application Data continuation-in-part of application No. 14/138,441, filed on Dec. 23, 2013, now Pat. No. 9,102,010.

(30) Foreign Application Priority Data

Jun. 20, 2014 (NZ) .......................................... 626531
Sep. 11, 2014 (NZ) .......................................... 630977

(51) Int. Cl.
*B23K 35/02* (2006.01)
*B23K 35/32* (2006.01)

(52) U.S. Cl.
CPC ...... *B23K 35/0255* (2013.01); *B23K 35/0272* (2013.01); *B23K 35/30* (2013.01); *B23K 35/304* (2013.01); *B23K 35/3033* (2013.01); *B23K 35/3046* (2013.01); *B23K 35/325* (2013.01); *F41A 21/36* (2013.01)

(58) Field of Classification Search
USPC .......................................................... 89/14.4
See application file for complete search history.

(56) References Cited

U.S. PATENT DOCUMENTS

| | | |
|---|---|---|
| 5,433,133 A | 7/1995 | La France |
| 7,891,282 B1 | 2/2011 | DeGroat |
| 7,931,118 B1 * | 4/2011 | Cronhelm ............... F41A 21/30 181/223 |
| 8,091,462 B2 | 1/2012 | Dueck et al. |
| 8,291,805 B1 | 10/2012 | Quilligan |
| 8,499,676 B1 | 8/2013 | Moore et al. |
| 8,714,300 B2 | 5/2014 | Johansen |
| 8,978,818 B2 * | 3/2015 | Proske ................... F41A 21/30 181/223 |
| 9,086,248 B2 * | 7/2015 | Young .................... F41A 21/30 |
| 2007/0227087 A1 * | 10/2007 | Nasr ................... B29C 37/0032 52/314 |
| 2008/0098880 A1 * | 5/2008 | Brugger ................. F41A 21/30 89/14.4 |
| 2012/0180623 A1 | 7/2012 | Graham, II et al. |
| 2014/0237881 A1 | 8/2014 | Mack |

* cited by examiner

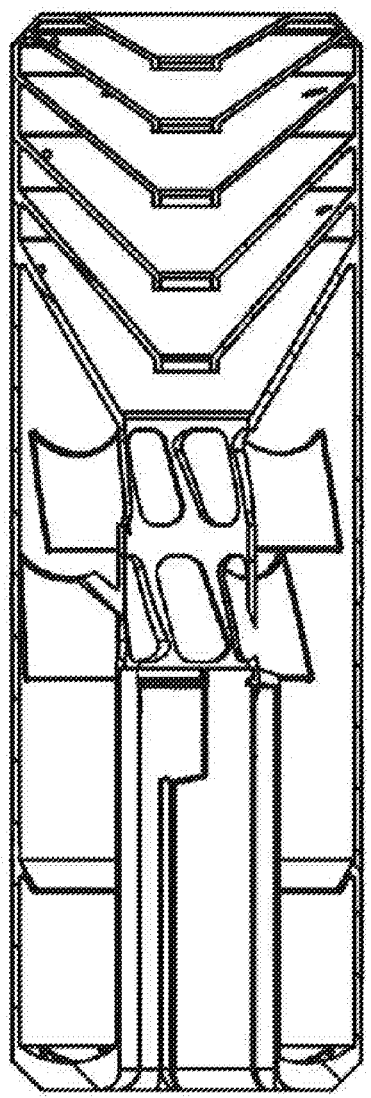
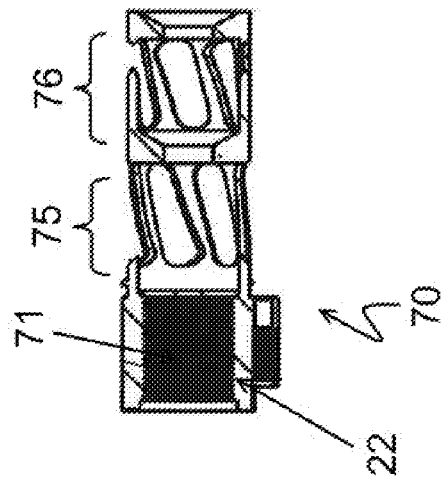
FIGURE 10A

SUPPRESSORS AND THEIR METHODS OF MANUFACTURE

STATEMENT OF CORRESPONDING APPLICATIONS

This application is a Continuation of U.S. application Ser. No. 14/745,949, filed on Jun. 22, 2015, published as United States Patent Publication No. 2016/0161203 (now abandoned); which is a Continuation in Part of U.S. application Ser. No. 14/138,441, filed on Dec. 23, 2013 now issued as U.S. Pat. No. 9,102,010; which claims convention priority to New Zealand Patent Application Nos. 605144, filed on Dec. 21, 2012; and 616919, filed on Oct. 22, 2013. U.S. application Ser. No. 14/745,949 additionally claims convention priority to New Zealand Patent Application Nos. 626531, filed on Jun. 20, 2014; and 630977, filed on Sep. 11, 2014. The entire disclosure of each prior application is incorporated herein by reference.

TECHNICAL FIELD

The present invention relates to improvements to suppressors and their methods of manufacture.

BACKGROUND ART

The weapons called guns use the expansion of a gas to propel a projectile. The gas can take several forms, such as compressed air stored in a canister attached to the gun. Alternatively, fire arms are a sub-type of gun, and use the expansion of a gas created by combustion to propel a projectile.

A combustible material such as gun powder is stored within the projectile cartridge. A firing mechanism in the gun is used to ignite the combustible material. The combustion process creates the gas.

The heat of combustion increases the temperature of the gas, which causes it to expand to an area of lower pressure. The primary exit from the gun is through the open end of the gun barrel. As a result, the gas expands towards the open end of the gun barrel. That expansion is transferred to the projectile, propelling it out from the gun barrel.

The creation and expansion of the gas is a fast process. Accordingly, the projectile exits the gun barrel at high speed.

The generation and expansion of the gas also creates significant noise in the form of a blast wave.

That blast wave is undesirable for a number of reasons. Firstly, the blast wave creates a loud noise, which can damage a person's ears. Repeated exposure to blast waves will result in hearing loss. Secondly, the noise of the blast wave makes the use of guns unpleasant. That may be relevant where people use guns for recreational purposes such as target shooting. Thirdly, the blast wave can create a safety hazard. For instance, police may use guns around volatile gases such as those present in meth labs, or the flash and noise may attract enemy fire.

Devices called suppressors or silencers are used to control the gas expansion and thereby minimise the adverse effects it creates.

One common type of suppressor is a device which is configured to be attached to the end of a gun barrel. These devices include an inlet and an outlet, and a connecting passageway. In-use a projectile fired by the gun passes through the inlet, along the passageway, exiting the suppressor via the outlet.

These suppressors include a series of internal baffles which define chambers within the suppressor. The gas generated during firing of the projectile is able to expand into the chambers. The chambers are arranged such that a first chamber is comparatively larger than the volume of the gun barrel. Accordingly, the first chamber provides a large volume into which the gas may expand. The gas can subsequently expand into adjacent chambers in the suppressor. Together, the chambers facilitate a gradual expansion of the gas. As a result, the expansion of the gas is slower than were the suppressor not used, which minimises the noise created by the blast wave.

There are numerous arrangements for baffle structures and configurations in gun suppressors. Many of these are successful in reducing the noise on firing of a gun. However, no known suppressor yet completely removes all noise created on firing of a gun. As a result, it would be advantageous to have a gun suppressor having a baffle structure which may further reduce the noise created on firing of a gun in comparison to existing suppressors.

In addition, it would be advantageous to have a suppressor having a baffle design which may be more suited for use with certain types of guns and/or which takes into account variations such as caliber size, bullet type, firing mechanism and gas expansion.

There are a number of different techniques known to construct suppressors. The most common technique is deforming sections of a rigid sheet material, and securing these together via welding. Alternatively components can be formed by machining of materials to form components that are then connected together by welding or fastening with threaded connectors. These techniques are often used to form the main (outer body) of the suppressor.

In yet another common manufacturing method a main, hollow body is first formed. Baffles are subsequently secured to the body using techniques such as welding, or using spacers and threaded retainers.

Another technique involves forming, casting or machining a mono-core baffle structure. This is subsequently secured within a hollow outer body.

However, all of the known techniques for manufacturing suppressors have disadvantages.

For instance, it is difficult to accurately position and weld baffles inside the main body of the suppressor. Even if a person has sufficient skill to secure the baffles in position then it is a time consuming and costly process.

Often, baffles are incorrectly positioned when assembled. This can lead to problems such as ineffective suppression of noise generated by the blast wave. Even worse, incorrect positioning of baffles can lead to baffle strike, where a projectile contacts the baffle. This is a health and safety issue and can injure the person using the gun as it would cause the projectile to travel in an unintended direction. It will also damage the suppressor and make it unusable.

In addition suppressors made as described above may not be sufficiently durable to withstand the common forces experienced in use. The weight of the various components may also increase the weight of the suppressor, hindering its ease of use.

Newly developed manufacturing techniques provide opportunities for manufacturing of suppressors. For instance, selective metal melting ("SMM"), and laser metal sintering ("LMS") which is a sub-type of SMM, are three dimensional printing technique that can be used to manufacture different types of products, from a metal powder feed material Both of SMM and LMS are additive layer manufacturing processes, that utilise a manufacturing apparatus to convert computer generated (CAD) models into three dimensional products. A metal powder is distributed onto a substrate/support, and a laser is directed onto at least a portion of the layer of powder. The laser heats the powder so as to fuse selected individual particles together to form a portion of the product.

The laser is then disengaged and a wiper is used to deposit another layer of metal powder. The laser is then again used to heat selected powder particles and fuse those together. The process is repeated to substantially create the required product.

LMS techniques have been used to manufacture components of suppressors. For instance, LMS has been used to construct baffles for a suppressor. In that situation, the baffles were secured to a spine. The spine and baffles were subsequently secured within a housing, and the housing was closed by attachment of end walls using techniques like welding. However, those products are limited because the individual components must subsequently be assembled. Therefore, the prior art has not maximised the efficiency of the manufacturing process.

In addition, the outer housing in which the spine/baffle structure was secured was not manufactured using LMS techniques. This indicates that manufacturing both the housing and internal baffles using LMS techniques was a difficult process, and not one which was easily achieved.

It is also possible that the baffles will not provide a complete seal to create appropriate cavities within the housing. As a result, the suppressors manufactured using these methods may not adequately control expansion of gases within the suppressor. As a result, those products are unlikely to function as an effective suppressor.

Furthermore, the creation of a spine involves redundant material. Therefore, the suppressors manufactured using LMS to produce separate components are unduly heavy. As a result they do not provide a completely satisfactory solution to the needs for manufacturing suppressors. Additive layer manufacturing processes, and particularly LMS, have a number of inherent issues which have inhibited their successful use in manufacturing of products such as suppressors.

In developing a method of manufacturing a suppressor, the inventor encountered several problems. For instance, the powdered material deposited must be supported before it is fused. The necessary supporting must be provided by the layer of material which has previously been fused. Insufficient support will likely result in the build failing. These problems are most relevant where a structure is being created that is not parallel to the build direction. This is a significant limitation on the design of products which can be manufactured using LMS technology.

Other problems include the creation of heat stress in the suppressor during melting of the deposited layers. These stresses create problems such as warping of the components of the suppressors, which meant hindered successful creation of a suppressor using LMS technology. This may be due to different components of the suppressor having different thicknesses, which means that the components react differently to the heat applied to fuse the deposited powdered material. This is a particular relevant in manufacturing suppressors, which are looking to maximise cavity volume, have sufficient strength to withstand the force of expanding gases, and minimise the suppressors total volume.

The inventor investigated existing applications in which LMS techniques have been utilised to produce complex products having a substantially closed internal cavity, and internal structures within the cavity, so as to assist in developing a suppressor design using LMS techniques. However, the issues of providing sufficient support for a layer of deposited material prior to fusing still required significant effort and inventive contribution to solve in the particular application of suppressors.

For instance, PCT Publication No. WO 2008/118973 describes how to manufacture a product having an internal baffle or structure. That product must be built from one of the four corners of the housing and having the housing at a 45° angle to the horizontal. That limits the orientation of the components that can be constructed inside the housing. In fact, the manufacturing techniques described in PCT Publication No. WO 2008/118973 would not enable construction of a suppressor having function baffles therein.

Accordingly, in light of the foregoing it would be advantageous to have an improved suppressor, and method of manufacture, which addresses any or all of the foregoing problems.

There are a number of ways that suppressors can be secured to the gun barrel. A first attachment mechanism involves corresponding screw threads on the suppressor and gun barrels. Rotation of the gun and suppressor with respect to each other causes the screw threads to engage so as to secure them together. Generally, one of the gun or barrel will need to go through at least three complete rotations (at least 1080°) to secure or release the two objects. Many gun users find that frustrating or cumbersome.

Furthermore, screw thread fasteners suffer from a number of inherent problems. For instance, insufficient rotation of the screw threads can lead to misalignment of the gun barrel and suppressor. This can to lead to baffle-strike which poses a health and safety risk. Even if baffle-strike does not occur, then misalignment of the suppressor can adversely affect accuracy of use of the gun.

Quick connect or quick attach assemblies are known to releasably secure suppressors to gun barrels. These aim to provide a comparatively quicker connection mechanism which does not require multiple complete rotations of the gun and/or suppressor with respect to each other.

Some common quick connect mechanisms utilise corresponding screw threads on the gun and suppressor. Alternatively, a screw thread may be positioned on a muzzle brake, which itself is releasably attachable to a gun barrel. The screw threads generally have a larger pitch, meaning that fewer rotations are required to secure the two components together.

However, this solution is still susceptible to misalignment and the inherent problems discussed above.

Another type of quick connect system involves a gate or latch slidingly mounted to a suppressor body. The gate includes channels, which receive protrusions on a muzzle brake or gun barrel. However, this system is not particularly robust and can be easily damaged. In addition, the gate is an "external" component, which increases the chance of damage.

Furthermore, many users of suppressors find the action of moving the gate unsatisfactory and prefer to use a rotational movement.

Some quick connect assemblies use bayonet style connectors on a muzzle brake, having spring biased detents. In-use, the detents are in inserted into corresponding channels in the suppressor. Rotation of the suppressor and/or detents with respect to each other causes the detents to be brought out of alignment with the channels. The biasing elements urge the detents to bear against "stops" positioned in the channels. The interaction between the stops and detents provides resistance to rotation of the suppressor and detents with respect to each other, thereby securing the gun and suppressor together.

However, the force to secure the suppressor to the gun barrel is entirely dependent on the spring force. Therefore, these quick connect systems may not be suitable for use in all applications such as large caliber guns. Alternatively, a gun user may simply not like using such an arrangement for personal reasons.

Another form of quick connect has a non-eccentric locking portion immovably attached to a rotatable component. To secure a gun to a suppressor, the rotatable portion is rotated, which brings the non-eccentric locking portion into engagement with a recess or channel provided to a gun barrel. This arrangement provides a clamping force. However, the non-eccentric locking portion will apply unequal forces to the gun barrel e.g. the forces are not equally distributed around the circumference of the gun barrel. This may result in less than satisfactory attachment between the gun and suppressor.

Many quick connect systems are prone to leaking between the suppressor and the gun barrel. This can result in "blow back" of gases from the suppressor towards the gun and user. The blow back can produce noise which decreases the effectiveness of the suppressor and somewhat defeating the point of its use. In addition, the blow back can damage the gun and/or barrel.

As a result, it would be an advantage to have an alternative quick connect assembly for use in securing suppressors to a gun, and which addresses any or all of the foregoing problems.

Alternatively, it would be advantageous to have a quick connect arrangement which reduces the degrees of rotation required to secure a gun and suppressor together or release them from each other.

In addition, it would be advantageous to have a quick connect assembly which secures a gun and suppressor together and which may reduce the occurrence of misalignment or baffle-strike.

Alternatively, it would be an advantage to have a quick connect assembly which reduces or eliminates blow back on firing of a gun and/or damage which may be caused by same.

Alternatively, it is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention, there is provided a method of manufacturing a suppressor having a housing with a cavity, and at least one component within the cavity, wherein the method uses a selective metal melting technique, the method including the steps of:
(a) depositing a feed material onto a substrate;
(b) melting the feed material to form part of the housing;
(c) melting the feed material to form part of the at least one component so that at least a portion of the component is formed integrally to an inner wall of the housing;
(d) repeating steps (a)-(c) so as to substantially form the housing and the at least one component;
(e) determining an angle between an underside of the at least one component and a surface of a wall inside the housing to be at least 10°, and more preferably in the range of 15° to 85°.

According to another aspect of the present invention, there is provided a suppressor manufactured according to the method as substantially described above.

According to another aspect of the present invention, there is provided a suppressor manufactured using a selective metal melting technique, the suppressor including
a housing with a cavity,
at least one component within the cavity, wherein at least a portion of the component is formed integrally to an inner surface of the housing,
and wherein an angle between an underside of the component and a wall inside the housing is at least 10°, and more preferably in the range of 15° to 85°.

The present specification describes a number of inventions relating to the use of additive layer manufacturing techniques such as selective metal melting ("SMM").

In preferred embodiments, the method according to the present invention uses a SMM technique such as laser metal sintering (LMS).

Throughout the present specification references to the term "laser metal sintering" should be understood as meaning a deposition manufacturing technique in which layers of feed material are heated to cause selective fusing between sections of the layers. In LMS the heat necessary to melt the feed material is applied using a laser.

Reference will be made herein to the present inventions with LMS techniques. However, this should not be seen as limiting on the scope of the present invention. Other variants of SMM manufacturing techniques are envisaged as being within the scope of the present invention.

It is also envisaged that the method can use deposition manufacturing techniques other than LMS. For instance, the forming technique may use ion beam melting techniques, or non-metal compounds such as plastics or resin materials.

As SMM and LMS techniques are known to those skilled in the art they will not be described in full herein. Rather, the present invention(s) will now be described with sufficient information for one skilled in the art to comprehend and implement the invention(s) without any inventive contribution and using known wisdom.

In particularly preferred embodiments, the present inventions find application in manufacturing suppressors, and therefore reference will be made herein as such.

In preferred embodiments the suppressor is a device that in-use reduces the noise and/or flash created by operation of a gun. This is as should be known to one skilled in the art.

However, the suppressor could also be used with other devices in which noise created by gas expansion is problematic.

Throughout the present specification reference to the term "angle between a surface inside the housing and the at least component" should be understood as referring to the angle between an imaginary plane and the lowest point of the component. The imaginary plane and the lowest point on the component are both determined with reference to the build direction for the product e.g. from the substrate used in the LMS technique.

In a preferred embodiment, the angle is selected according to the orientation of the baffle.

In a particularly preferred embodiment, the angle is selected from the following relationships:

| Structure | Direction of structure | Example of use | Angle or Radius Size |
| --- | --- | --- | --- |
| Cone | Towards the centerline of the product | Baffle in a suppressor | 15° to 85° |
| Cone | Away from the centerline of the product | Baffle in a suppressor | 45° to 85° for a component having a length of greater than 2 mm; or under 15° for a component having a length less than 2 mm |
| Lead in angle on linear support structure | Not Applicable | Support structures from which a flat surface can be created e.g. for internal compartmentalisation without a lower contiguous start plane | 40° or more |
| Overhead flat shelves | | Beginning of attachment to barrel or any structure parallel to build surface | Must not be larger than 2 mm in area from support |
| Top wall - bulk radius (closes structure) | Toward and away from centerline of product | To create a roof for the suppressor and seal the cavity while reducing use of cavity volume by structure. | 4 mm radius |

Reference through the present specification may be made to different types of components such as a radius, a cone, and a column. These terms describe the shape of the component. The applicant has identified that selection of the correct angle is particularly advantageous to manufacturing components in a cavity, particularly where temporary support structures cannot be subsequently removed from the cavity after manufacture.

The angles are dependent on a number of factors such as the shape of the component to be manufactured, the direction in which the component is being manufactured with respect to the build direction, and/or the length and width (diameter) of the component. In addition, the thickness of the component being manufactured, and the thickness of components on which the layers of material are being deposited (e.g. a relative thickness of two components) may affect angle selection.

However, one skilled in the art would be able to select the necessary angles from those described herein without any inventive contribution or undue experimentation.

The range of angles identified herein enables successful and efficient manufacturing of products which have internal components the shape and configuration of which hinder manufacturing by LMS.

In the particularly preferred embodiment, the feed material may be selected from the list of: titanium or a titanium alloys, pure titanium (TI), TI6A14V, NITI(45-55NI), TI6A17 MB, TI5A12.5FE, TI3NB13ZR, TI12MO6ZR2FE, NITICU alloys, TI15MO, TI35NB7ZR, 5TA, TI3A1 2.5V, or Inconel 718.

However, the foregoing should not be seen as limiting on the scope of the present invention and alternatives for the feed material are envisaged as being within the scope of the present invention. For instance, the starter material may be any fine metal powder such as cobalt and/or chrome alloy powders, or nickel-based alloy powders.

In the preferred embodiments the housing is formed by a first end wall, a second end wall and at least one side wall and the at least one component within a cavity in the housing is a baffle.

However, the foregoing should not be seen as limiting on the scope of the present invention. For instance the present inventions may also be useful where it is desirable to manufacture using SMM techniques any product which has a component in a cavity, and examples of such components are discussed below. This may be particularly beneficial where the housing is shaped so that the component cannot be removed from the cavity.

According to another aspect of the present invention there is provided the use in the manufacture of a suppressor, of selective metal melting, the suppressor including
 a first end wall,
 a second end wall,
 at least one side wall between the first and second end walls, wherein the first and at least one side wall collectively define a cavity,
 at least one baffle within the cavity.

According to another aspect of the present invention there is provided a suppressor, including
 a first end wall,
 a second end wall,
 at least one side wall connecting the first and second end walls,
 wherein the end walls and side wall(s) collectively define a cavity,
 at least one baffle inside the cavity,
 characterised in that
 at least one of the baffles inside the cavity is formed integrally to an inner surface of the side wall(s).

According to another aspect of the present invention there is provided a method of manufacturing a suppressor, wherein the suppressor includes a first end wall, a second end wall, and at least one side wall connecting the first and second end walls, and at least one baffle that is formed integrally to an inner surface of the at least one side wall, wherein the method includes the steps of:
(a) depositing a starter material onto a substrate;
(b) melting the starter material to form part of the suppressor;
(c) repeating steps (a) and (b) so as to substantially form the suppressor.

Throughout the present specification reference to the term "formed integrally" should be understood as meaning that there is no join between any two parts of a suppressor manufactured using the method described herein.

Having two or more components formed integrally to each other may improve the strength and durability of the suppressor.

In addition, having the components formed integrally to each other during manufacture may reduce the need to accurately align numerous components and secure these together using welding or other techniques.

It should be understood that the term "formed integrally" excludes suppressors where components are first shaped or formed, and then subsequently secured to each other by techniques such as welding. In such suppressors there is a mechanical join where the two formerly separate components are attached together. In contrast, the present invention has no such join(s).

This also excludes the prior art attempts to use SMM to manufacture suppressors. In those, components such as baffles were first formed integrally to a separate spine, and then secured in a tube to form the suppressors. They do not have the baffles formed integrally to an inner wall of the housing.

In particularly preferred embodiments, all components of the suppressor are formed integrally to each other. This enables the suppressors to be substantially manufactured without any subsequent assembly, or additional finishing.

However, the foregoing should not be seen as limiting on the scope of the present invention and it is also envisaged that the suppressors may be manufactured in separate components and subsequently secured together.

Throughout the present specification reference to the term "side wall" should be understood as meaning at least one wall of the suppressor which connects the end walls.

In a particularly preferred embodiment, the side wall may be substantially continuous.

Throughout the present specification reference to the term "substantially continuous" refers to the fact that the side wall does not include any apertures therein.

In these embodiments, the side wall is continuous between the first and second end walls.

However, the foregoing should not be seen as limiting on the scope of the present invention. It is also envisaged that the side wall may include vents. These vents are shaped and configured so as to vent gases expanding within the suppressor. In these embodiments, the vents are shaped and configured so as to ensure that the sound of gases being vented from the suppressor is reduced from that emitted without use of the suppressor, and preferably non-audible to humans.

In a preferred embodiment, suppressors according to the present invention include a fastener.

Throughout the present specification reference to the term "fastener" should be understood as meaning a component configured to secure the suppressor to a gun.

Throughout the present specification reference to the term "baffle" should be understood as meaning a wall inside the cavity.

In preferred embodiments, the baffle is substantially cone shaped. Accordingly, the angle at which the baffle is constructed is selected according to the orientation of the baffle, whether being built from inside to outside, and the angles discussed herein.

However, the baffle may also be a flat wall or structure. Therefore the foregoing should not be seen as limiting on the scope of the present invention.

In a preferred embodiment, the present inventions include two or more baffles inside the cavity.

In particularly preferred embodiments, each of the baffles are formed integrally to an inner surface of the side wall.

Each baffle, in combination with the side wall, end wall(s), and/or another baffle define chambers within the cavity.

In preferred embodiments the suppressors according to the present invention include an inlet and an outlet.

Throughout the present specification reference to the term "inlet" should be understood as meaning an opening in the suppressor through which a bullet may enter the suppressor.

Throughout the present specification reference to the term "outlet" should be understood as meaning an opening in the second end wall through which a bullet may exit the chamber.

In preferred embodiments the inlet and outlet are aligned with each other such that a bullet can pass through the inlet, travel through the pathway, and exit from the cavity via the outlet.

Throughout the present specification reference to the term "pathway" should be understood as meaning a path through which a bullet may travel between the inlet and the outlet.

Therefore, in embodiments where the suppressor includes two or more baffles then each of the baffles includes an aperture. The apertures are each aligned with each other, the inlet and the outlet.

In a particularly preferred embodiment the pathway lies substantially along a longitudinal axis of the suppressor that is on the centre line of the suppressor.

However, the foregoing should not be seen as limiting on the scope of the present invention. It is also envisaged that the pathway may be off-centre from the central longitudinal axis of the body in order to allow a lower profile for the gun and suppressor in use. Furthermore, this may minimize the suppressor hindering a user's line of sight.

In an alternate embodiment the suppressors according to the present invention are asymmetrical.

Throughout the present specification reference to the term "asymmetrical" should be understood as meaning that the suppressor is not symmetrical about an imaginary plane extending along its longitudinal axis and that is substantially horizontal in the suppressor's normal in use orientation.

Having an asymmetrical suppressor enables the components of the suppressor to be provided substantially in line with or below the gun barrel when the suppressor is in use. As a result, this may minimise the amount of the suppressor which is in a user's line of sight. However, the suppressor still has sufficient baffles and chamber volume to suppress noise produced by the gun to a desired level.

In a preferred embodiment, suppressors according to the present invention include a grip. Throughout the present specification reference to the term "grip" should be understood as meaning a component configured to facilitate attaching the suppressor to a gun.

In a particularly preferred embodiment the grip is at least one or more ridges on an outer surface of the body of the suppressor. In-use the ridges facilitate a person gripping the body so as to rotate the suppressor to thereby connect or release the suppressor from the gun.

The ridges facilitate a person rotating the suppressor sufficiently that it is tightly secured to the gun. In addition, the ridges facilitate the person rotating the suppressor so as to disengage the gun. That may be useful where a suppressor has been tightly secured to a gun.

However, it is also envisaged that the grip may take other forms such as a handle extending away from the body of the suppressor. As a result, the foregoing should not be seen as limiting on the scope of the present invention.

In a particularly preferred embodiment, the fastener may be a fastener half forming part of a quick connect. The term "quick connect" is a term of the art, referring to an assembly to attach two objects together that does not require multiple rotations of more than a nominal angle to secure the objects together. In contrast, a standard screw thread fastener for use in a suppressor generally requires about 15-18 full turns (15 to 18×360°) to achieve a secure attachment.

In these embodiments, a fastener half of the quick connect is located within the overlap channel of the fastener (as is discussed below) e.g. the fastener half is within the length of the suppressor. However, the fastener half could also protrude beyond the end of the suppressor.

Other embodiments for the fastener are also envisaged. For instance, the fastener may be a screw thread complementary to a corresponding screw thread on a gun barrel or a fitting secured on a gun barrel.

In these embodiments, the screw thread has a pitch and length corresponding to a screw thread on the barrel of a gun with which the suppressor is used. The aspects of the screw thread are as should be understood by one skilled in the art.

The foregoing should not be seen as limiting on the scope of the present invention. It is also envisaged that the fastener can take other forms including twist lock type connectors, spring biased detents, or fastening assemblies having fittings configured to be secured over the end of a gun barrel.

In a preferred embodiment, the present invention includes a muzzle brake.

Throughout the present specification reference to the term "muzzle brake" should be understood as meaning a component attached or formed integrally to a gun barrel and which assists in controlling expansion of gases generated during firing of the gun to thereby reduce recoil. The term "muzzle brake" is as should be understood by one skilled in the art.

In a particularly preferred embodiment, the muzzle brake is a separate component configured to be secured to an end of a gun with which the present invention is utilised.

In a particularly preferred embodiment, the muzzle brake includes a fastener half that is configured to engage with a complementary fastener half on the suppressor. The fasteners halves together form a quick connect as discussed herein.

The inventor has identified that use of a muzzle brake is particularly advantageous in providing further control of gas expansion within the suppressors according to the present invention. The present inventions facilitate provision of a muzzle brake using LMS techniques.

However, the foregoing should not be seen as limiting on the scope of the present invention. It is also envisaged that the suppressor may not include a muzzle brake, or that the muzzle brake may be formed integrally into the barrel of a gun.

Furthermore, utilising LMS manufacturing techniques it is possible to provide a muzzle brake in combination with a fastener half of a quick connect. Previously, it has not been possible to utilise the combination of a muzzle brake and quick connect in combination for reflex style suppressors. Using prior art techniques, it was impossible to provide the muzzle brake within reflex type suppressors. Therefore the muzzle brake would extend from the end of the suppressor and would lengthen the suppressor which creates different problems.

In preferred embodiments, the present invention may include an overlap channel.

Throughout the present specification reference to the term "overlap channel" should be understood as meaning a channel configured to receive and overlap part of a gun barrel.

Use of an overlap channel enables provision of chambers within the suppressor which, when the suppressors are secured to a gun, are positioned so as to overlap a portion of the length of the gun barrel. Suppressors having these channels are often called "reflex-style" suppressors. The overlap channel is useful to reduce the overall length of a gun and suppressor secured together. That in turn is useful to reduce the instances of baffle strike by providing a longer concentric mating surface to reduce potential misalignment of the gun and suppressor.

Preventing misalignment of the gun barrel and suppressor also helps to reduce the force which the suppressor experiences in use, thereby reducing wear and tear or damage to the suppressor.

Furthermore, the use of an overlap channel ensures that the centre of gravity of a gun with a suppressor secured thereto is closer to the gun handle. As a result, the turning moment of the weight is reduced, making the gun and suppressor combination easier to use.

In a preferred embodiment, the suppressor includes a double wall structure.

Throughout the present specification reference to the term "double wall structure" should be understood as referring to at least an inner and an outer wall.

The outer wall provides the aesthetic appearance and structural support for the suppressor. The inner wall is a pressure vessel which defines chambers within which a gas can expand the outer wall defines at least one cavity (gap) between itself and the inner wall.

The double layer wall arrangement provides insulation to prevent heat transfer from the chambers in which a gas expands to the outer surface of the suppressor. Therefore, a user is less likely to burn their hand on touching the suppressor after use. In addition, the double layer wall helps to eliminate mirage in optics from heat generated by use of the suppressor. Accordingly, the utilisation of a double layer wall assists in providing a suppressor having improved safety characteristics.

According to another aspect of the present invention, there is provided a system to reduce the noise created on firing a gun, the system comprising a suppressor having a body and a first connector half coupled to the body, wherein the first connector half comprises a first component that includes at least one channel and a first surface; and wherein the body provides a second surface, and wherein a gap between the first surface and the second surface defines at least one track;

wherein the gun includes a second connector half comprising at least one protrusion, wherein the protrusion and channel have corresponding shapes that allow the protrusion to be inserted through the channel and into alignment with the track, and wherein the first component may be rotated with respect to the protrusion and the body so as to bring the protrusion out of alignment with the channel so that the first and second surfaces clamp the protrusion to thereby secure the first connector half and second connector half with respect to each other.

According to another aspect of the present invention there is provided a gun, wherein the gun includes at least one protrusion, wherein the at least one protrusion has a shape corresponding to a channel in a suppressor that allows the protrusion to be inserted through the channel and thereby be brought into alignment with a track defined by a first surface and a second surface.

According to another aspect of the invention there is provided a suppressor, having a body and a first connector half coupled to the body, wherein the first connector half comprises a first component that includes at least one channel and a first surface; and wherein the body provides a second surface, and wherein a gap between the first surface and the second surface defines at least one track;

wherein in use a protrusion on a gun can be inserted through the channel and into alignment with the track, and wherein the first component may be rotated with respect to the protrusion and the body to bring the protrusion out of alignment with the channel so that the first and second surfaces clamp the protrusion to thereby secure the first connector half and second connector half with respect to each other.

According to another aspect of the invention there is provided a muzzle brake for use in forming a system to reduce noise created on firing of a gun, the muzzle brake including a body a fastener configured to secure the muzzle brake to a gun barrel, wherein the at least one protrusion has a shape corresponding to a channel in a suppressor that allows the protrusion to be inserted through the channel and thereby be brought into alignment with a track defined by a first surface and a second surface of the suppressor.

According to another aspect of the invention there is provided a suppressor, including a body formed from at least one side wall, a first end wall, and a second end wall, wherein the first and second end walls have aligned apertures;

at least one baffle within the body, wherein the baffle includes an aperture that lays along a path between the aperture in the first end wall and the aperture in the second end wall, and wherein the aperture lays on a plane that is not perpendicular to the pathway between the first aperture and the second aperture.

According to another aspect of the invention, there is provided a system to reduce the noise created on firing a gun, the system comprising a suppressor, and a connection system to releasably secure the suppressor to the gun, wherein the connection system comprises
a connector half that is rotatable,
at least one track, and
at least one protrusion, wherein the connector half can be rotated with respect to the gun barrel and the suppressor to insert the protrusion into the track to secure the suppressor to the gun.

According to another aspect of the invention, there is provided a suppressor for use in forming the system as described herein.

According to another aspect of the invention, there is provided an intermediate component for use in forming a system as described herein, the intermediate component being configured to be connected to a gun and to be engaged by a suppressor.

According to another embodiment of the invention, there is provided an intermediate component for use in forming a system as described herein, wherein the intermediate component is a flash hider and/or a muzzle brake.

Reference herein to the term "connector half" should be understood as meaning a component that can engage or otherwise interact with another component, to facilitate forming of a system as described herein.

In embodiments, a connector half may take various forms or include different features. Accordingly, discussion herein should not be seen as limiting. Different terms may be used herein to refer to a connector half, such as for instance "first component" or "second component" etc.

Reference may be made to locked position and release locked position. These terms should be understood as being respectively a position or configuration for a connector half/halves in which they do or do not secure a suppressor to a gun respectively. In other words, the locked position is a configuration for a connector half in which it engages another connection half or other component of a connection system, to secure a suppressor to a gun. The converse is true for the release position.

Reference may be made to a quick connect, this should be understood as meaning an assembly of components and/or system to facilitate comparatively quick connection of a suppressor to a gun. For instance, the quick connects may reduce the degrees through which a component must be rotated to be secured to (and/or release from) a gun.

BRIEF DESCRIPTION OF THE DRAWINGS

Further aspects of the present invention will become apparent from the ensuing description which is given by way of example only and with reference to the accompanying drawings in which:

FIG. 10A is a side view showing a muzzle brake adjacent to a suppressor with which it is used;

FIG. 106 is a view through section H-H shown in FIG. 104;

FIG. 107 is a view through section J-J shown in FIG. 105;

FIG. 108 is an exploded parts diagram of the connection system of FIGS. 100 to 107;

FIG. 109 is a perspective view of a latching arm forming part of a connection system of FIGS. 100 to 108;

FIG. 110 is a side view of the latching arm of FIG. 109.

DETAILED DISCUSSION OF THE FIGURES

Throughout the Figures like numerals refer to like components.

Figure 1:
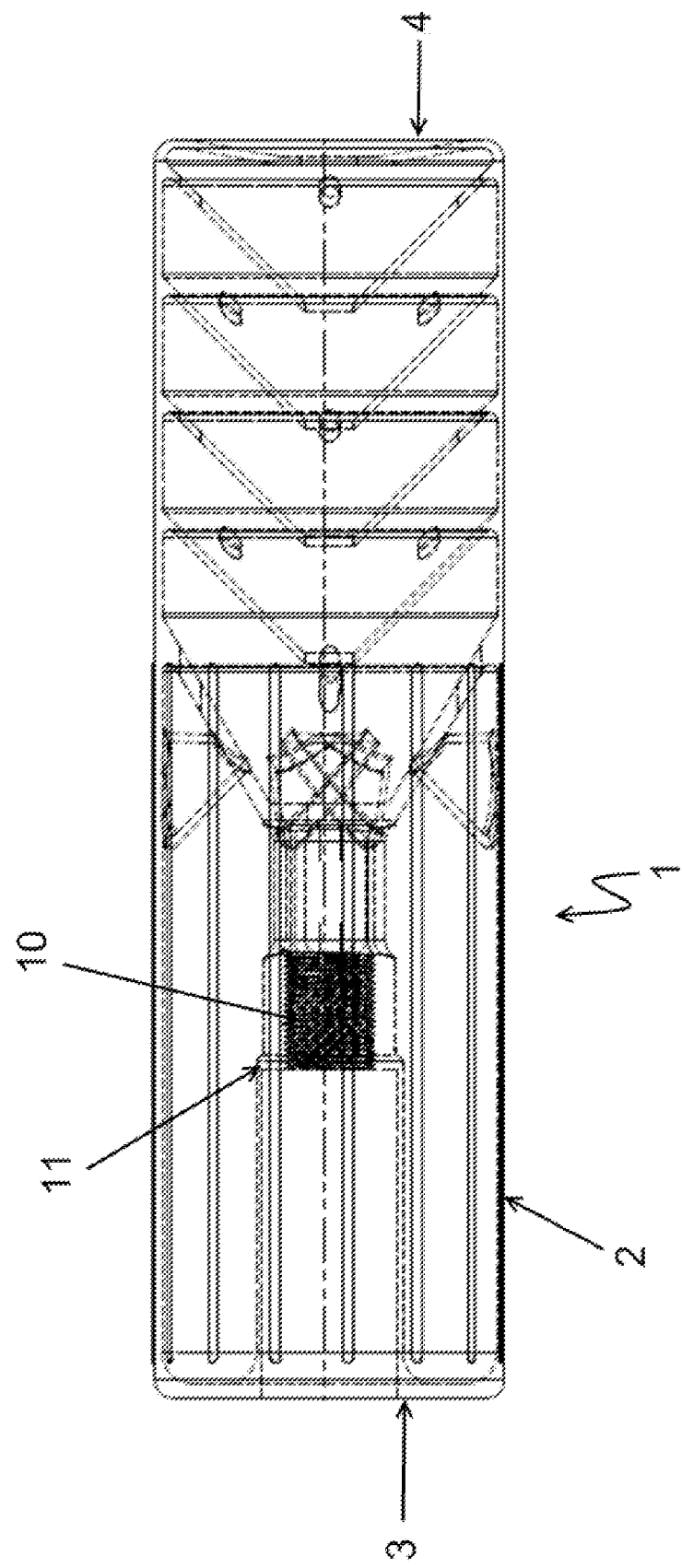
FIG. 1 is a side "look through" view of a first embodiment of a suppressor according to one aspect of the present invention.
Figure 2:
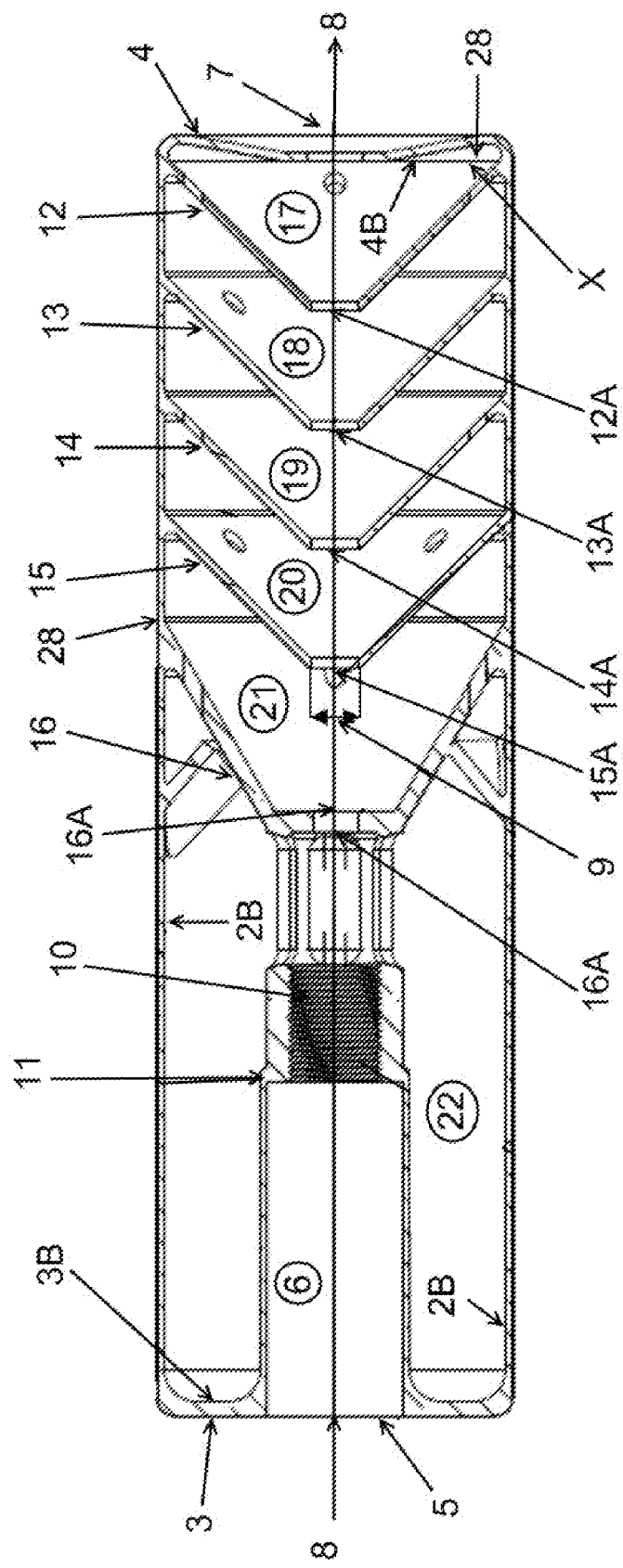
FIG. 2 is a cross sectional view through section C-C in FIG. 1.

Referring first to FIGS. 1 and 2, there is provided a suppressor (1).

The suppressor (1) is manufactured using a selective metal melting technique such as laser metal sintering ("LMS") techniques as are discussed below.

The suppressor (1) is a monocoque structure with all components formed integrally to at least one other component, therefore together.

The suppressor (1) is a substantially hollow cylinder defined by a continuous side wall (2), a first end wall (3) and a second end wall (4) that define a cavity.

First end wall (3) has an aperture (5) into an overlap channel (6). The overlap channel (6) is configured to receive an end of a gun barrel (not shown).

Second end wall (4) includes an aperture (7).

A pathway, indicted by line (8) extends from aperture (5) through to aperture (7). The diameter of pathway (8) is shown by line (9) in FIG. 2.

A screw thread (10) is provided at end (11) of overlap channel (6). The screw thread (10) is configured to engage with a corresponding screw thread on an end of a gun barrel (not shown in the Figures).

The suppressor (1) has a plurality of internal baffles (12, 13, 14, 15, 16).

The baffles (12-16) separate the cavity in the suppressor into a series of chambers (17, 18, 19, 20, 21, 22). Each of the chambers (17-22) is defined by a baffle (12-16), inner surface (2b) of continuous side wall (2), inner surface (3a) of first end wall (3), and/or inner surface (4a) of second end wall (4).

Chamber (22) acts as a primary blast chamber of the suppressor (1). The primary blast chamber (22) has a larger volume than chambers (17-21).

Each baffle (17-22) includes an aperture (12a-16a) respectively. The apertures (12a-16a) are aligned with each other, and apertures (5, 7). Accordingly, the apertures (12a-16a) are positioned on pathway (8). It is therefore possible for a bullet fired by gun (neither shown) to travel along pathway (8) so as to exit suppressor via aperture.

Figure 5A:
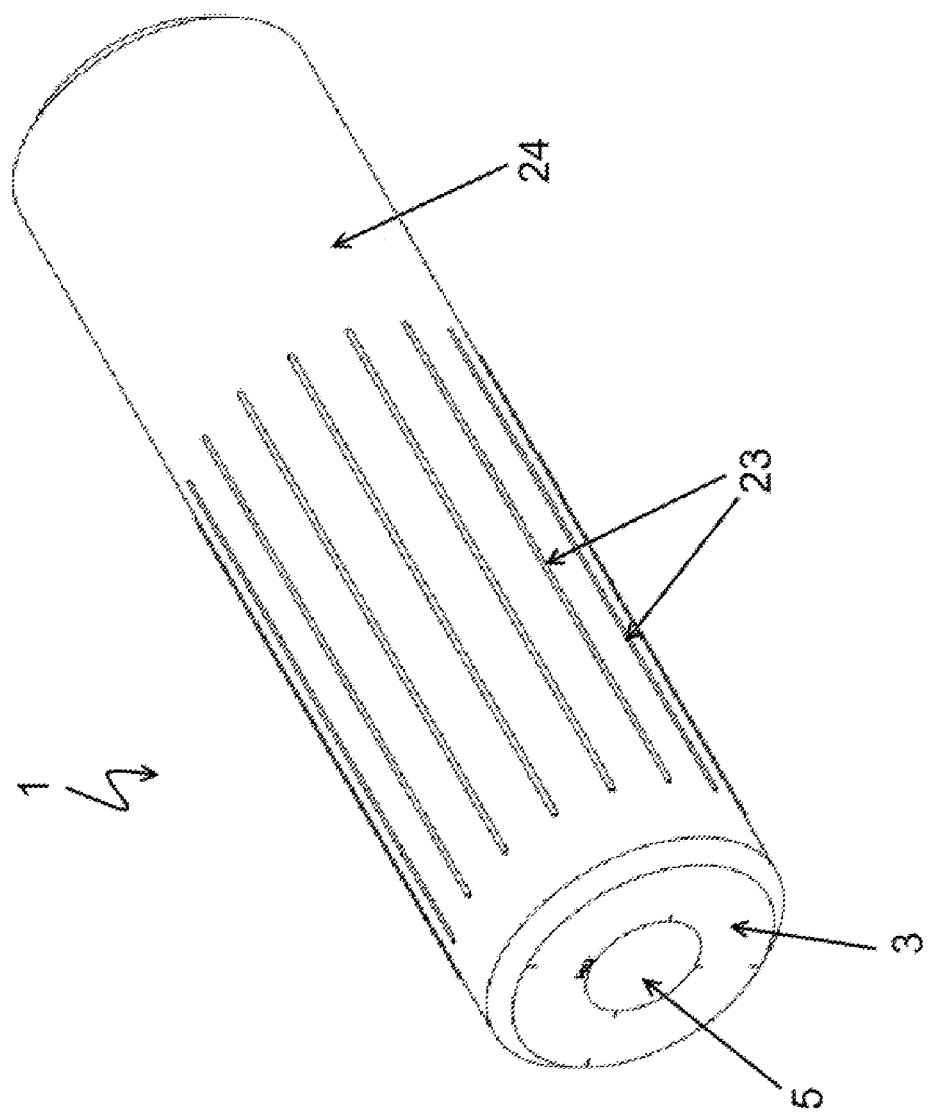
FIG. 5A is a first end on perspective view of another embodiment of a suppressor according to one embodiment of the present invention.
Figure 5B:
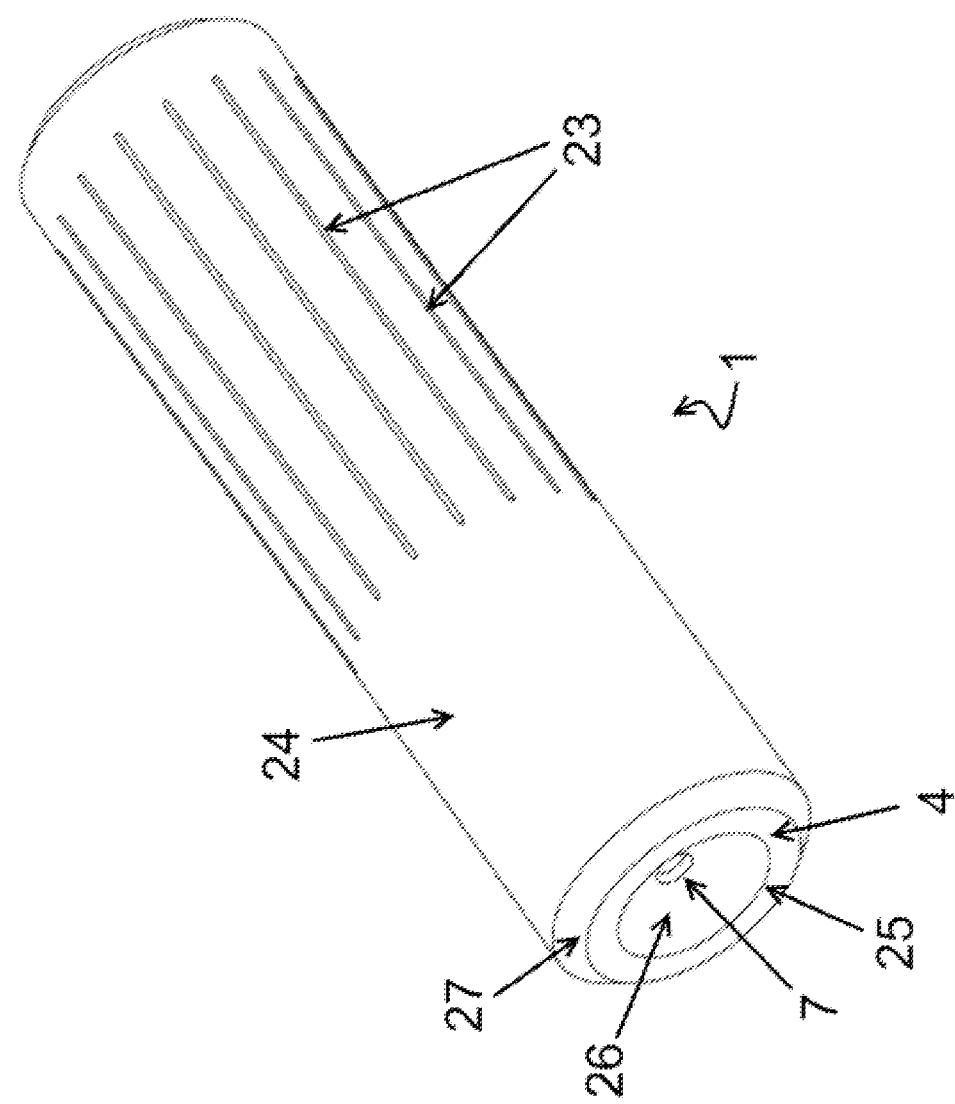
FIG. 5B is a second end on perspective view of the suppressor shown in FIG. 5A.

Referring now to FIGS. 5A and 5B, the suppressor (1) includes a grip in the form of ridges (23) on an outer surface (24) of continuous side wall (2).

The ridges (23) facilitate a person rotating suppressor (1) so as to cause screw thread (10) to engage with a corresponding screw thread on gun barrel (not shown).

Second end wall (4) includes a forming surface indicated as (25). The forming surface (25) is a ring. Inner side (26) and outer side (27) are at an angle to forming surface (25).

An internal angle between an underside of the baffles (17-22) and an imaginary plane (28) from the inner surface (2B) of side wall (2) is indicated by (X). The imaginary plane (28) is substantially perpendicular to an inner surface of continuous side wall (2) and substantially parallel to the build direction.

Baffle Structures

First, Second and Third Alternate Embodiments of Baffle Structures

Figure 3:
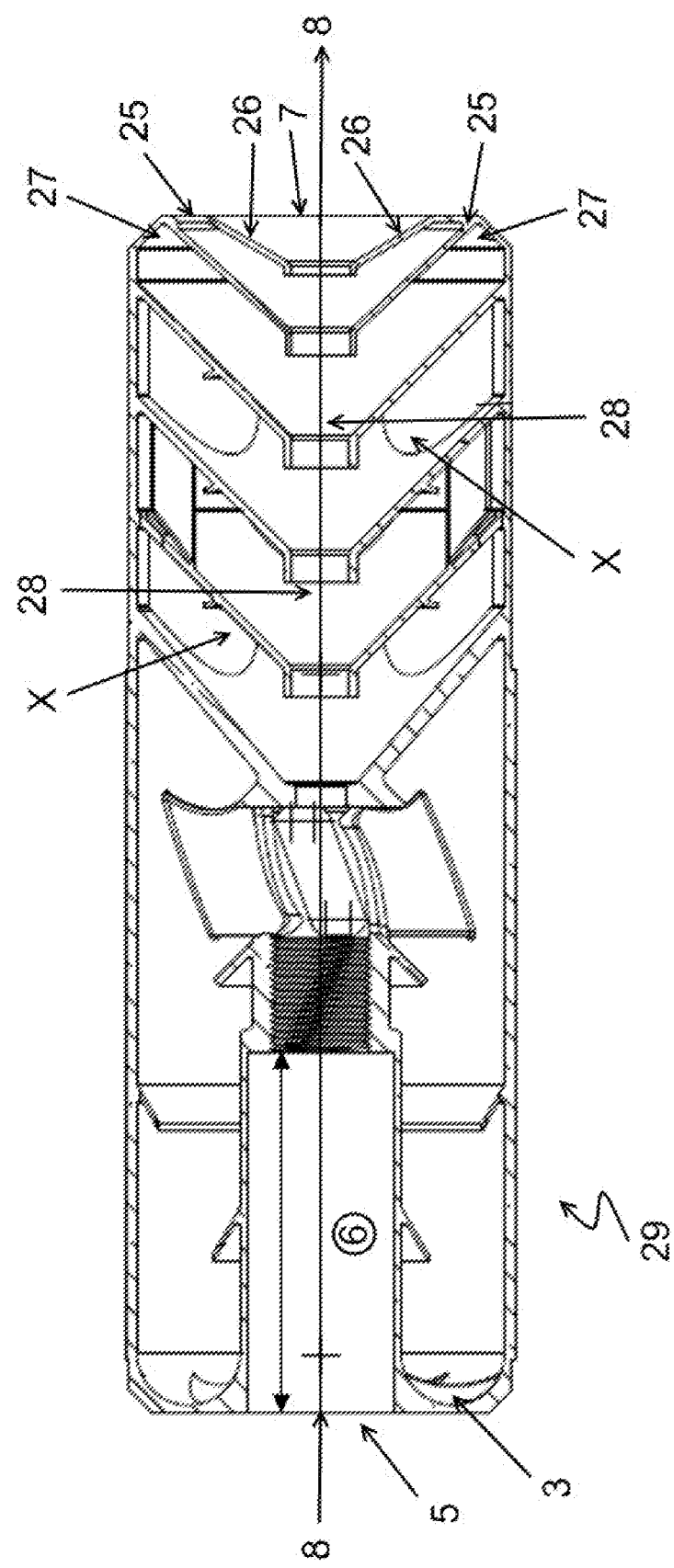
FIG. 3 is a cross sectional view of another embodiment of a suppressor according to the present invention.
Figure 4:
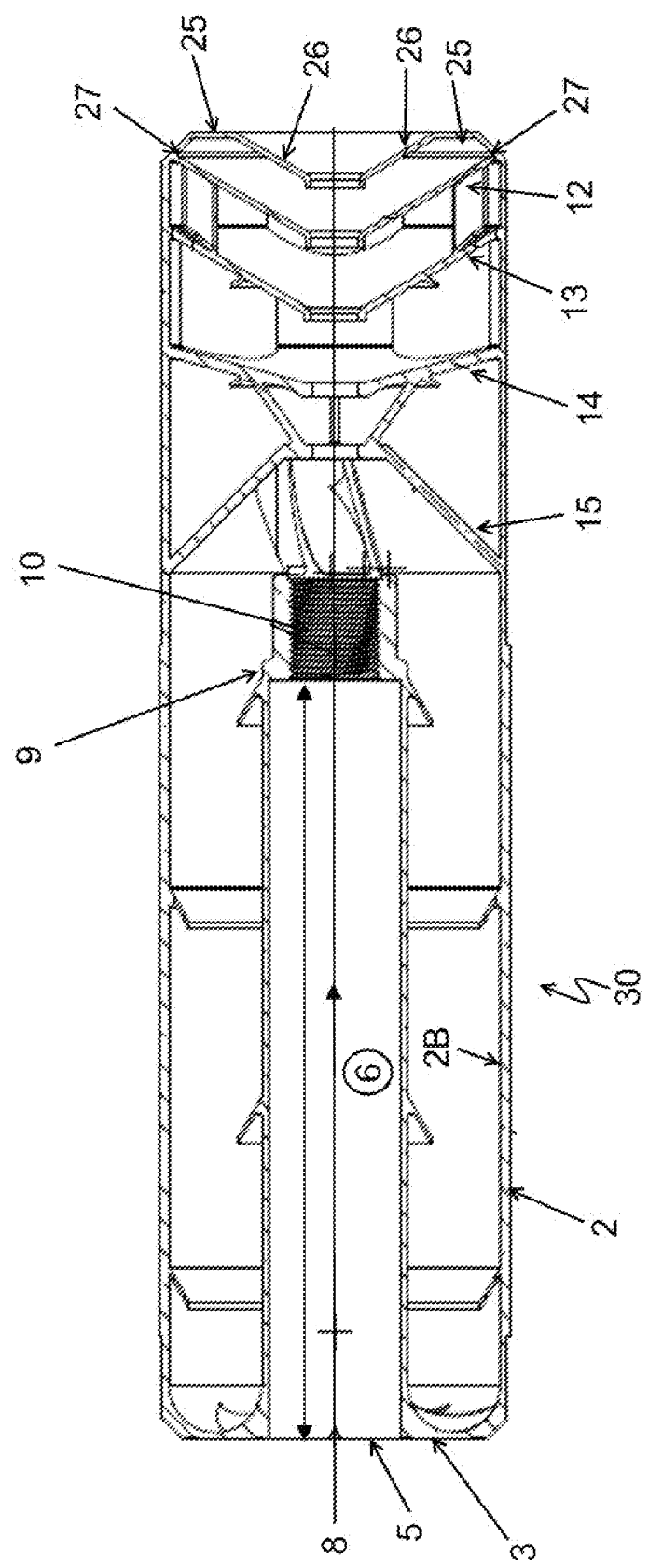
FIG. 4 is a perspective view of an alternative embodiment of a suppressor according to the present invention.
Figure 6:
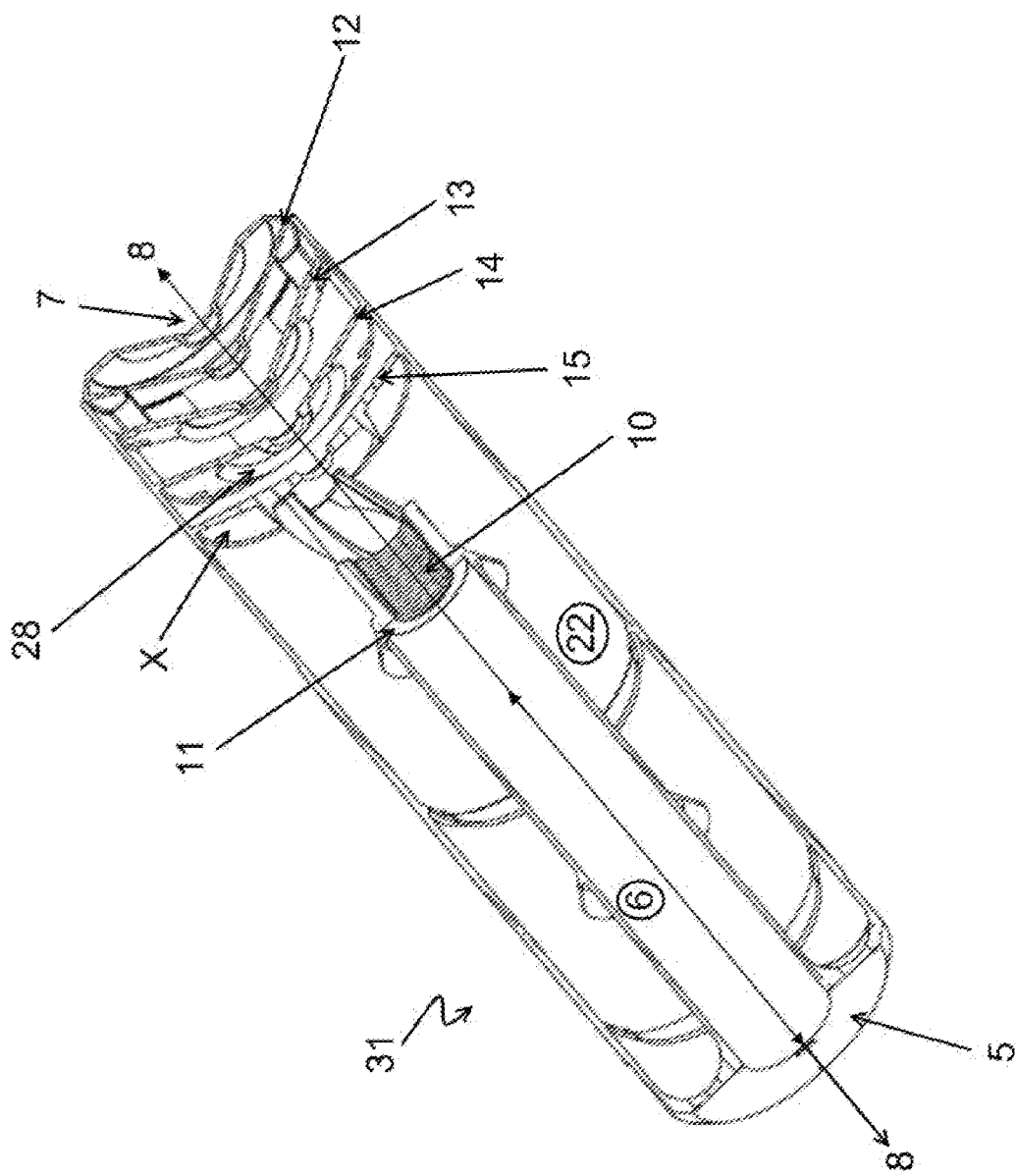
FIG. 6 is a cross-sectional view of FIG. 5A.

FIGS. 3, 4 and 6 show views of alternate embodiments of suppressors (29, 30, 31) according to the present invention. Identical numbers are used to refer to the components of suppressors (29-31) in FIGS. 3, 4, and 6 that are the same as the components of suppressor (1) described with reference to FIGS. 1 and 2. However the arrangement/orientation of the baffles differ so as to facilitate provision of a suppressor that may be better suited to use with different types of guns.

Fourth Alternate Embodiment of Baffle Structures

Referring now to FIGS. 9A-9D, showing a further embodiment of a suppressor (40).

Figure 9A:
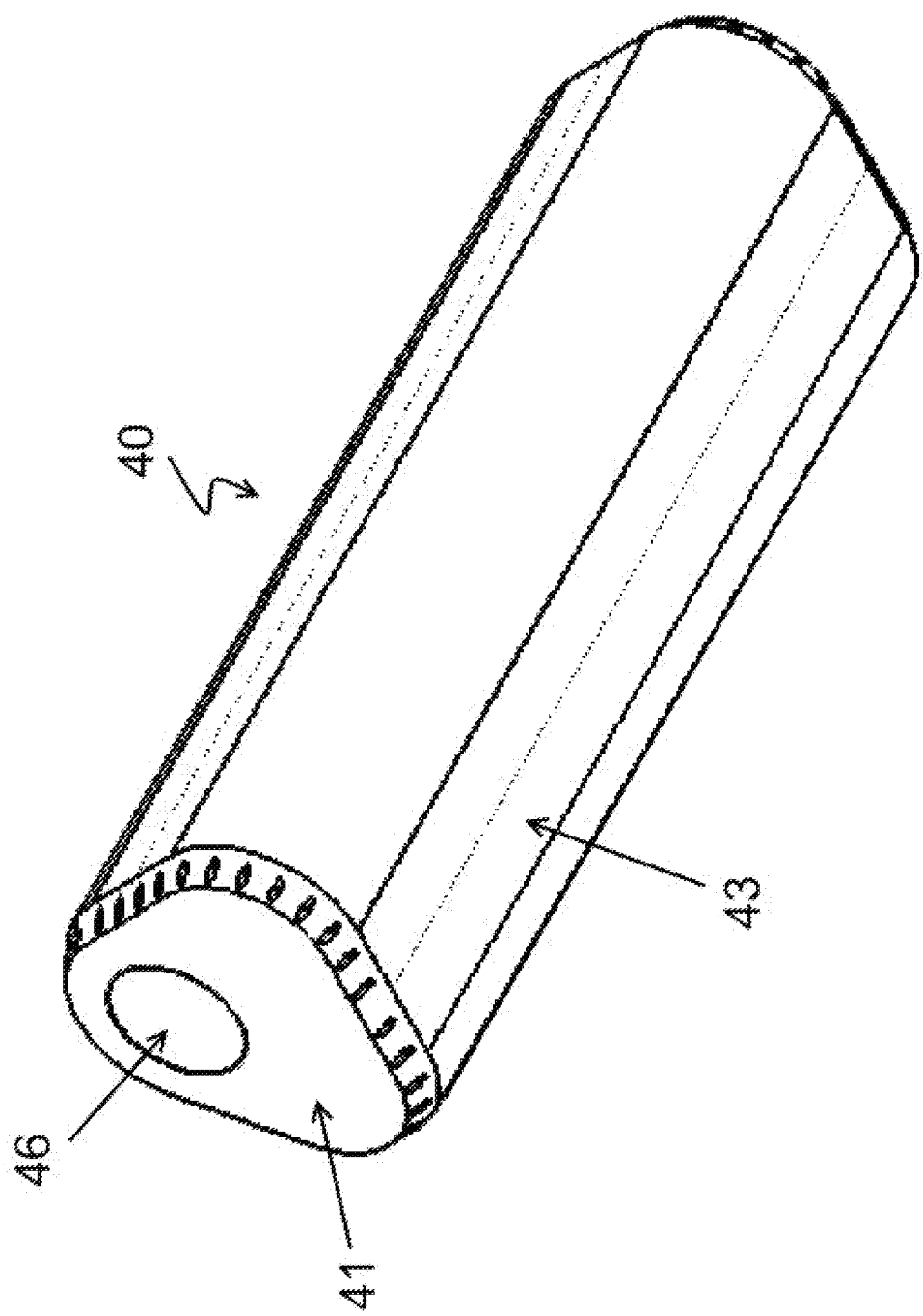
FIG. 9A is a bottom perspective view of a non-symmetrical suppressor according to another aspect of the present invention.
Figure 9B:
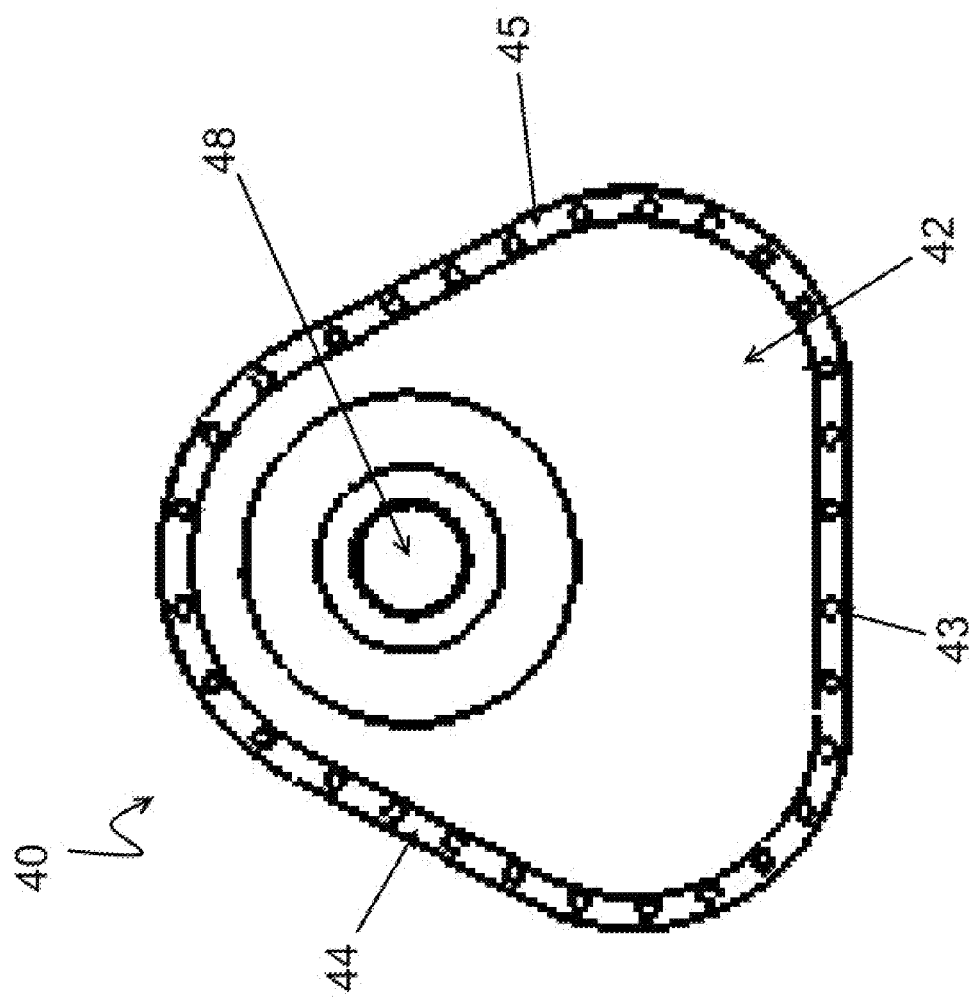
FIG. 9B is an end on view of the suppressor of FIG. 9A.

The suppressor (40) has a substantially triangular cross section as is best shown in FIG. 9B.

The suppressor (40) has a first end wall (41), a second end wall (42), a first side wall (43), a second side wall (44), and a third side wall (45).

Figure 10B:
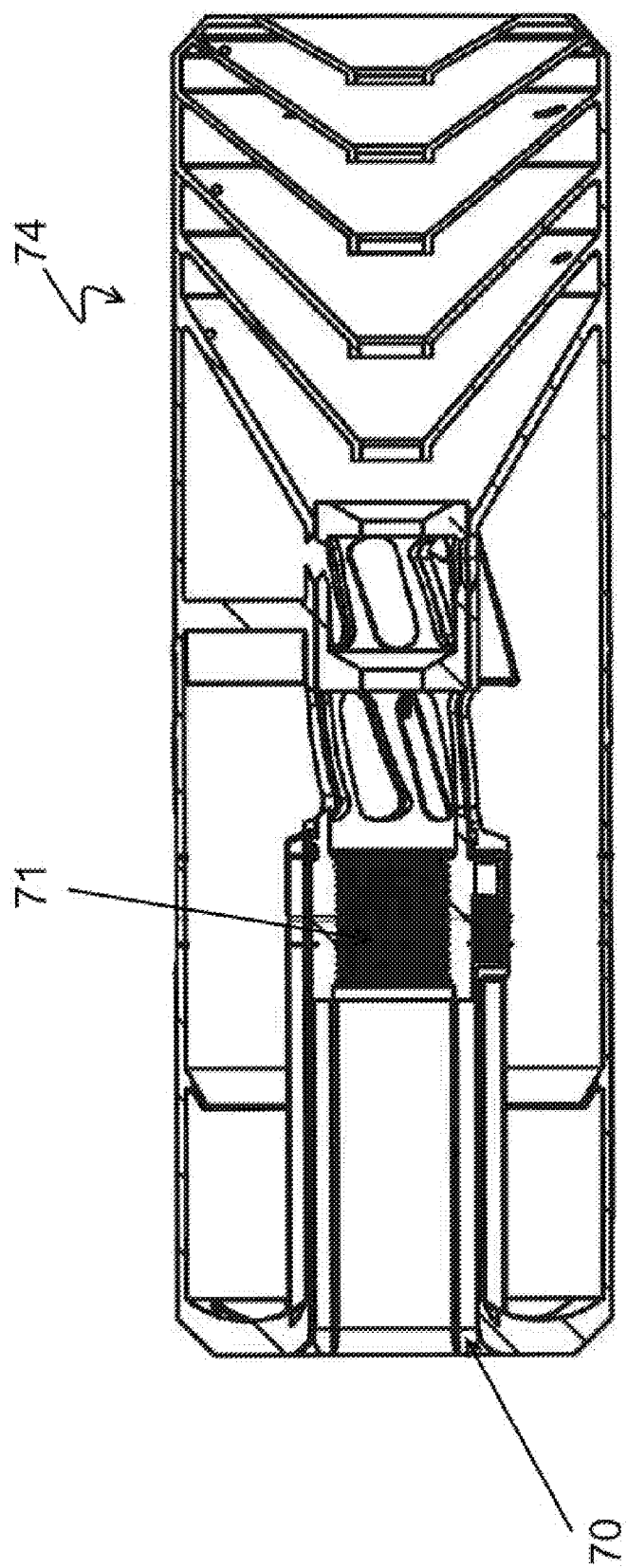
FIG. 10B is a side view showing the muzzle brake and suppressor of FIG. 10A engaged together.
Figure 10C:
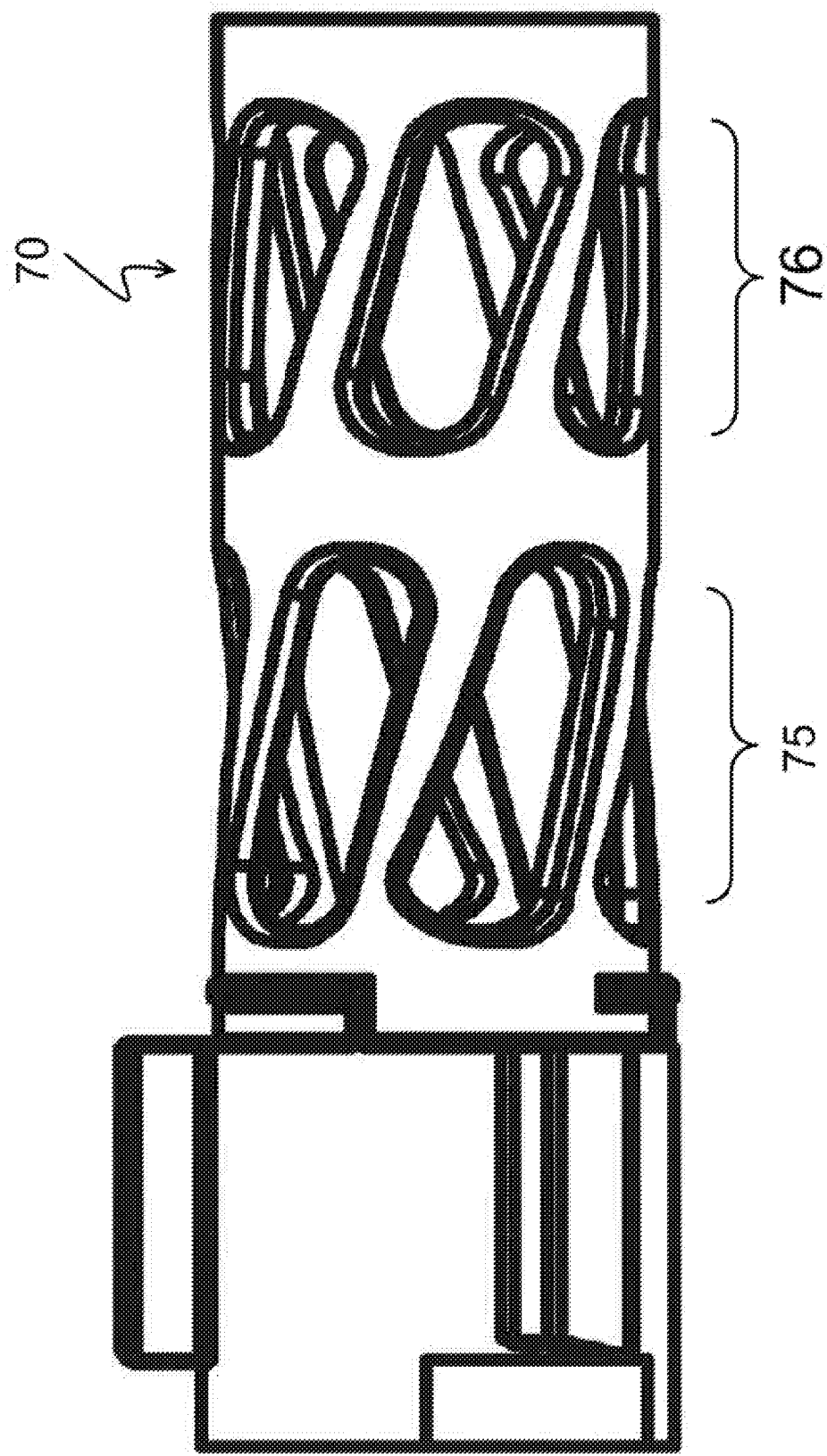
FIG. 10C is a close up side view of the muzzle brake shown in FIG. 10A.
Figure 10D:
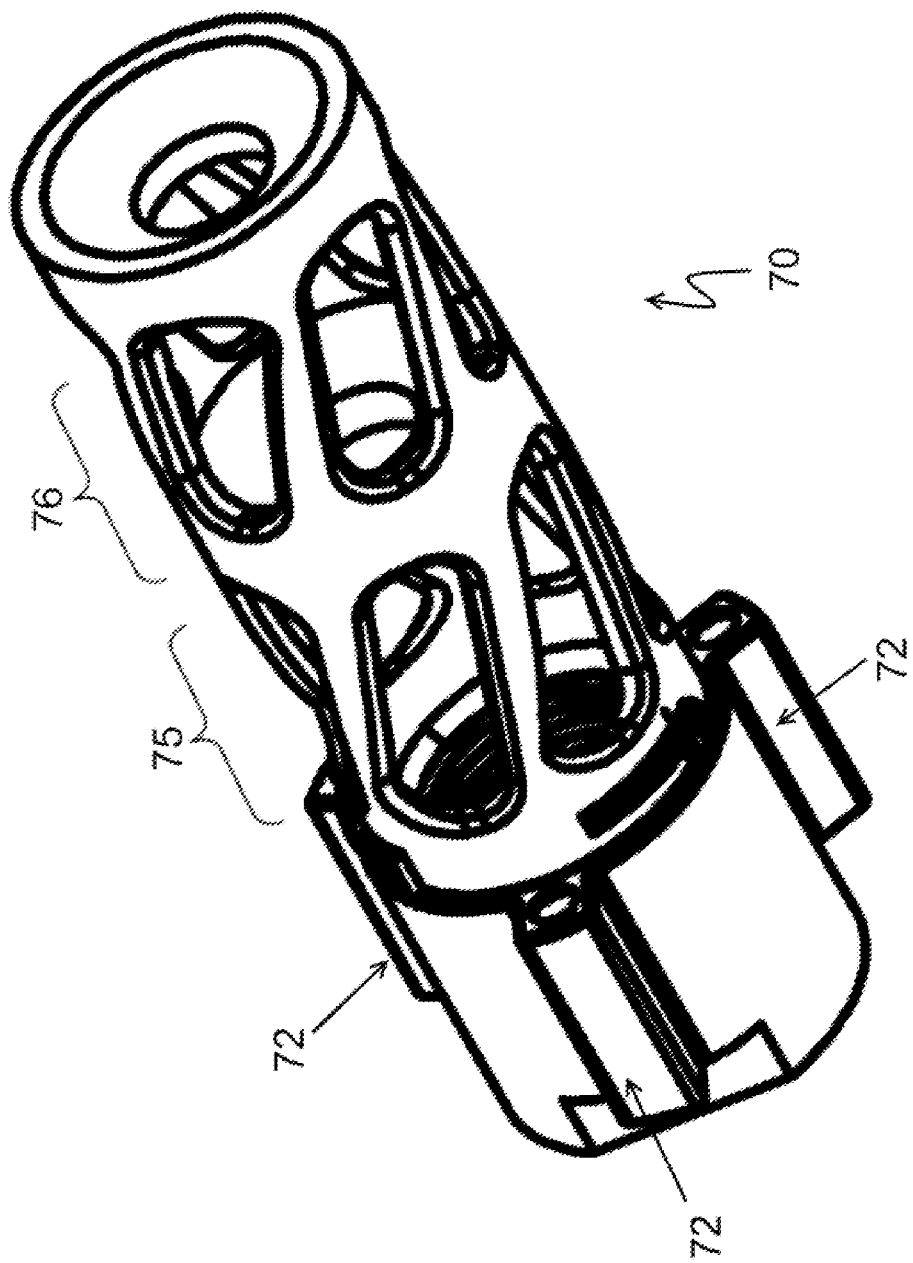
FIG. 10D is a perspective view of the muzzle brake shown in FIGS. 10A-C.
Figure 10E:
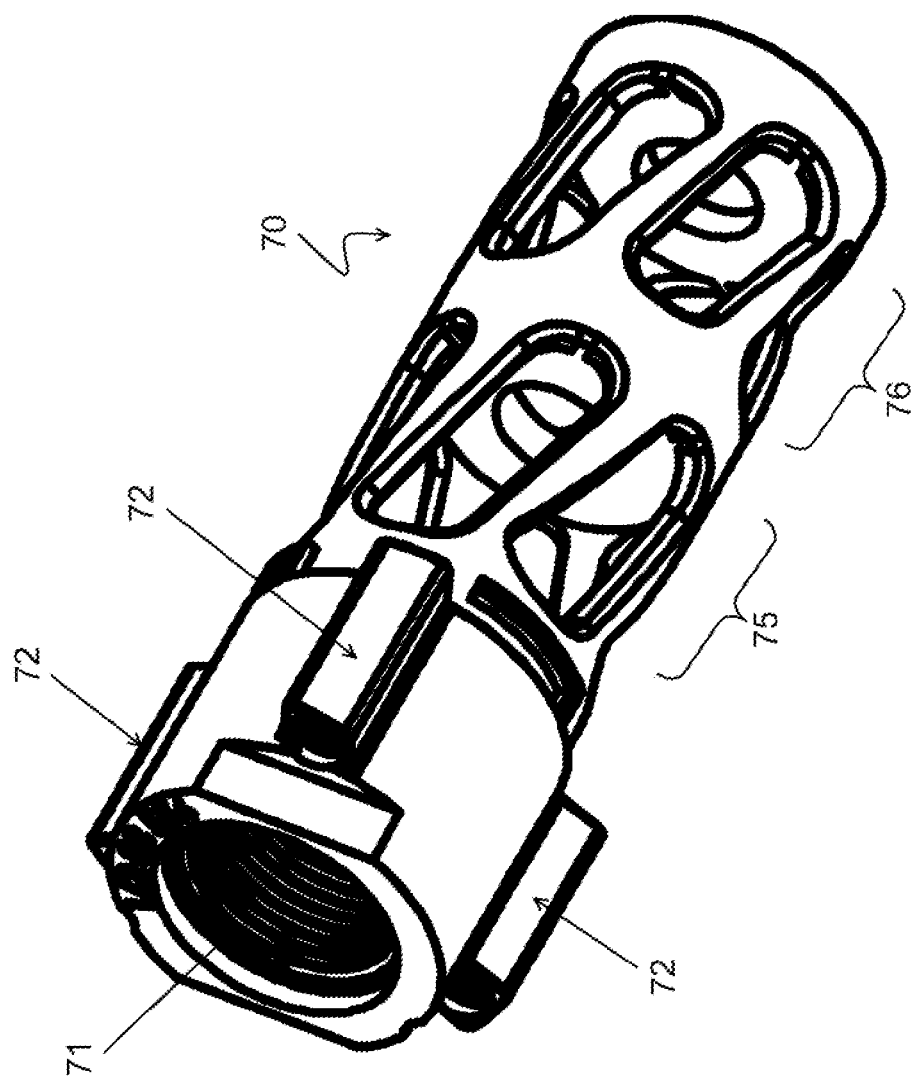
FIG. 10E is a second perspective view of the muzzle brake shown in FIGS. 10A-C.

First end wall (41) has an aperture (46) into an overlap channel that is shown as (47) in FIG. 10C.

The first end wall (41), second end wall (42), and side walls (43-45) define a cavity (101).

Figure 9C:
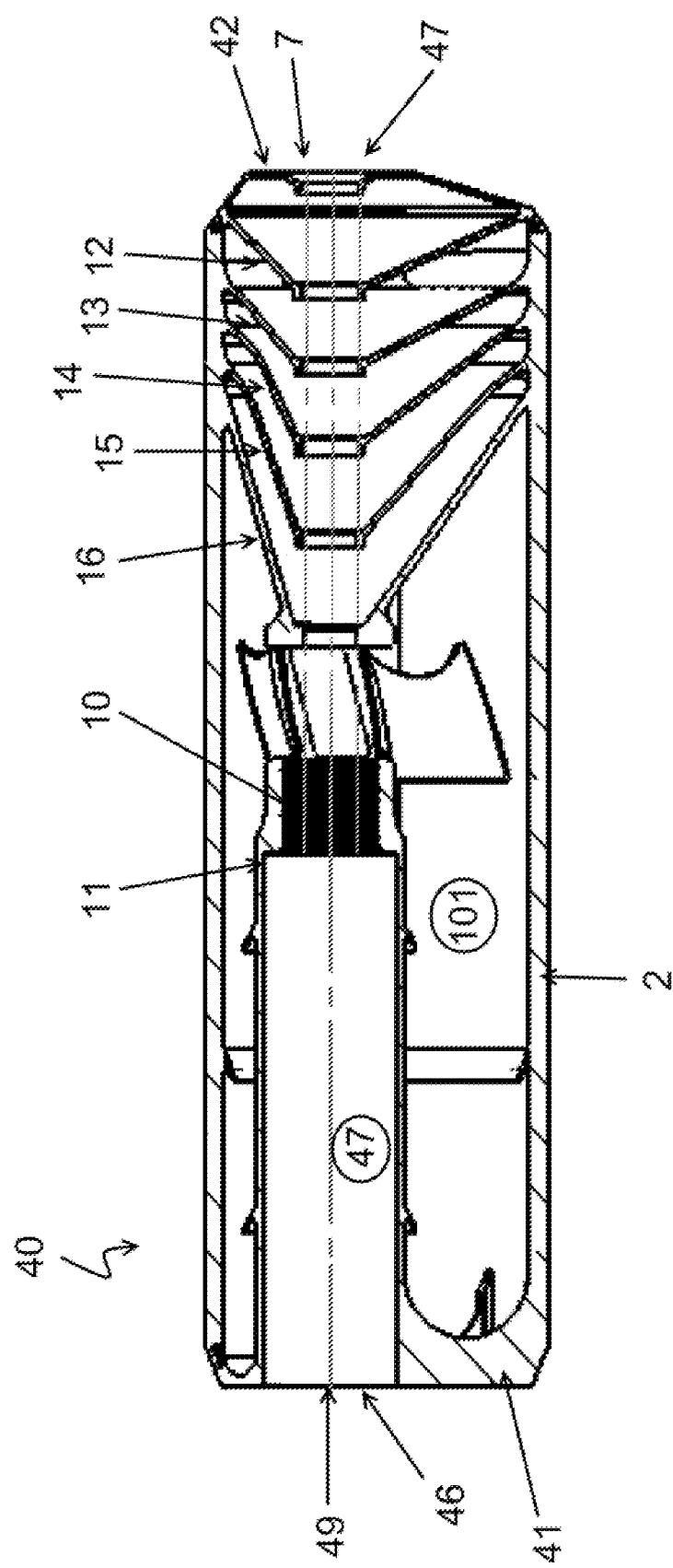
FIG. 9C is a side cross sectional view of the suppressor of FIGS. 9A and 9B.
Figure 9D:
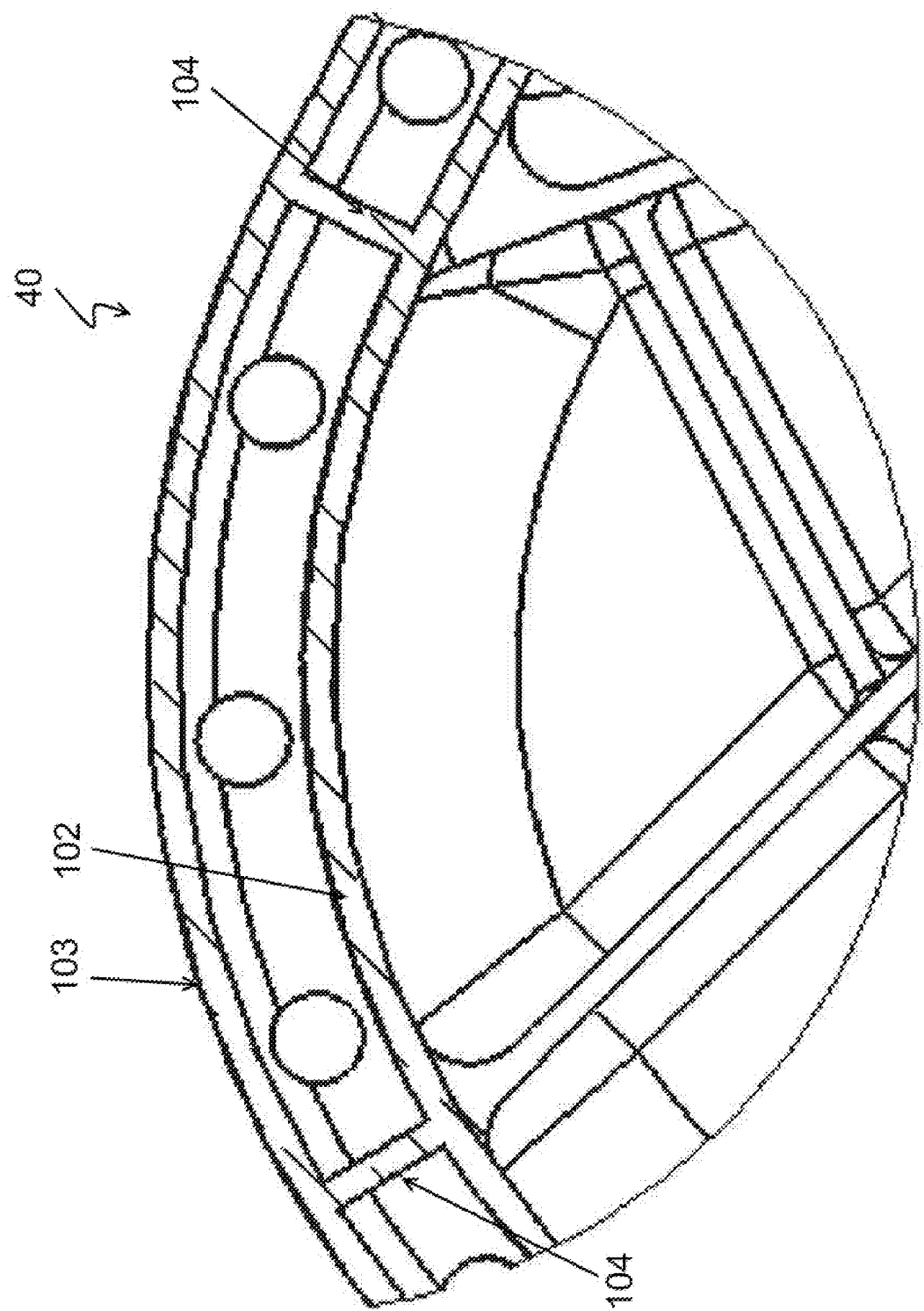
FIG. 9D is a close up end cross sectional view of a suppressor of FIGS. 9A-9C showing the dual wall construction.

A passageway, indicated by line (49) in FIG. 9C extends from aperture (46) through the cavity and to an aperture (47) in second end wall (42).

The suppressor (40) has an inner wall (102) and the second wall (103) that collectively form a double wall structure spacers (104) hold the walls (102, 103) apart from each other. There is a space (104) between the walls (102, 103) which acts to limit or reduce heat transfer from cavity (101) to second wall (103).

Fifth Alternate Embodiment of Bee Structures

Referring now to FIG. 14 which is a side cross sectional view of suppressor (50) according to a fourth embodiment of the present invention.

The suppressor (50) has a housing formed by a continuous side wall (51), a first end wall (52) and a second end wall (53) which collectively define a cavity.

Figure 13:
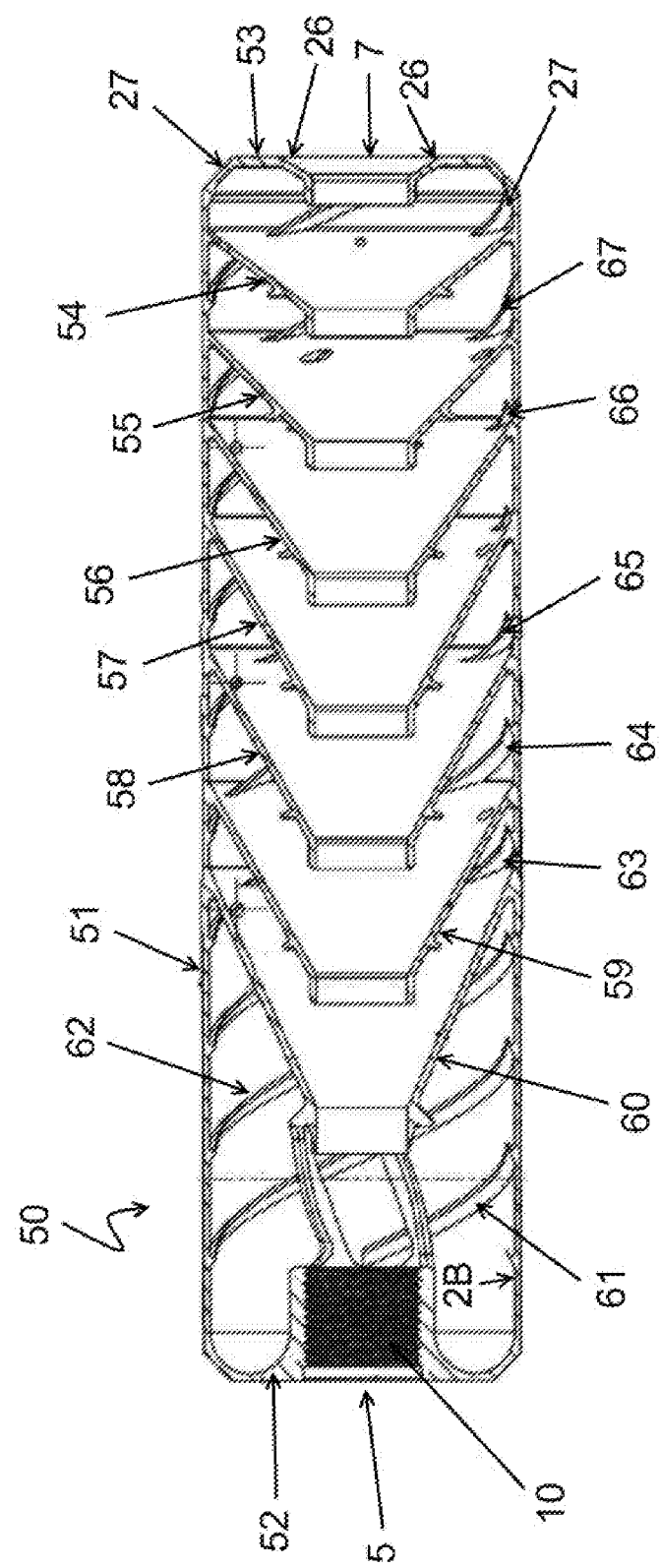
FIG. 13 is a side cross sectional view of a further embodiment of a suppressor according to the present invention
Figure 14A:
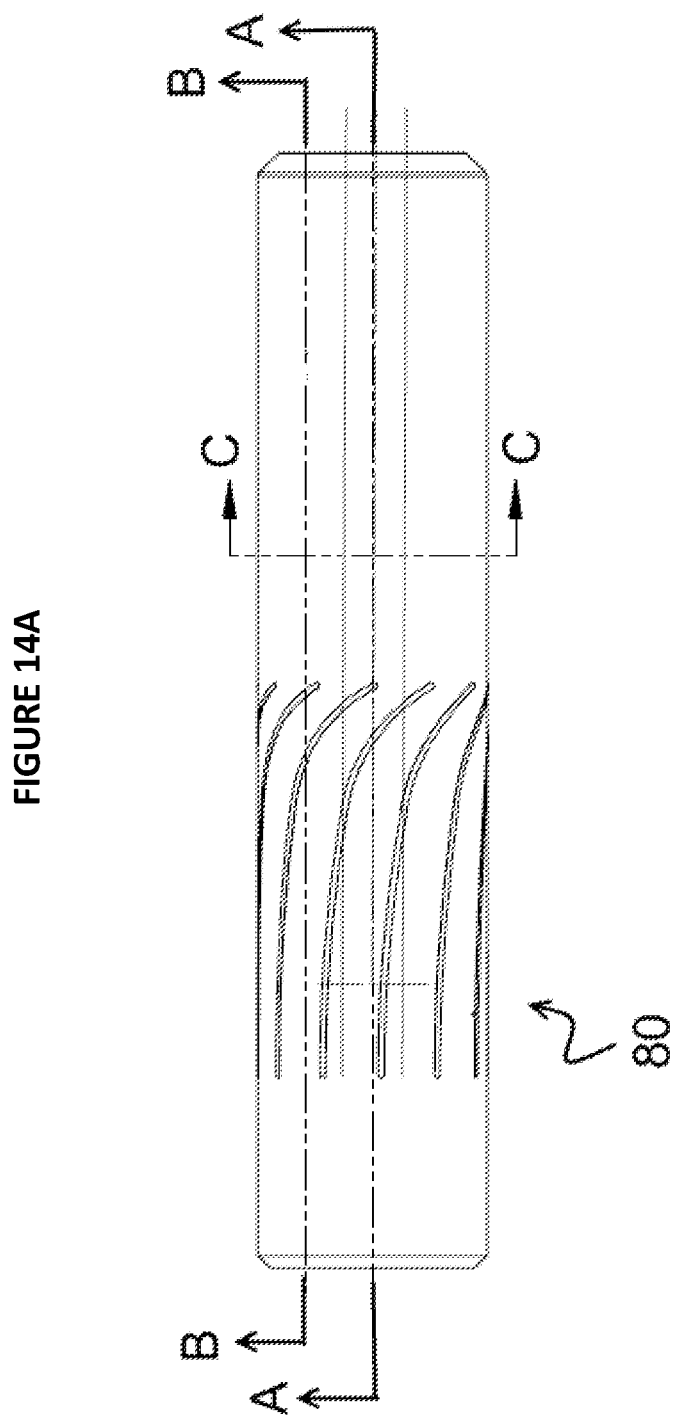
FIG. 14A is a side view of a further embodiment of a suppressor according to the present invention.
Figure 14B:
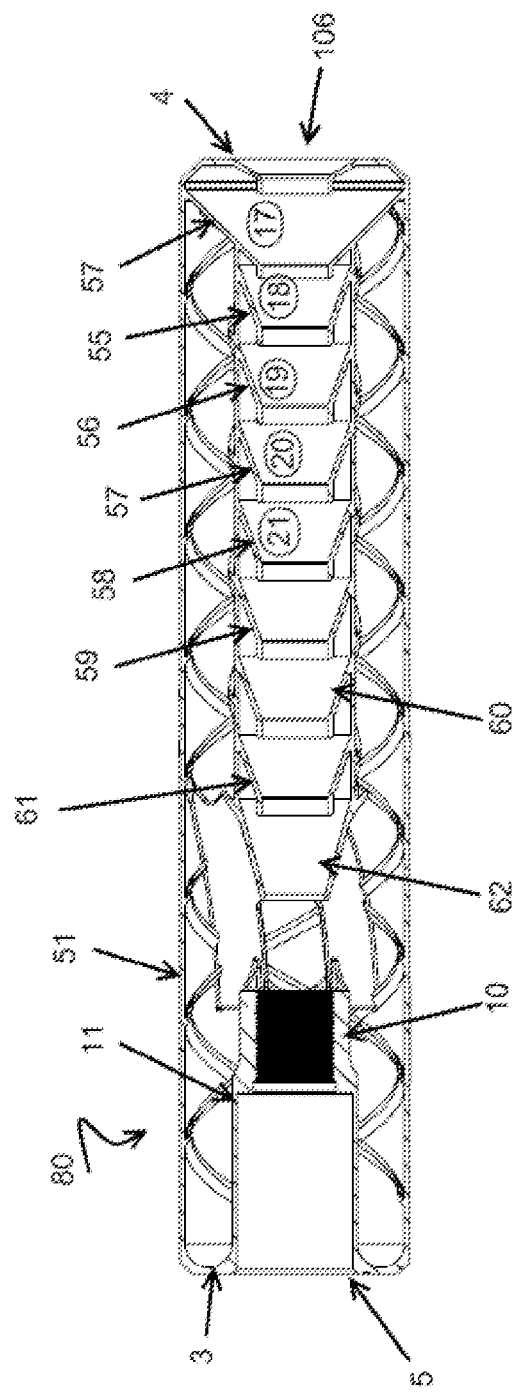
FIG. 14B is a side cross sectional view through section A-A in FIG. 14A.
Figure 14C:
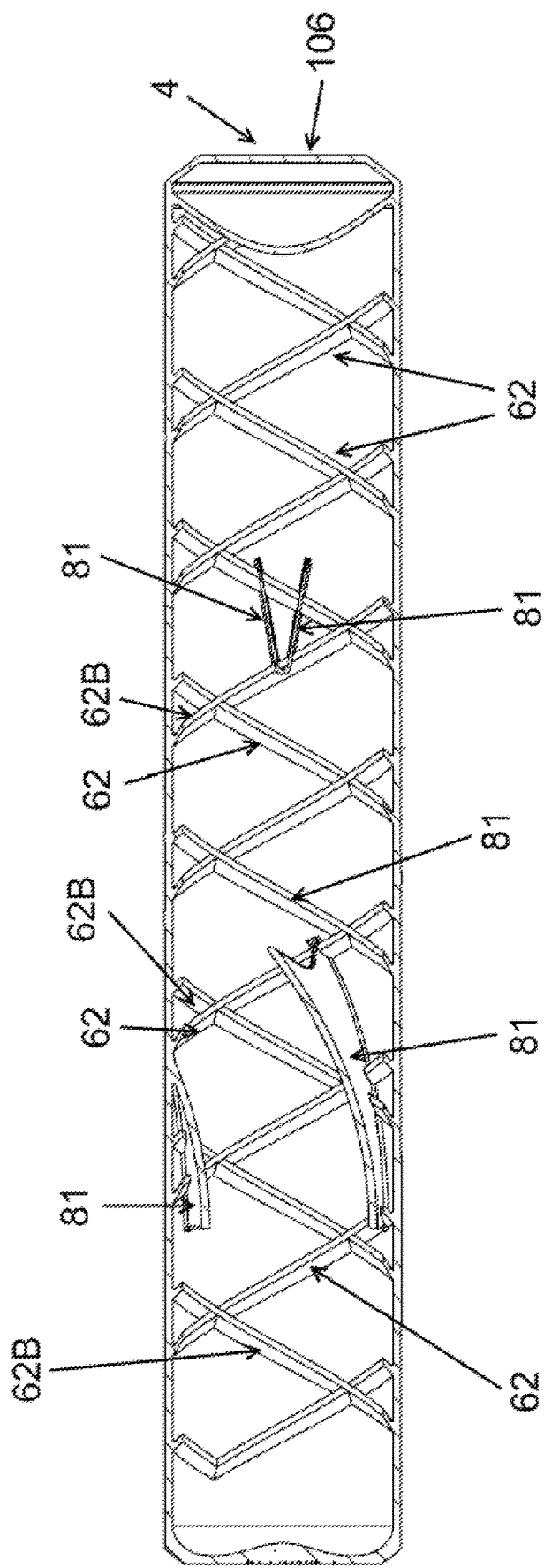
FIG. 14C is a side cross sectional view through section B-B in FIG. 14A.
Figure 14D:
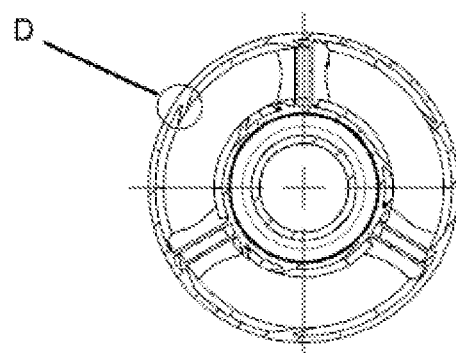
FIG. 14D is a cross sectional view through section C-C in FIG. 14A.
Figure 14E:
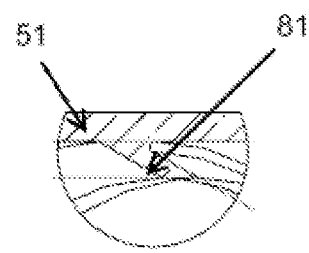
FIG. 14E is a close up view of the detail D in FIG. 14D.
Figure 14F:
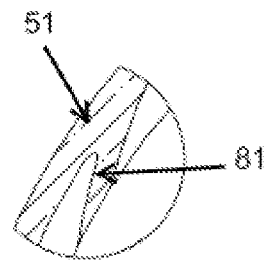
FIG. 14F is a close up view of detail E in FIG. 14C.
Figure 15:
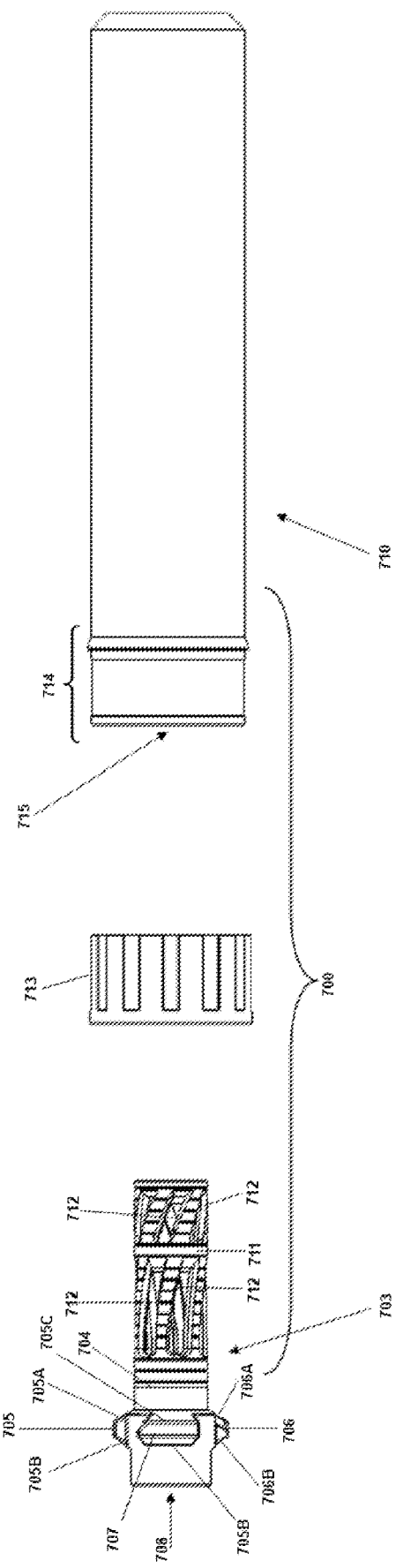
FIG. 15 is a side view of components of a connection system according to an embodiment of the invention.

A series of baffles (54-60) are constructed so as to be integral to an inner surface of the side wall (2b). This is as discussed above in relation to FIGS. 13A, 13B, and 13C.

The suppressor (50) includes a series of fins (61-67) within the cavity. The fins (61-67) are all identical to each other and spaced apart along the length of the suppressor (50). Therefore only fin (61) will be described herein.

The bottom edge (68) of fin (61) has no support underneath. Therefore the fin (61) must be constructed out from inner surface (2b) of side wall (2) and downwards. As a result, fin (61) is constructed in a reverse direction e.g. downwards with respect to the build direction.

The fin (61) is generally a spiral that extends along the length of the suppressor (50), that wraps around an inner surface (2b) of the side wall (2). In addition, the spiral twists so that inner edge, being the edge of the spiral closest to the centre line of the suppressor (50) is lower than the corresponding point on outer edge formed integrally to the inner surface of side wall.

The shape and orientation of the fin (61) is such that the angles on side between edges of the fin and the inner wall are not equal, one being less than 90 degrees, and the other being greater than 90 degrees.

The fins (61-67) are orientated so that expansion of gas in the cavity is not initially hindered or obstructed. However, the passage of the gas in the cavity as it returns, to try and exit through aperture (7) is disrupted. Therefore, the fins (61-67) may collectively slow down expansion of gas within the cavity thereby improving the operation of the suppressor (50).

The fins (61-67) also provide reinforcement to the suppressor. This could facilitate thinner side or end walls while still achieving a comparable strength suppressor (50).

The ridges may also increase the rigidity of the suppressor (50) or otherwise reduce/eliminate vibrations in the suppressor during its operation. That could be useful for reducing or eliminating audible noises created during use of a suppressor.

Sixth Alternate Embodiment of Baffle Structures

Referring now to FIGS. 14A-14F showing another embodiment of a suppressor (80) according to the present invention.

Numerals used to describe features of the suppressor (50) are also used to identify similar features of suppressor (80). Therefore, those features will not be described again in relation to FIGS. 14A-14F.

However, suppressor (80) also includes a second fin (62B). The second fin (62B) is orientated counter to the fin (62). Together, the fins (62, 62B) form a double helix extending along the length of the suppressor (80).

The suppressor (80) also includes a plurality of fins (81). The fins are orientated to minimise or reduce their effect on expansion of gases into the chambers in suppressor (80). However, the fins are orientated and configured to hinder, and thereby slow down, the passage of gasses out of the chambers. This is achieved by having the fins orientated so as to allow a clear and uninterrupted passage past the fins (81) as the gas initially expands into a chamber, yet the fins (81) provide a surface against which the expanding gas abuts to thereby create turbulence and slow down the gases expansion.

Therefore the fins (81) may improve the ability of suppressor (80) to reduce the noise caused by firing a gun with which the suppressor (81) is used.

In the embodiment shown in FIGS. 14A-14F the fins (81) and are at an angle of 60° from the build direction (indicated by arrow 106), and have 60 mm pitch per revolution, a width of 1.55 mm and a thickness of 0.5 mm.

Seventh Alternate Embodiment of Baffle Structures

Referring now to FIGS. 33-39 showing an embodiment of a suppressor (400) having internal baffles (410, 412, 414, 416).

The suppressor (400) is a substantially cylindrical body defined by a first end wall (402), a second end wall (404), and a continuous side wall (406).

The suppressor (400) includes a pathway there through to enable a bullet to travel through the suppressor from first end wall (402) and exit therefrom through an aperture in second end wall (404).

The suppressor (400) may also include a fastener half (not shown in the Figures) to secure the suppressor (400) to a gun barrel (not shown). The fastener half may be any known fastener mechanism, or the connection system described herein.

The suppressor (400) is substantially hollow, having a cavity therein. The cavity however is divided into a series of compartments defined by baffles (410-416).

The baffles (410-416) are non-symmetrical. In addition, each baffle (410-416) includes an aperture which is aligned with the apertures in the end walls. This facilitates a bullet travelling through the suppressor (400).

The baffles (410-416) are formed integrally to an inner surface of the side wall (406). This may be achieved using the techniques discussed in the present Applicant's co-pending New Zealand Patent Application No. 619475.

Each aperture (410-416) is non-perpendicular to the longitudinal axis of the suppressor.

Figure 38:
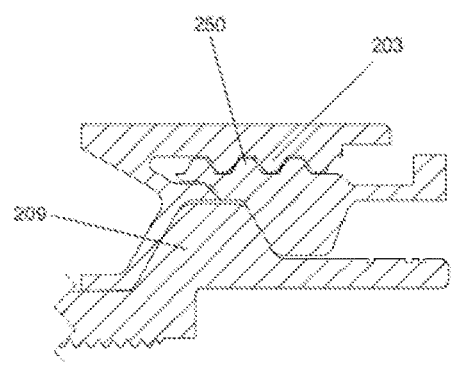
FIG. 38 is a view through section M-M shown in FIG. 37.
Figure 39:
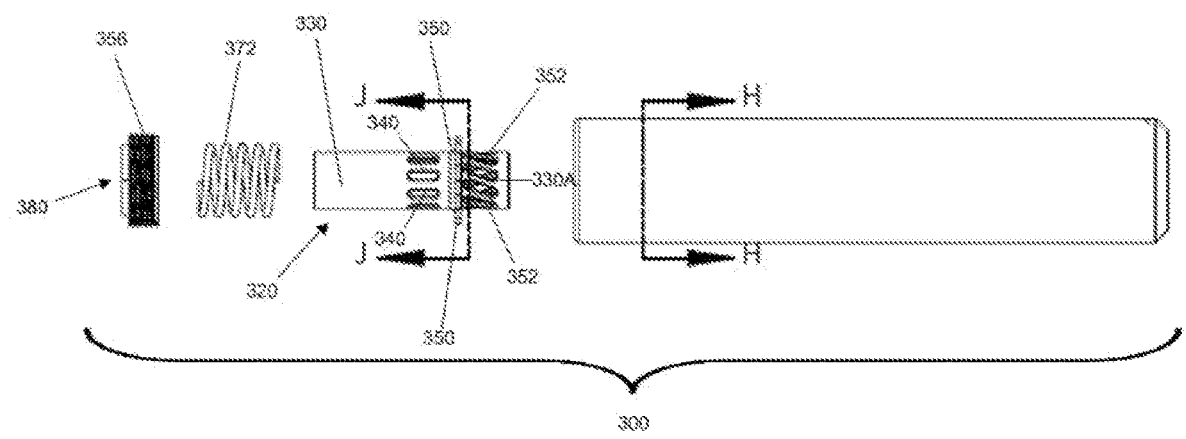
FIG. 39 is a side view of components of a connection system according to an embodiment of the invention.
Figure 40:
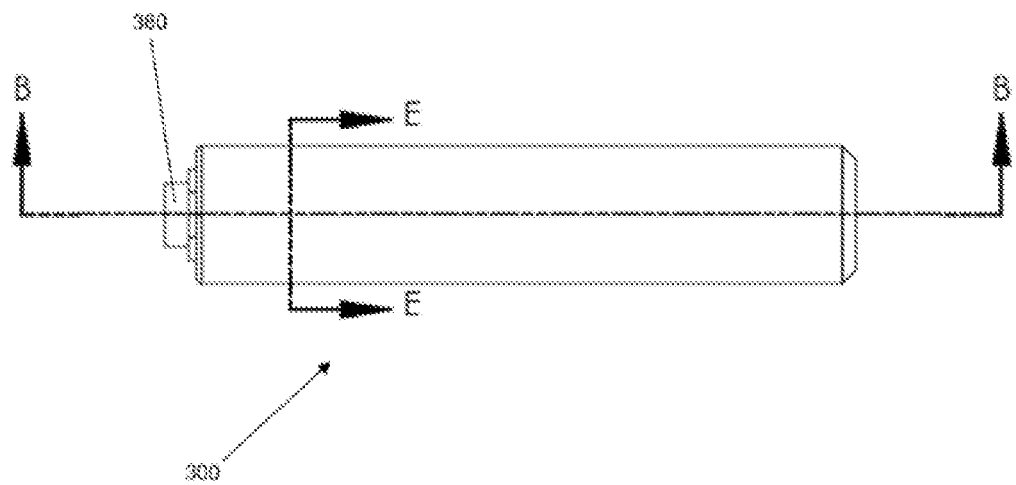
FIG. 40 is a side view of FIG. 39 showing components of the connection system secured together.
Figure 41:
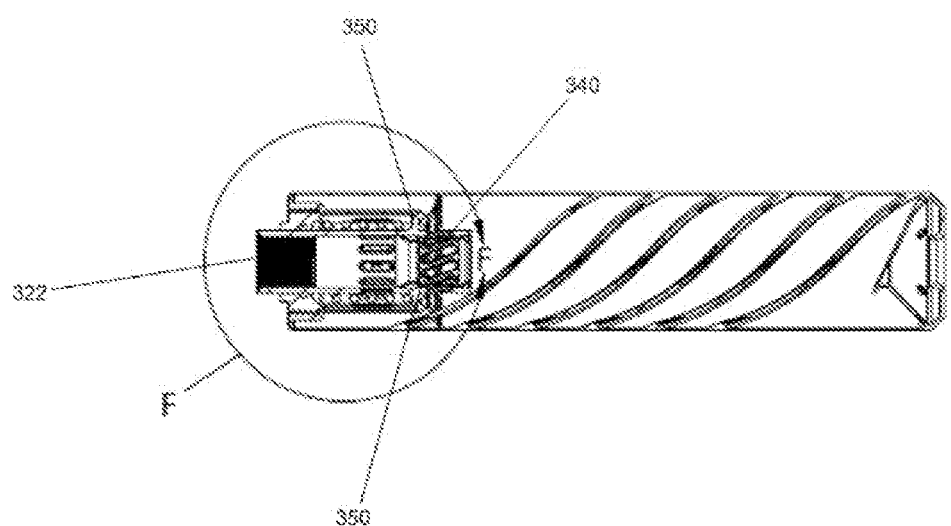
FIG. 41 is a view through detail section B-B shown in FIG. 40.
Figure 42:
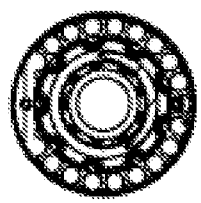
FIG. 42 is a view through section E-E shown in FIG. 40.
Figure 43:
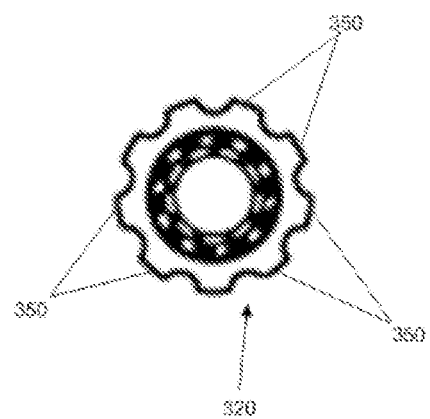
FIG. 43 is a view of section J-J shown in FIG. 39.
Figure 44:
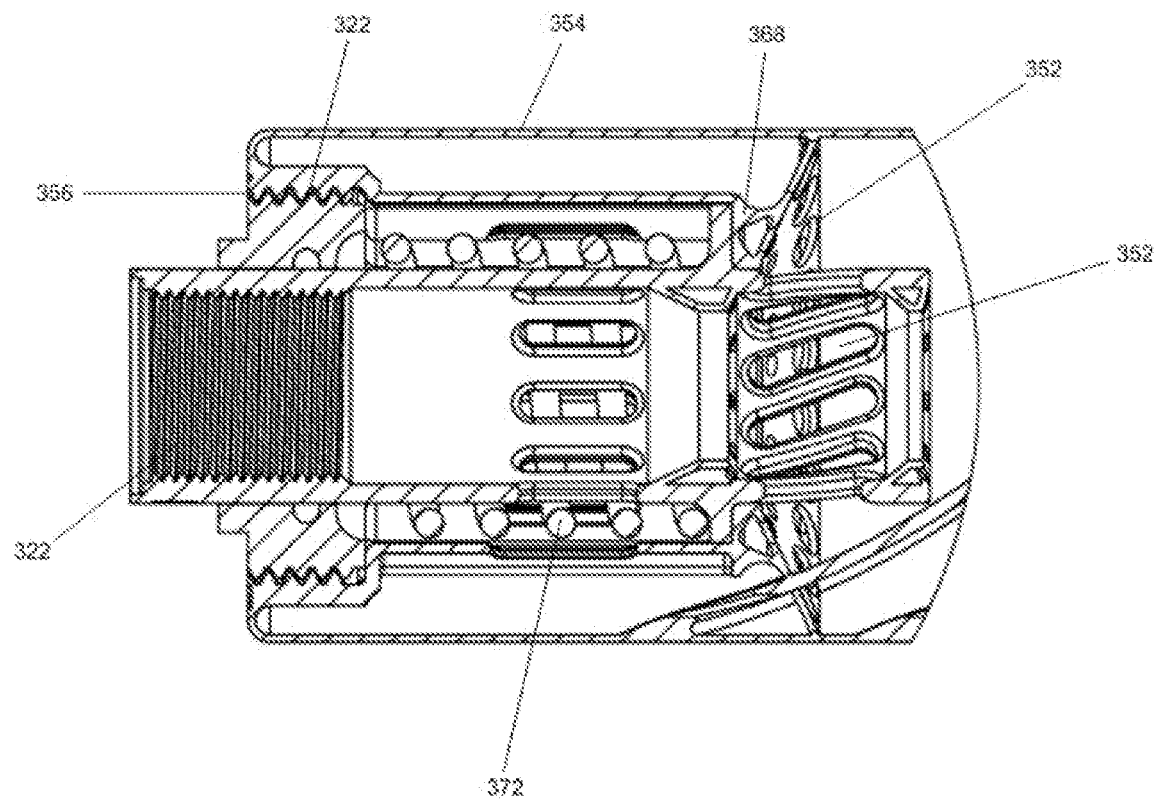
FIG. 44 is a close up view of detail F shown in FIG. 41.
Figure 45:
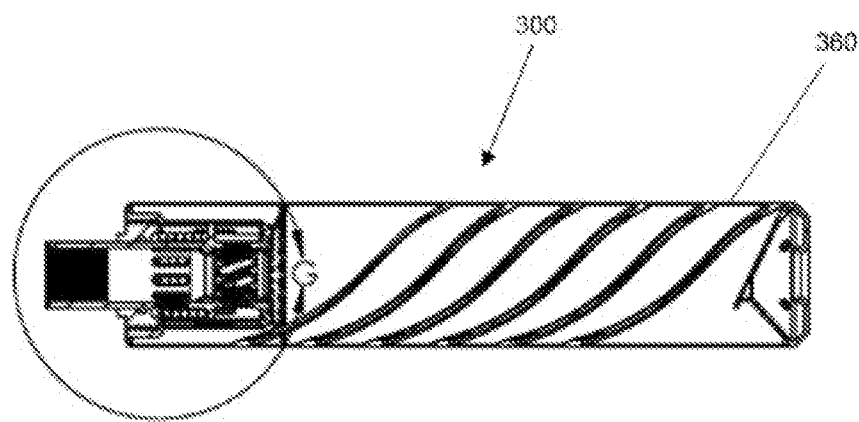
FIG. 45 is a view of the connection system shown in FIG. 39 after firing of a weapon.
Figure 46:
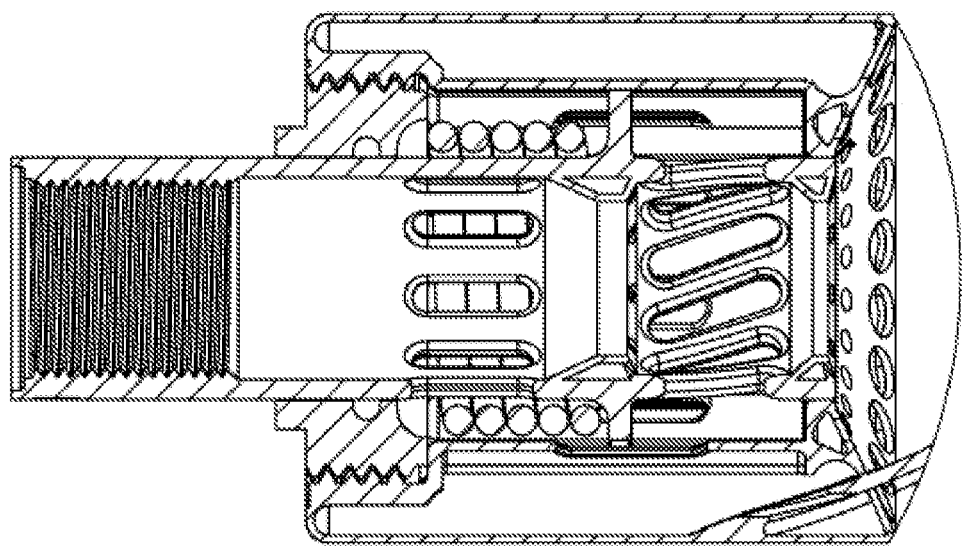
FIG. 46 is a view of detail G shown in FIG. 45.
Figure 47:
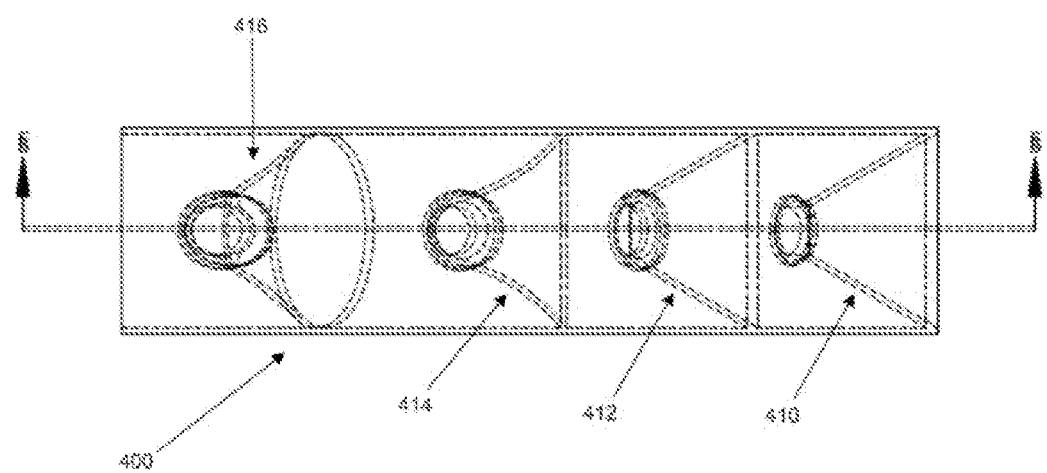
FIG. 47 is a look-through view of an embodiment of a suppressor according to an embodiment of the invention.
Figure 48:
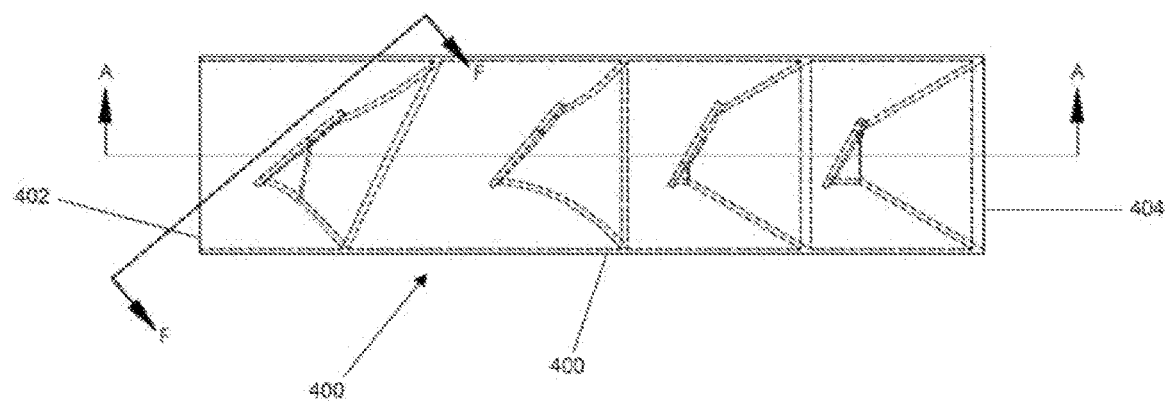
FIG. 48 is a side cross sectional view through the suppressor of FIG. 47.
Figure 49:
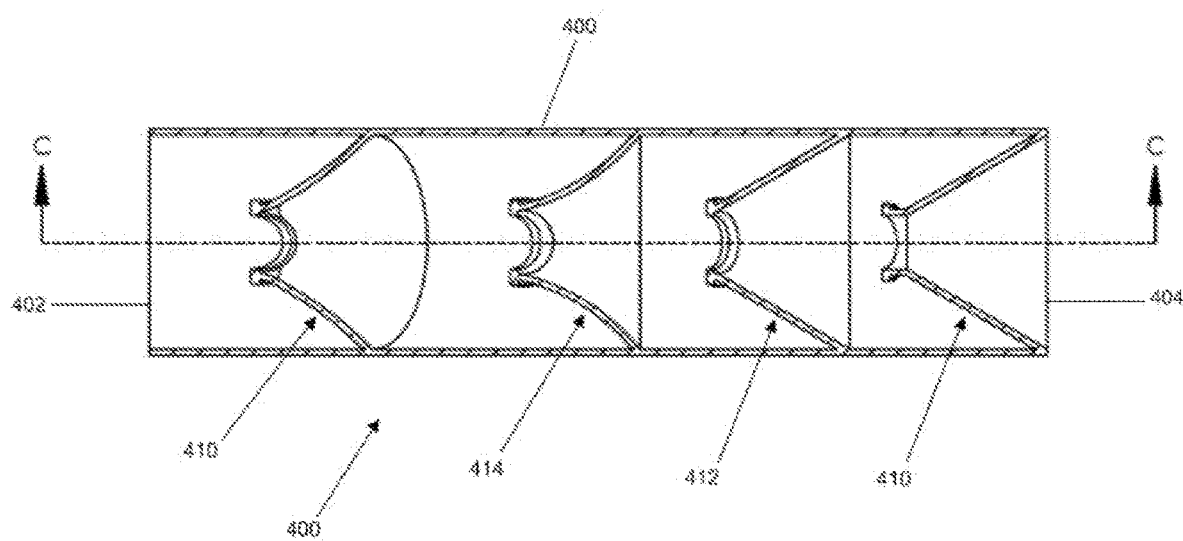
FIG. 49 is a view through A-A shown on FIG. 48.
Figure 50:
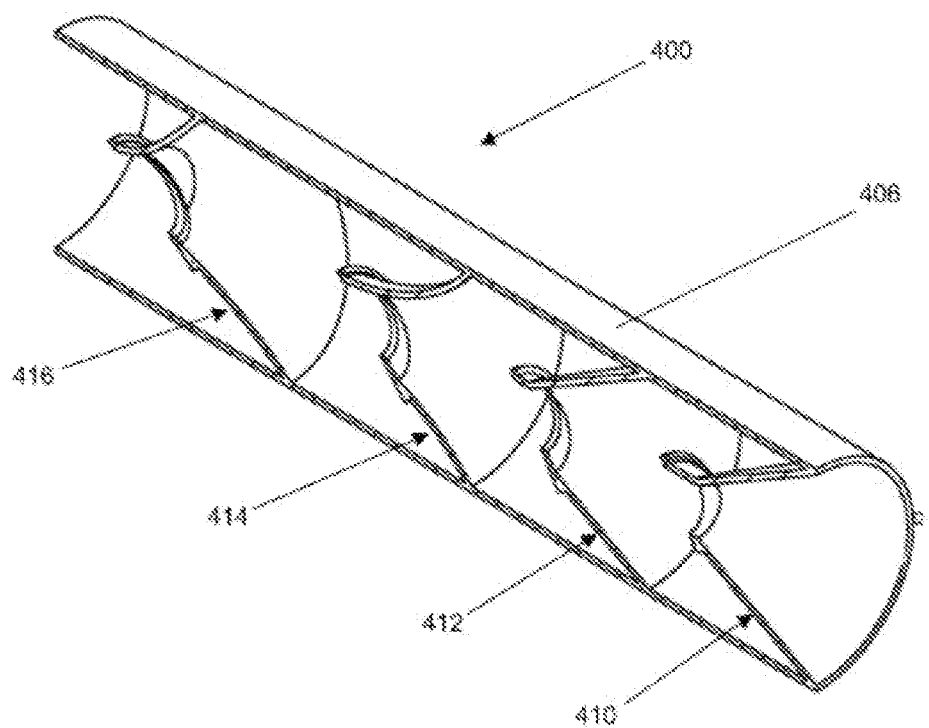
FIG. 50 is a view through section C-C shown in FIG. 47.
Figure 51:
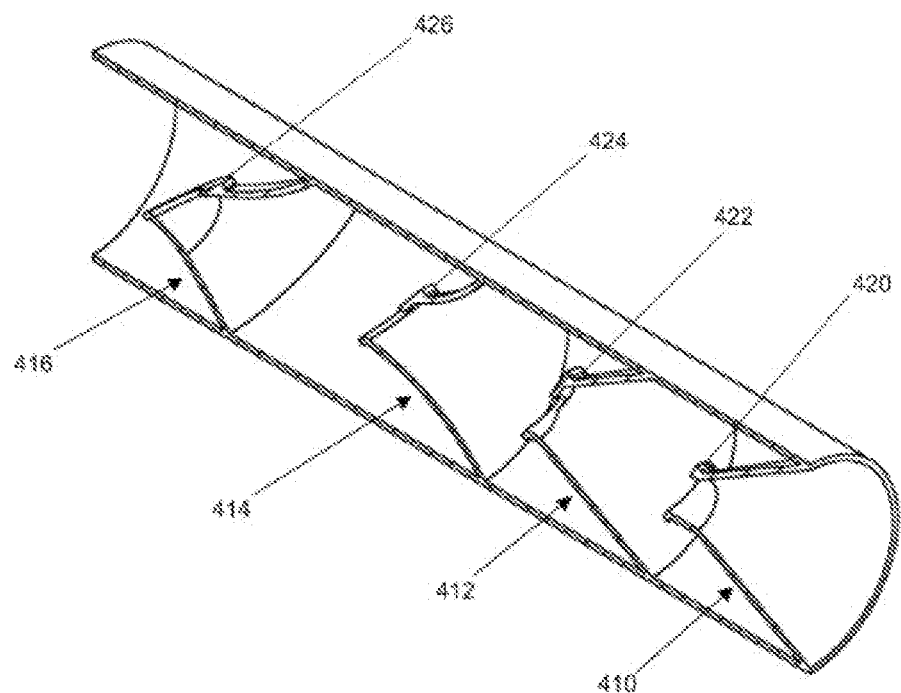
FIG. 51 is a view through section E-E shown in FIG. 47.
Figure 52:
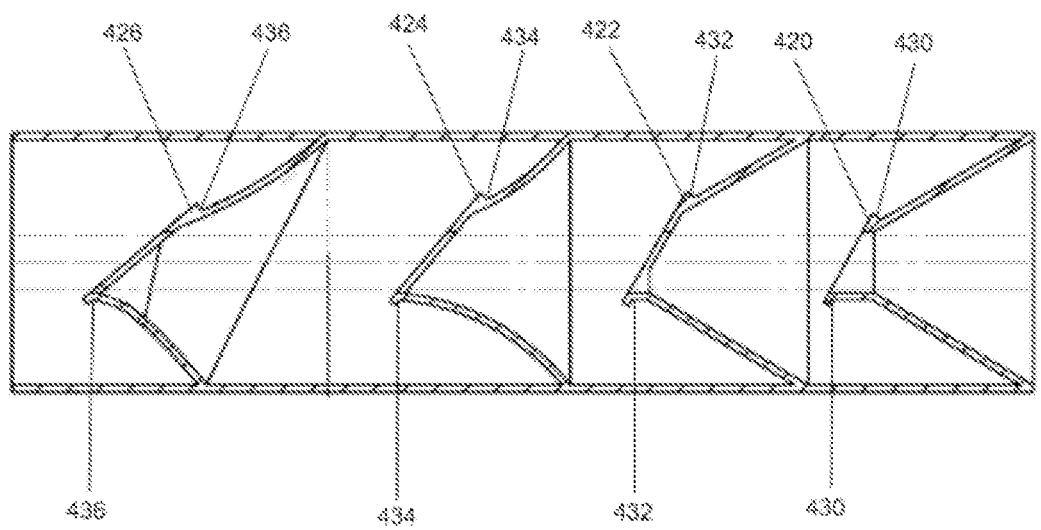
FIG. 52 is a view through section B-B shown in FIG. 47.
Figure 53:
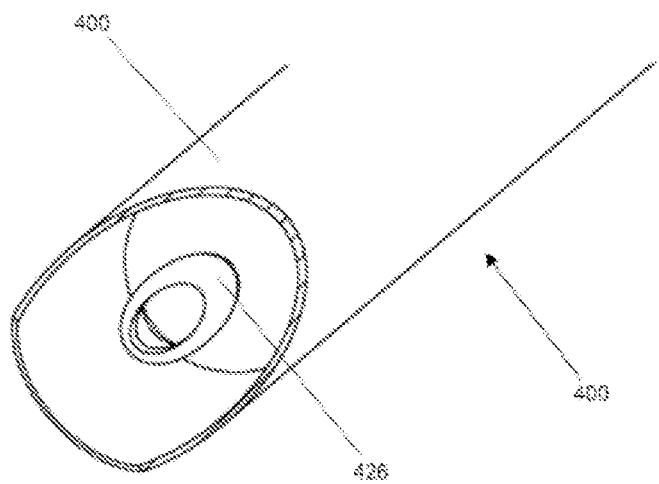
FIG. 53 is a view through section F-F shown in FIG. 47.
Figure 54:
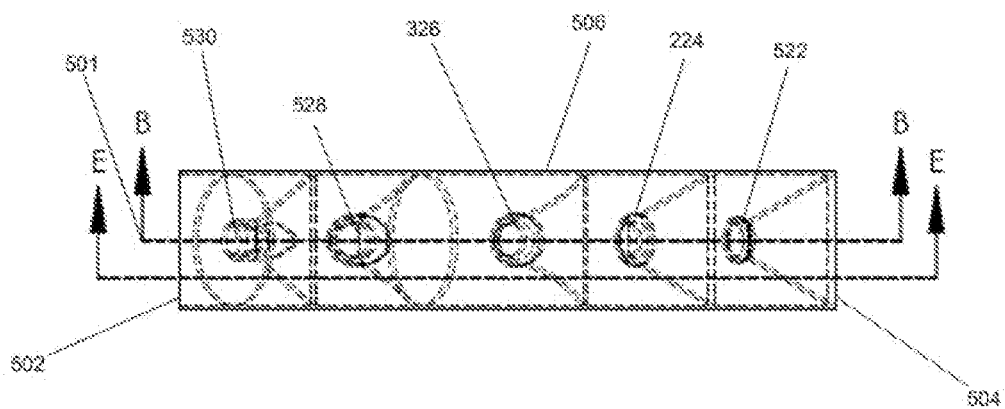
FIG. 54 is a look-through view of a suppressor according to an embodiment of the invention.
Figure 55:
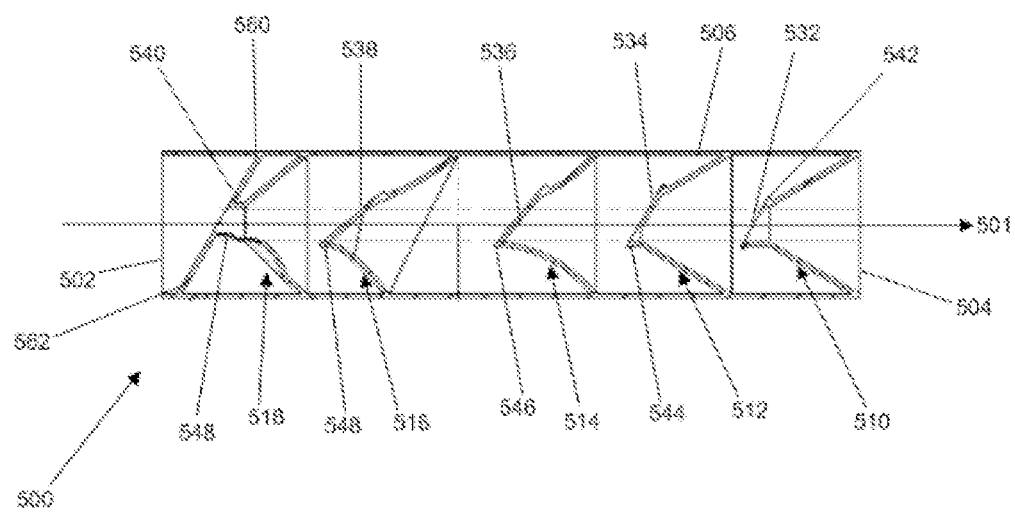
FIG. 55 is a view of through section B-B in FIG. 47.
Figure 56:
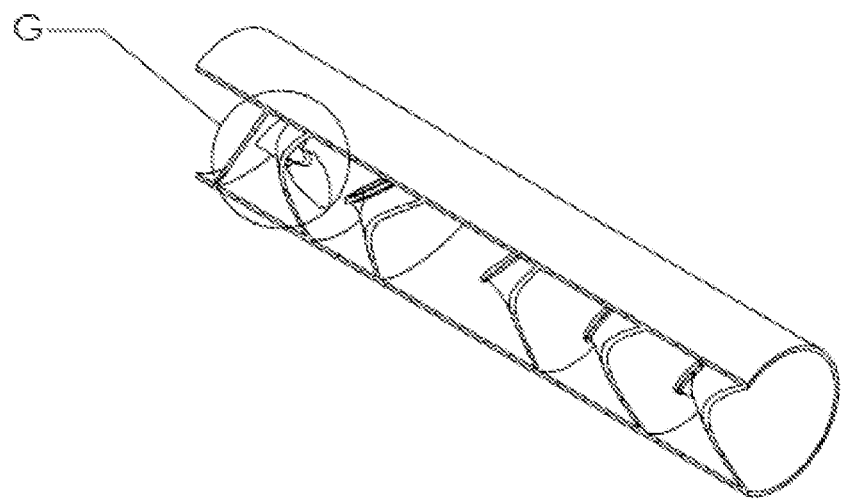
FIG. 56 is a view through section E-E in FIG. 47.
Figure 57:
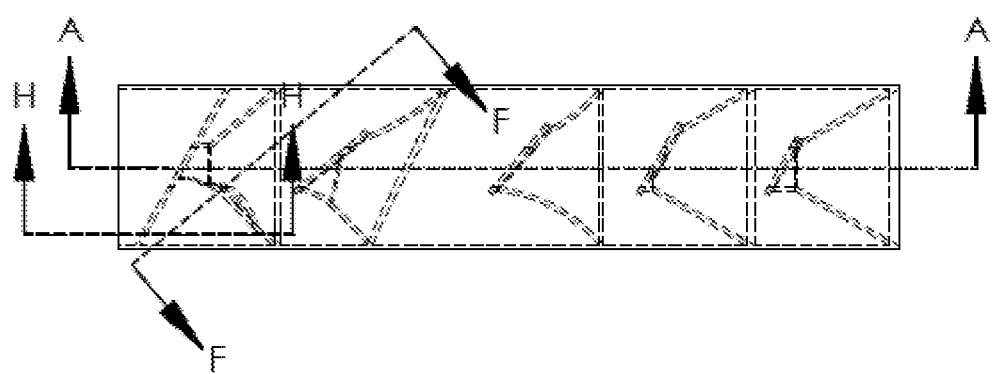
FIG. 57 is a side cross sectional view of the suppressor of FIG. 47.
Figure 58:
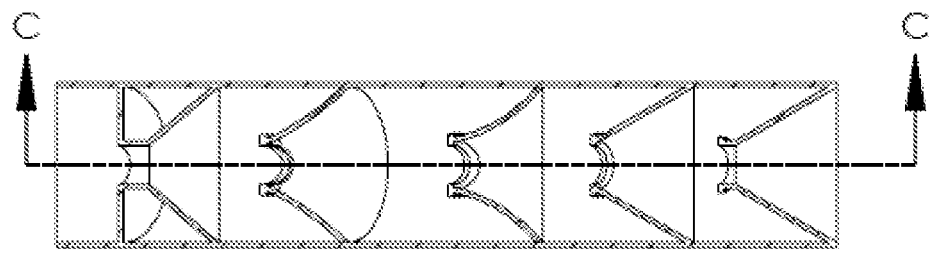
FIG. 58 is a view through section A-A in FIG. 57.
Figure 59:
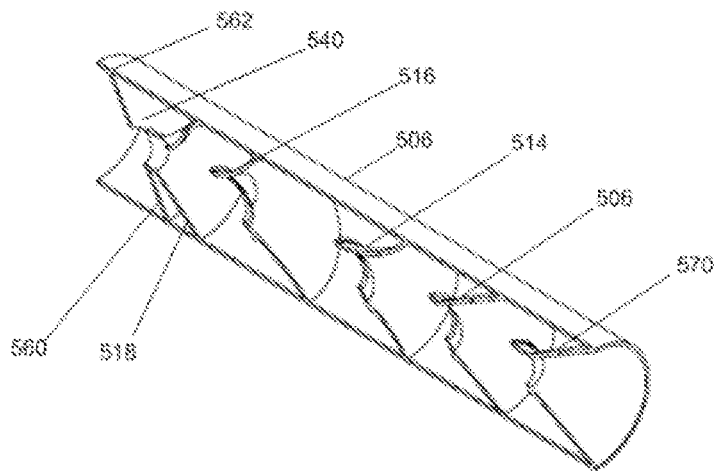
FIG. 59 is a view through section C-C in FIG. 58.
Figure 60:
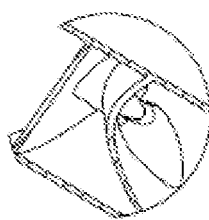
FIG. 60 is a view through section H-H in FIG. 57.
Figure 61:
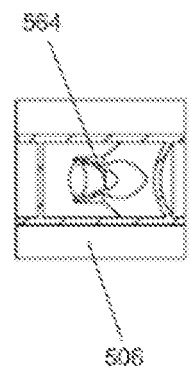
FIG. 61 is a view of section G in FIG. 56.
Figure 62:
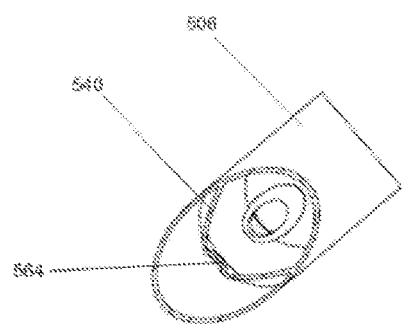
FIG. 62 is a view of section F in FIG. 57.
Figure 63:
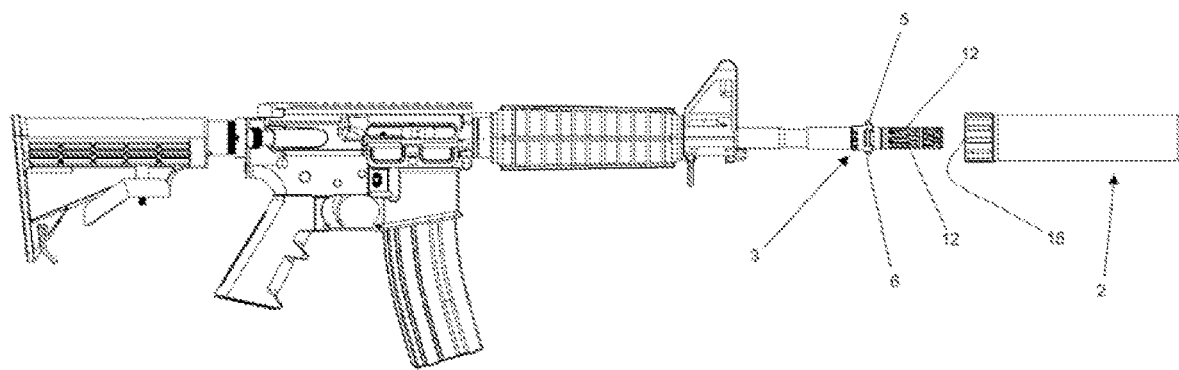
FIG. 63 is a side view of a gun and connection system according to FIGS. 15 to 27.
Figure 64:
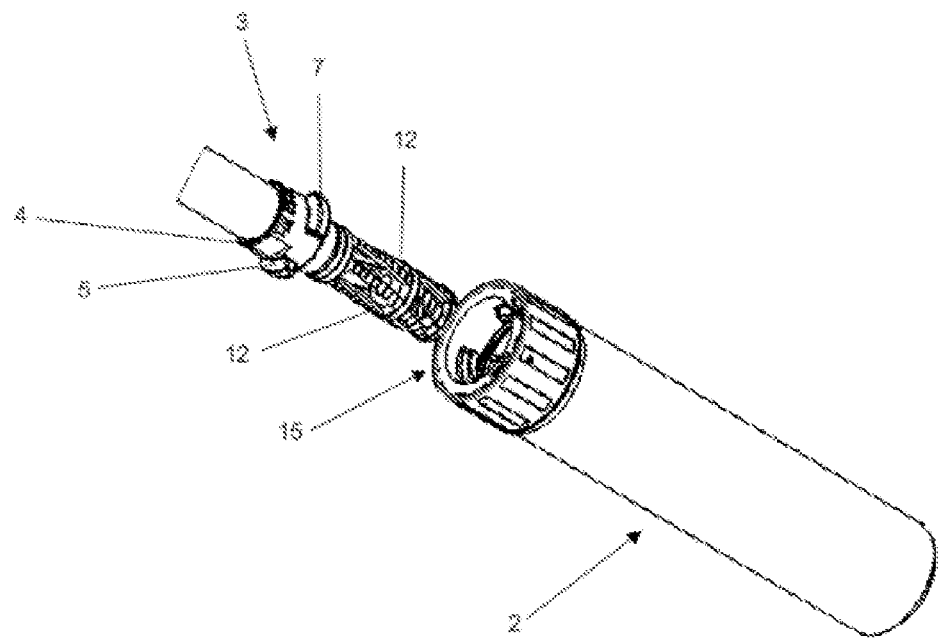
FIG. 64 is a close up perspective view of a section of FIG. 63.
Figure 65:
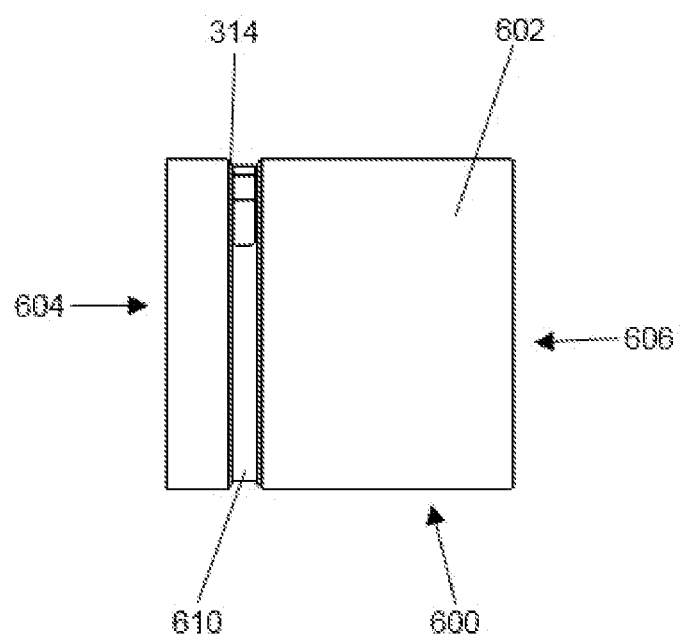
FIG. 65 is a side view of part of an alternate connection system according to an embodiment of the invention.
Figure 66:
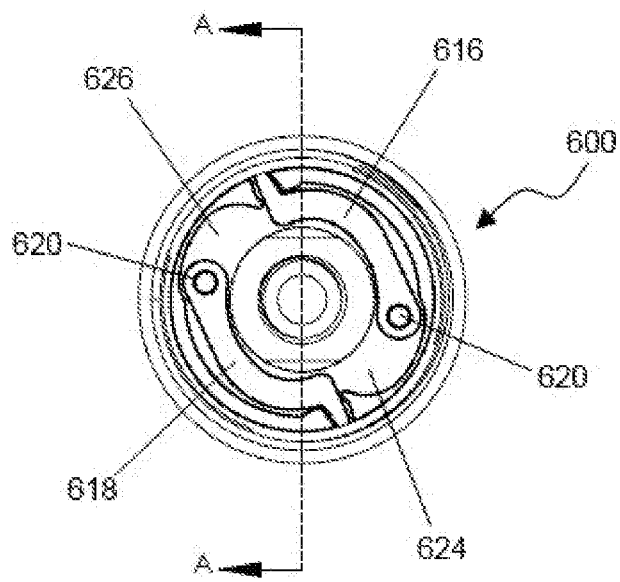
FIG. 66 is an end on view of the connection system of FIG. 65 in a release (unlocked) position.
Figure 67:
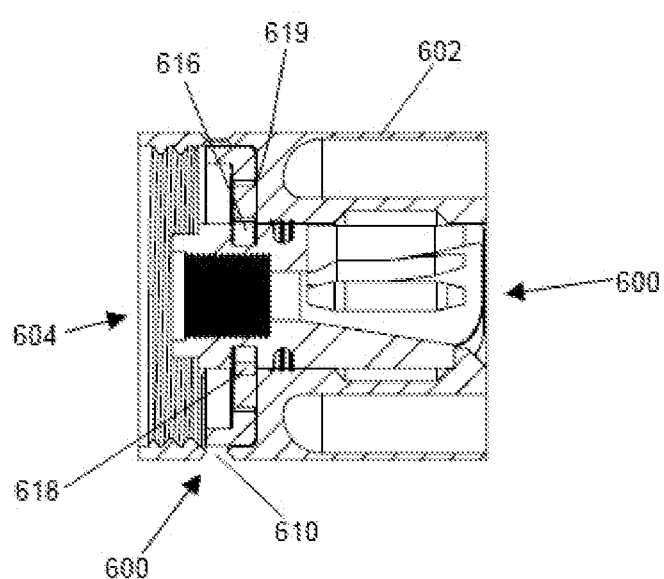
FIG. 67 is a view through section A-A in FIG. 66.
Figure 68:
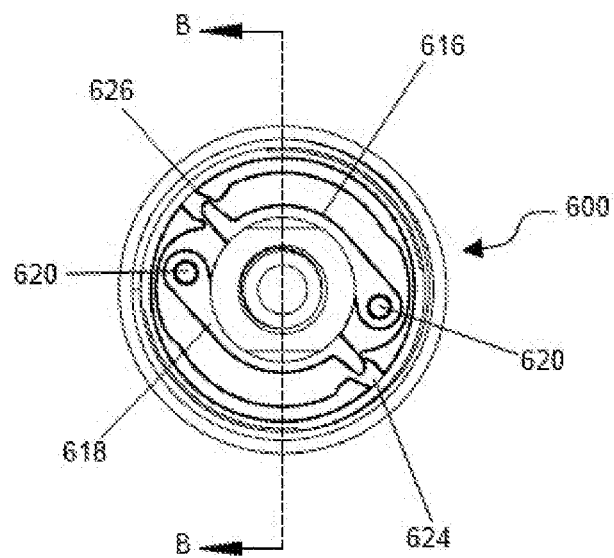
FIG. 68 is an end on view of the connection system of FIG. 65 in an engaged (locked) position.
Figure 69:
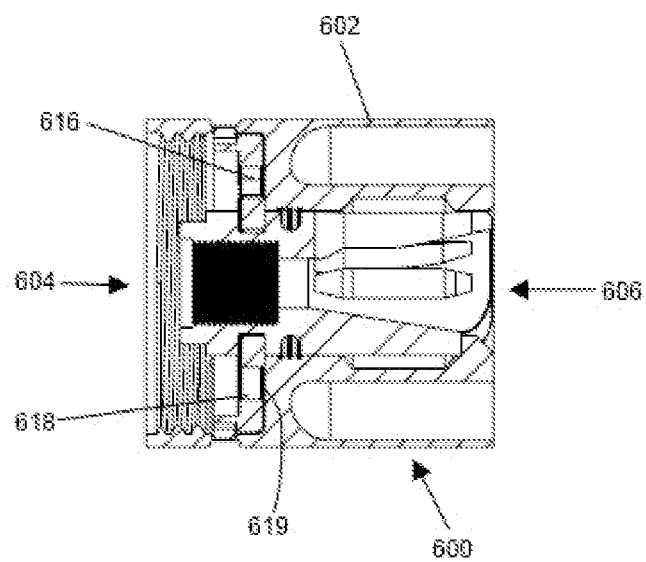
FIG. 69 is a view of section B-B in FIG. 68.
Figure 70:
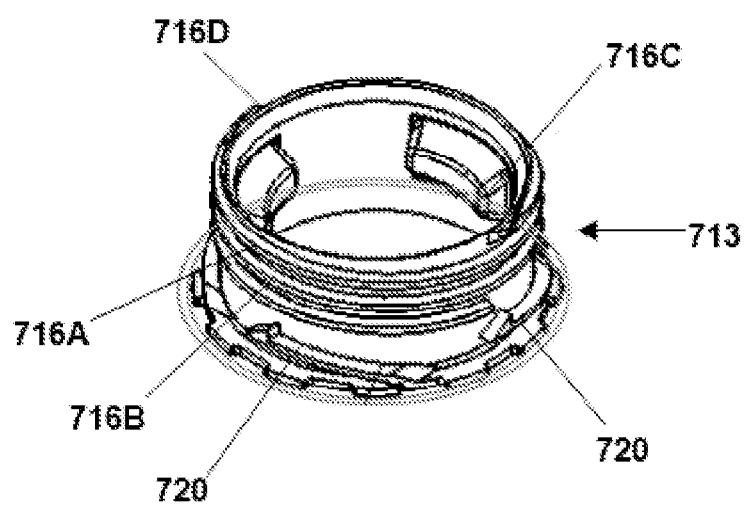
FIG. 70 is a first perspective view of a component of an embodiment of the invention.
Figure 71:
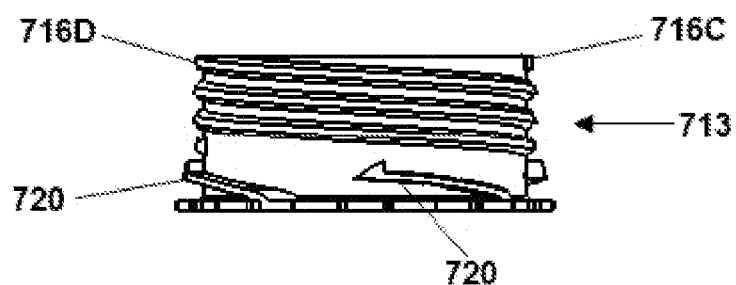
FIG. 71 is a first side view of FIG. 71.

This is best seen in FIG. 38, being a cross sectional view of the suppressor (400). The longitudinal axis of the suppressor (400) is indicated by line (401).

Each baffle (410-416) includes a table face (420-420). Each of the table faces (420-426) are non-perpendicular to the suppressor's longitudinal axis (401).

The orientation and configuration of the apertures (410-416) and the table faces (420-426) may assist in controlling expansion of gases within the suppressor (400). For instance, without being limited to a specific mechanism, the inventor postulates that the orientations of these components may assist in directing expansion of gases created on firing a gun. This may cause or promote the gases to preferentially expand within the suppressor (400) towards first end wall (402) than second end wall (404).

Alternatively, the table faces (420-426) may provide additional structure within the suppressor (400) to hinder or otherwise control expansion of gases therein.

Each table face (420-426) extends from a neck section (430-436) respectively. The neck sections (430-436) may assist in forming the table faces (420-426) in desired orientations using laser metal sintering techniques.

The neck sections (430-436) provide a transition from baffles side walls. The baffles (410-416) are curved, and generally have the shape of a truncated and twisted cone.

Alternate Baffle Structure

Referring now to FIGS. 40 to 48 showing an a suppressor (500) according to an embodiment of the invention.

The suppressor (500) has a composite internal baffle structure with both non-symmetrical and slant baffles.

The suppressor (500) is a substantially cylindrical body defined by a first end wall (502), a second end wall (504), and at least one side wall (506).

The suppressor (500) includes a pathway there through to enable a bullet to travel through the suppressor from first end wall (502) and exit therefrom through an aperture in the second end wall (504).

The suppressor (500) may also include a fastener half (not shown in the Figures) to secure the suppressor (500) to a gun barrel (not shown). The fastener half may be any known fastener mechanism, or the connection system described herein with reference to FIGS. 1-24.

The suppressor (500) is substantially hollow, having a cavity therein. The cavity however is divided into a series of compartments defined by the baffles (510-516).

The baffles (510-518) are non-symmetrical. In addition, each baffle (510-518) includes an aperture (522-530) which is aligned with the apertures in the end walls (502, 504). This facilitates a bullet travelling through the suppressor (500).

The baffles (510-518) are formed integrally to an inner surface of the suppressor (500). This may be achieved using the techniques discussed in the applicant's co-pending New Zealand Patent Application No. 619475.

Each aperture (522-530) is non-perpendicular to the longitudinal axis of the suppressor. This is best seen in FIG. 38, being a cross sectional view of the suppressor (500). The longitudinal axis of the suppressor (500) is indicated by line (501).

Each baffle (510-518) includes a table face (532-540). Each of the table faces (532-540) is non-perpendicular to the suppressor's longitudinal axis (501).

The orientation and configuration of the apertures and the table faces (532-540) may assist in controlling expansion of gases within the suppressor (500). For instance, without being limited to a specific mechanism, the inventor postulates that the orientations of these components may assist in directing the gases. This may cause or promote the gases to expand within the suppressor (500) towards the first end (502 preferentially over second end (504).

Alternatively, the table faces (532-540) may provide additional structure within the suppressor (500) to hinder or otherwise control expansion of gases therein.

Each table face (532-540) extends from a neck section (542-548) respectively. The neck sections (542-548) assist in forming the table faces (532-540) in desired orientations using laser metal sintering techniques.

Neck sections (542-548) extend from baffles (510-518). The baffles are curved, and generally have the shape of a truncated and twisted cone.

Table face (540) provides a slant baffle that extends from the neck section ( ). The table face (540) is formed integrally to an inner surface of side wall (506), for instance at points (560, 562).

A scoop (564) may be formed into baffle wall (570). The scoop (550) may assist with directing expansion of gas in the suppressor (500) to preferentially occur within a chamber (552), rather than a chamber (504).

Muzzle Brake

Referring now to FIGS. 10A-10E showing views of a muzzle brake (70) according to an embodiment of the invention.

The muzzle brake (70) is formed using LMS techniques according to the present inventions and using the method described with reference of FIGS. 7 and 8. All components of the muzzle (70) brake are formed integrally to each one other component.

The muzzle brake (70) includes a screw thread (71). A fastener half forming part of a quick connect is provided by a plurality of detents (72) that extend outwardly from a surface (77) of the muzzle brake (70).

The detents (72) are configured to sit within corresponding slots (73) in a suppressor (74) according to the present invention. Interaction between the detents (72) and the slots (73) secures the muzzle brake (70) and therefore a gun (not shown) to the suppressor (74).

The muzzle brake (70) includes a first stage indicated by (75) and a second stage indicated by (76).

The first and second stages assist in controlling expansion of the gas forming a blast wave on firing of the gun (not shown). The first and second stages each comprise a plurality of slot apertures, which extend along the length of the muzzle brake (70). Each of the apertures is orientated so as to define a "twist".

The orientation of the twist is chosen to be orientated opposite the rotation of the gasses and spin created by firing a gun with which the suppressor (74) will be used. This helps to tighten the device onto the gun.

To the inventor's knowledge it was not previously possible to manufacture a suppressor having a quick connect inside an overlap channel. This is because prior art manufacturing techniques were not capable of forming a fastener half of a quick connect at the necessary location. As a result, there is a unique advantage provided by use of LMS techniques to manufacture a suppressor according to the present invention.

However, it was not a straight forward process to design and build a muzzle brake in a suppressor using LMS techniques. The inventor solved the problems which prevented manufacture of these products using the inventions described herein. Therefore, the present inventions enabled LMS manufacturing techniques to be utilised in a new and previously unknown application. Accordingly, the inventions facilitate providing an easier way to connect a gun and suppressor together, while allowing a deep over-barrel design yet still controlling the expansion of gases.

It should also be appreciated that designing of the muzzle brake and quick connect to be manufactured by LMS techniques was not straight forward, and a number of issues had to be resolved.

Quick Connect Connection Systems

First Embodiment of a Quick Connect

Referring now to FIGS. 10A-10E, 11A and 11B. The muzzle brake (70) includes detents (72) forming part of a quick connect.

In embodiments where the suppressor (74) is to include a quick connect then a fastener half of the quick connect is formed into the suppressor (74).

In the embodiments shown in the Figures, the fastener half is formed by slots (73) in a lip (76) that is formed integrally. However, other positions for the slots (73) are possible provided that these will align with the detents (72).

Each of the slots (73) includes a spring biased ball bearing (not shown in the Figures).

Figure 11A:
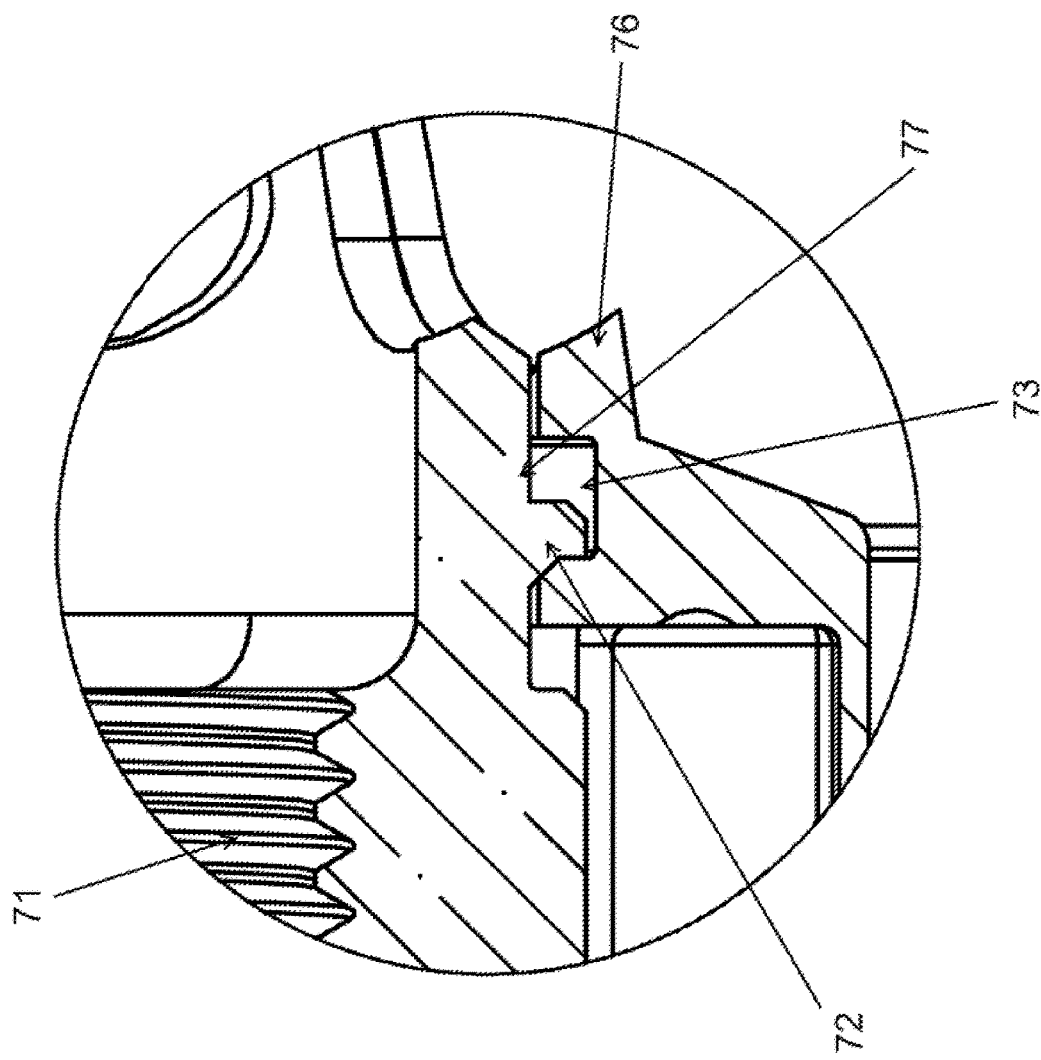
FIG. 11A is a view showing position of fastener halves of a quick connect prior to engagement.
Figure 11B:
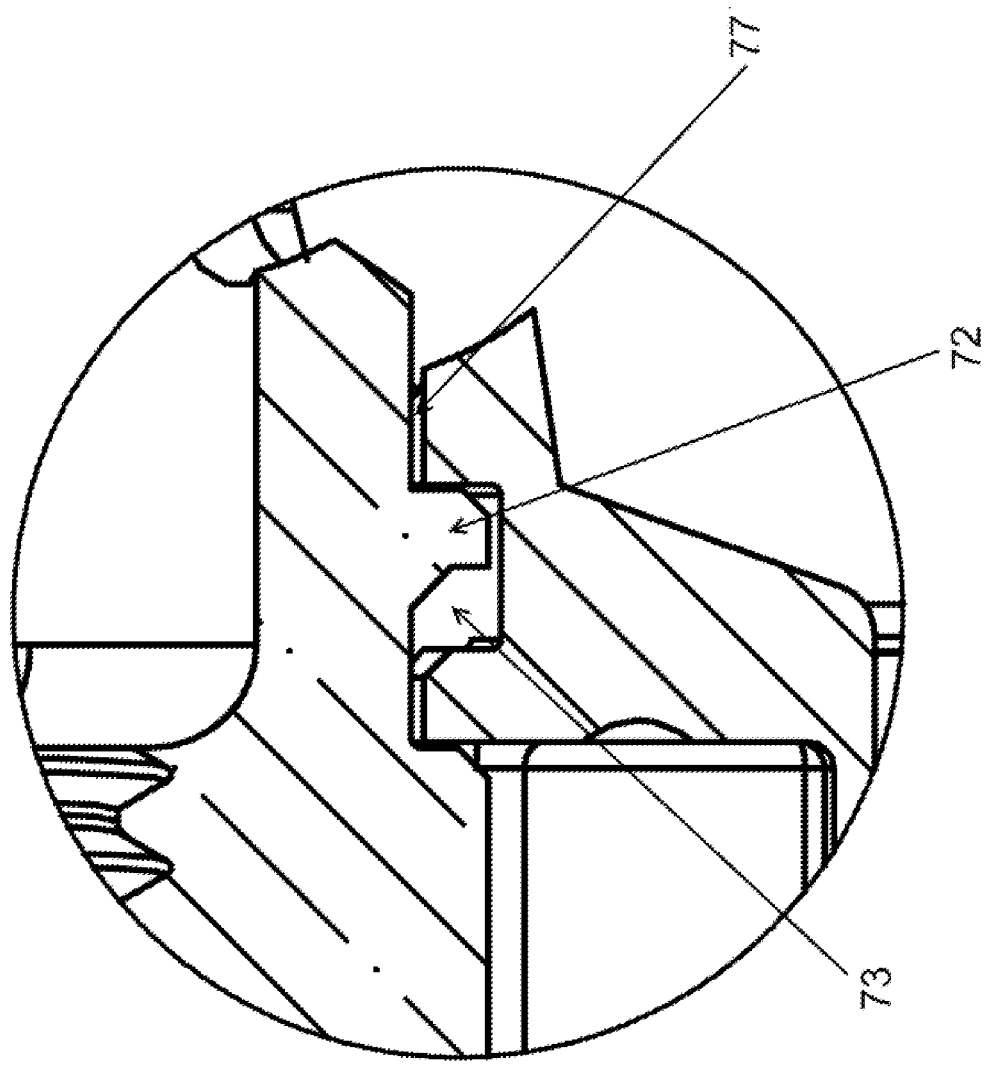
FIG. 11B is a view of FIG. 11A showing position of fastener halves of a quick connect in an engaged position.

The spring biased ball bearing is positioned within the slot (73) such that when the detents (72) are positioned within the slots (73), the suppressor (74) and muzzle brake (70) can be moved rotatably with respect to each other. This causes the detents (not shown) to slide within slots (73) and into a locking position. The locking position is shown in FIG. 11A. In the locking position, each spring biased ball bearing (not shown) bears against an edge of a detent (not shown). This provides resistance force to detents (72) moving within slots (73). Therefore, the spring loaded ball bearing secures the muzzle brake (70) and suppressor (74) with respect to each other.

However, the spring is not so strong that it cannot be overcome by force applied by a user that causes the muzzle brake (70) and/or suppressor (74) to rotate with respect to each other.

The non-locking position is shown in FIG. 11A. In this, the spring loaded ball bearing (not shown) does not bear against detents (72). Therefore the detents (72) can be moved from the slot (73) so as to separate the muzzle brake (70) in the suppressor (74).

First Alternate Embodiment of a Quick Connect

Referring now to FIGS. 15 to 27 showing a connection system indicated generally by (700), and which is configured to provide a quick connect to secure a gun (not shown in FIGS. 15 to 27) to a suppressor (710).

The connection system (700) includes a first connector half in the form of a muzzle brake indicated as (707). The muzzle brake (703) includes a body (704) that has in general a cylindrical shape and is hollow.

Protrusions (705, 706, and 707) extend from the outer surface of the body (704). Each protrusion (705-707) has a first surface (705A, 705B, 705C) and a second surfaces (705A, 705B, 705C) respectively. The first surfaces (705A, 705B, 705C) provides a front face, being the face which is distal to the gun in use. The second surfaces (5B, 6A, 7B) provides a rear face being the face which is closest to the gun in use.

The body (704) includes an aperture (708) configured to receive an end of a gun barrel (not shown in the Figures). An internal screw thread (710) inside the body (704) is configured to engage with a corresponding screw thread on the gun barrel (not shown in the Figures). The engagement of the screw threads secure the muzzle brake (703) to the gun.

A section (711) of the body (704) includes a radially spaced aperture (712). The apertures (712) are orientated to generally extend along the length of the body (704).

The apertures (712) are also orientated so that they twist around the circumference of the body (704). The orientation of the twist is selected to be counter (opposed) to the direction of the screw thread (710). Thereby, the apertures (712) may provide resistance to assist in preventing the muzzle brake (703) loosening from the gun barrel during use.

Figure 24:
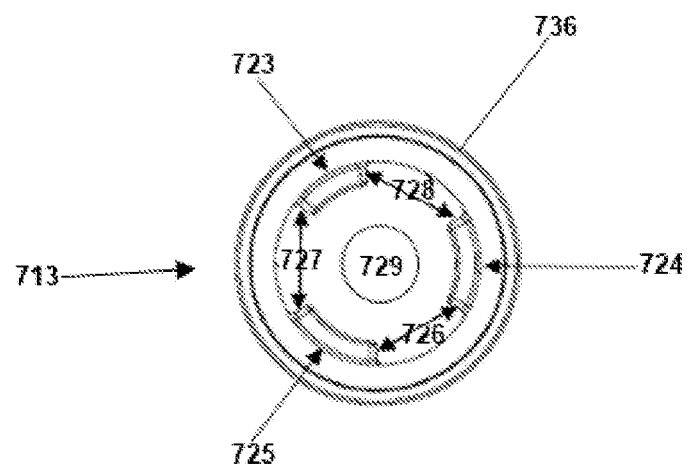
FIG. 24 is a view through detail K-K shown on FIG. 23.
Figure 25:
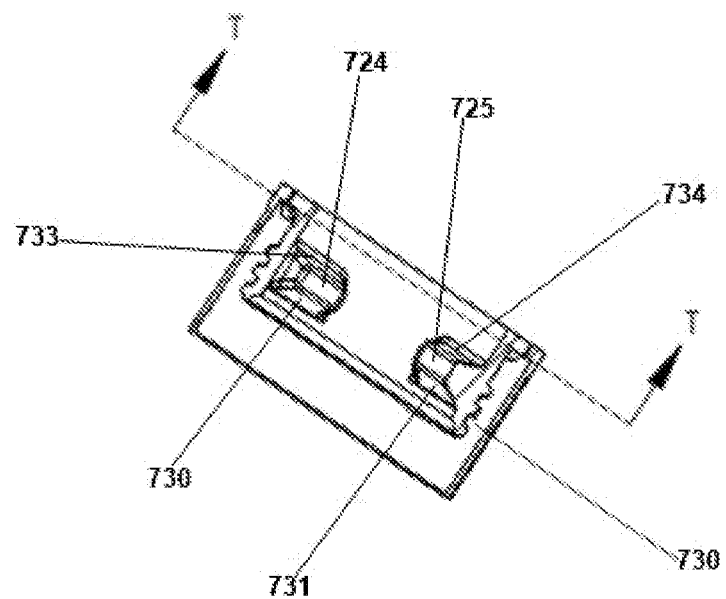
FIG. 25 is a view through section R-R shown in FIG. 20.
Figure 26:
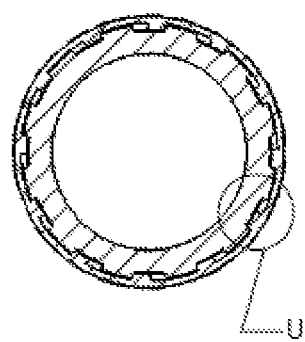
FIG. 26 is a view through section T-T shown in FIG. 25.

The connection system includes a second connector half that comprises a first component (713) and a second component, which is indicated as (714) in FIG. 24.

The first component (713) includes radially spaced flanges (723, 724, 725) as are best shown in FIG. 24.

The separation between side edges of the flanges (723, 724 and 725) define channels (726, 727, and 728). The channels (726-728) have a shape corresponding to protrusions (705-707) on the muzzle brake (703). Therefore, inserting the section (711) through the aperture (729) enables the protrusions (705-707) to be passed through the channels (726-728).

The flanges (723-725) have an outer surface (730, 731, 732) respectively and an inner surface (733, 734 and 735) respectively.

The first component (713) has a body (718) having a circular aperture (729) there through. An external screw thread (719) is formed on the body.

Figure 18:
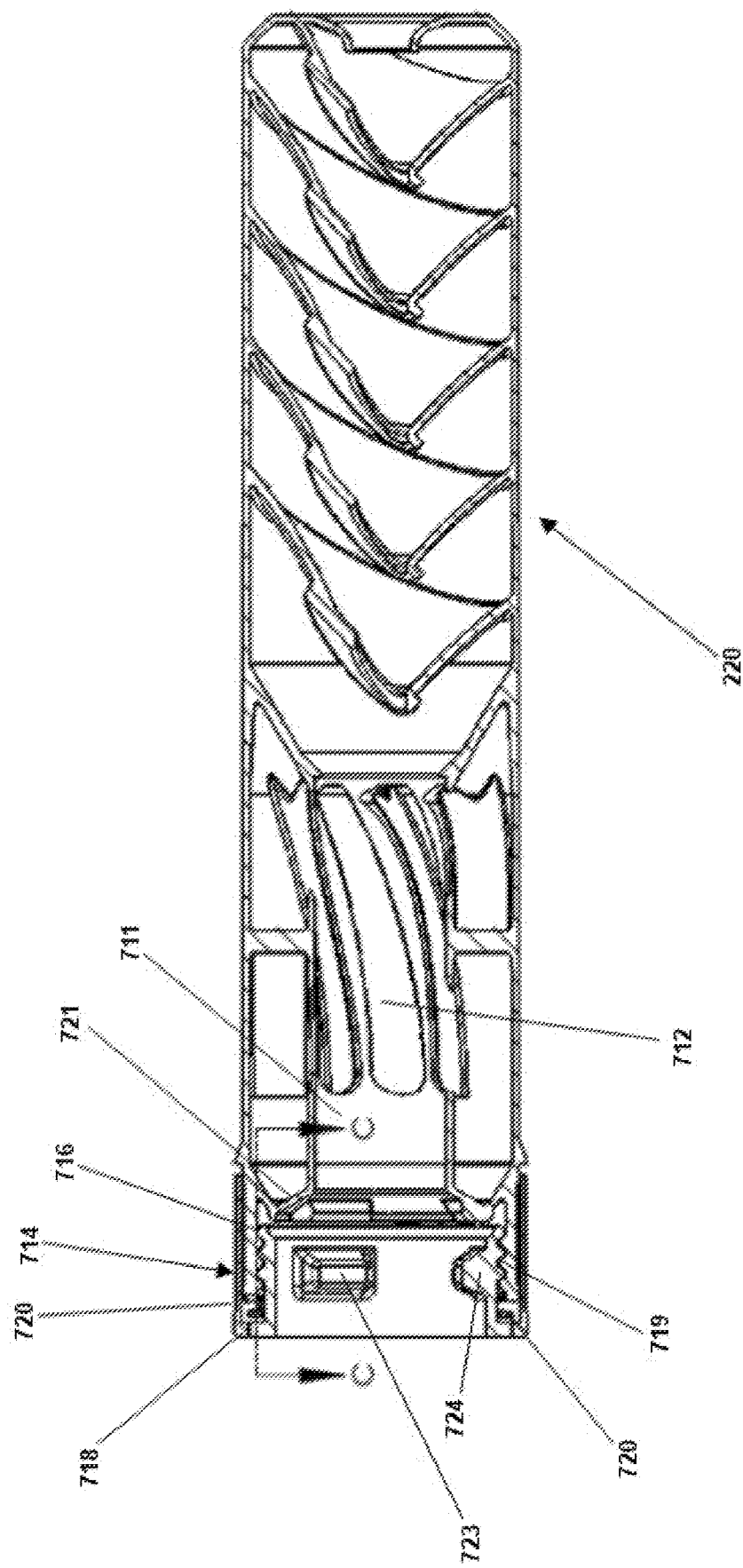
FIG. 18 is a cross sectional view of FIG. 17.
Figure 19:
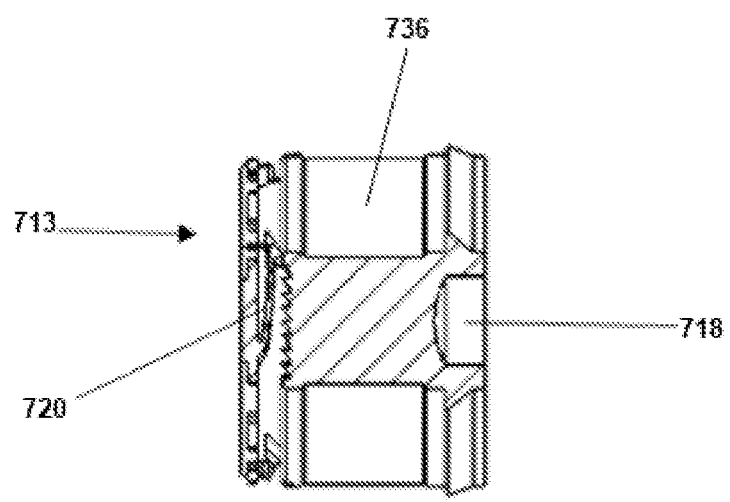
FIG. 19 is a line through section C-C shown in FIG. 18.
Figure 20:
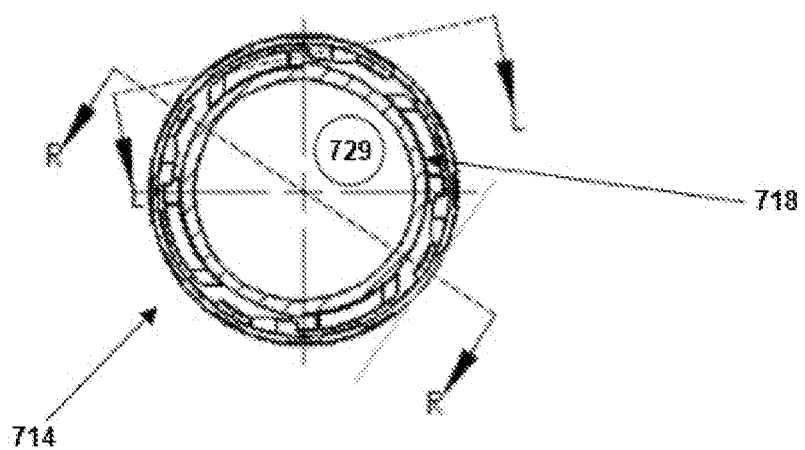
FIG. 20 is an end view of component of a connection system according to an embodiment of the invention.
Figure 21:
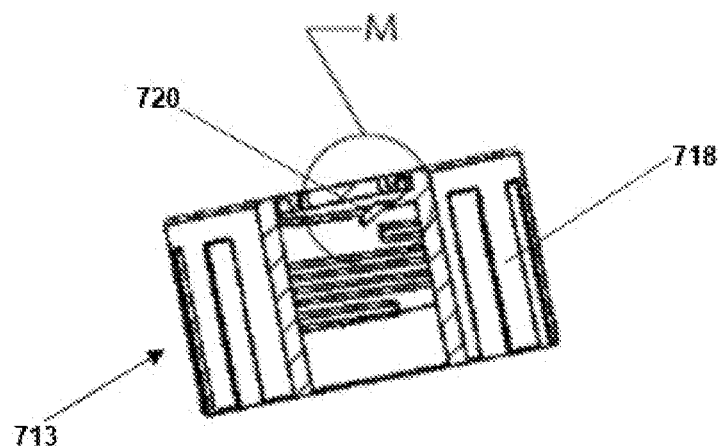
FIG. 21 is a view through section L-L shown in FIG. 20.
Figure 22:
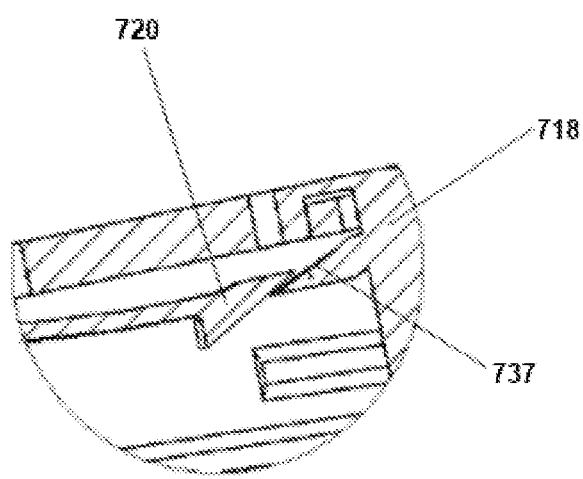
FIG. 22 is a close up view of detail M shown in 21.
Figure 23:
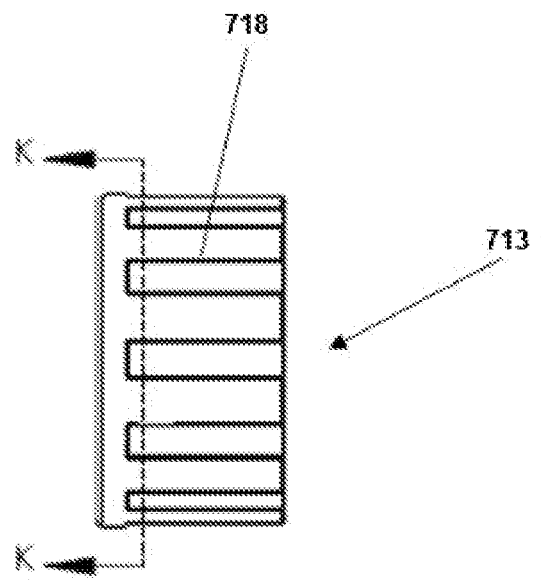
FIG. 23 is a side view of FIG. 20.

The second component (714) includes an aperture (715). Therefore, the section (711) can be inserted through the aperture (715) so as to be positioned inside the suppressor (702). This position is as shown in FIG. 18.

An internal screw thread (716) is formed integrally the suppressor (702) towards the opening (715). Ratchet teeth (717) are formed inside the suppressor (702) immediately inside aperture (715). The ratchet teeth (717) extend around the entire circumference of aperture (715).

The screw threads (719, 716) are reverse screw threads. Therefore, rotation of the first component (713) in an anti-clockwise direction when viewed from the orientation of FIG. 6 will cause the screw threads (716, 719) to engage each other so to secure the first component and second component (713,714) together. Rotation of the first component (713) in an anti-clockwise direction as viewed in FIG. 20 will cause the screw threads (716, 719) to disengage to release the first component (713) from the second component (714).

The first component (713) includes at least one ratchet member (720). The ratchet member (720) is integrally formed to the second component. This forms a biasing element which is configured to urge the ratchet member (720) towards a position in which it will engage ratchet teeth (717) when screw threads (716, 179) engage each other. The engagement of one or more of the teeth (717) by the at least one ratchet member (720) provides resistance to rotation of the first component (713) and the second component (714).

However, the ratchet member (720) can be moved to a release position in which it disengages ratchet teeth (717) to thereby allow rotation of the first and second components (713, 714) with respect to each other.

The second component (714) has a plurality of protrusions (780-782). The protrusions (780-782) define recesses (783-785). The recess (783-785) have a shape which each corresponds to the shape of one of the protrusions (705, 706 or 707).

An aperture (722) in the second component (714) enables the section (711) to be moved past the bearing surface (721) to be disposed inside the suppressor (702).

The first component (713) includes a bearing surface (721). The bearing surface (721) is a section of a cone that is concentric with the suppressor (702).

The bearing surface (721) provides an angled surface against which the surfaces (705A, 706A, 707A) of the protrusions bear when the connection system (700) is assembled.

The inner surfaces (733-735) provide clamping surfaces which in use cooperate with bearing surface (721).

In addition, the outer surfaces (730-731) provide clamping surfaces which in use cooperate with second surfaces (705B, 706B, 707B).

The second surfaces (705B, 706B, 707B) are not perpendicular to the longitudinal axis of the muzzle brake (703). Preferably, the second surfaces (705B, 706B, 707B) are at angle in the range of 15°-65°, and more preferably 45° to the longitudinal axis of the muzzle brake (703).

In addition, the inner surfaces (733-735) are at an angle to the longitudinal axis of the suppressor. The angle substantially corresponds to the angle of the second surfaces (705B, 706B, 707B). This may facilitate the inner surfaces (733-375) providing a clamping force against the second surfaces (705B-707B). This may be beneficial to facilitate an efficient clamping action for the connection system (1).

Referring now to FIGS. 70-73.

The first and second components (713, 714) may have double helix screw threads. That is, each screw thread (718, 719) may be formed from a pair of intertwined screw threads, which may be generally described as a double helix. The screw threads are labeled as (716A, 716B) and (719A, 719B) respectively.

Each screw thread (716A, 716B, 719A, 719B) has a start point (716C, 716D) and (719C, 719D) respectively. The start points (716C, 716D) and (719C, 719D) are positioned at distal sides of the apertures. That is, the start points (716C, 716D) and (719C, 719D) are 180° apart.

The use of double helix screw threads increases the surface area contact between the first component (713) and the second component (714) when the screw threads are engaged. As a result, the first component (713) and the second component (714) can be secured to each other with fewer rotations of the screw threads, whilst still achieving a desired surface area contact between the two components.

The connection system (700) can be used to secure a gun (not shown) to the suppressor (702). To do so, the muzzle brake (703) is first secured to the gun (not shown) using screw thread (710). The first component (713) is secured to the suppressor (702) by inserting body (718) into aperture (715). The first component (713) and suppresser (702) are rotated with respect to each other so as to cause the screw threads (716, 719) to engage each other. In doing so, ratchet teeth (717) are engaged by ratchet member (720).

Section (711) is inserted through aperture (729), body (718), and aperture (722). The section (711) is therefore disposed inside the suppressor (702). In doing so, the protrusions (5-7) pass through the channels (726-728). The protrusions are inserted into the recesses.

The first component (713) is rotated with respect to the muzzle brake (703). This causes the protrusions (705-707) to be brought out alignment with the channels (725-727). In other words, the channels (725-727) rotate and therefore the protrusions are no longer completely aligned with the channels (725-727).

The inner surfaces (733-735) each lie on a plane that is obtuse to a plane on which the bearing surface (721) lies. Accordingly, as the first component (713) is rotated with respect to the muzzle brake (703) and also therefore the second component (714), the inner surfaces (733-735) and bearing surface (721) interact to clamp the protrusions (705-707).

When rotation of the first component (713) is stopped, the ratchet member (720) engages at least one of the ratchet teeth (717) to which it is adjacent. Accordingly, the ratchet member (720) and ratchet teeth (717) prevent the second component (714) and the muzzle brake (703) from rotating with respect to each other. The ratchet provides a locking mechanism to prevent inadvertent misalignment of the suppressor (702) with the muzzle brake (703) and thereby also with the gun.

Having a plurality of radically spaced protrusions e.g., at least two or preferably three protrusions, may assist to more evenly distribute clamping force.

To release the suppressor (702) from the muzzle brake (703) a disengagement mechanism is used.

In the embodiment of FIGS. 15 to 20, 72 and 73, the disengagement mechanism is provided to the second component (714) in the form of a ring (736). The ring (736) can rotate with respect to the second component through approximately 45 to 180 degrees, and preferably 60 degrees.

The ring (736) includes a protrusion (737) per ratchet member (722). Rotation of the ring (736) with respect to the body (718) causes each protrusion (737) to contact an end (720A) of a ratchet member (720). The contact moves the at least one ratchet member (720) to a position in which it disengages any ratchet teeth (717) with which it may have been engaged.

Figure 72:
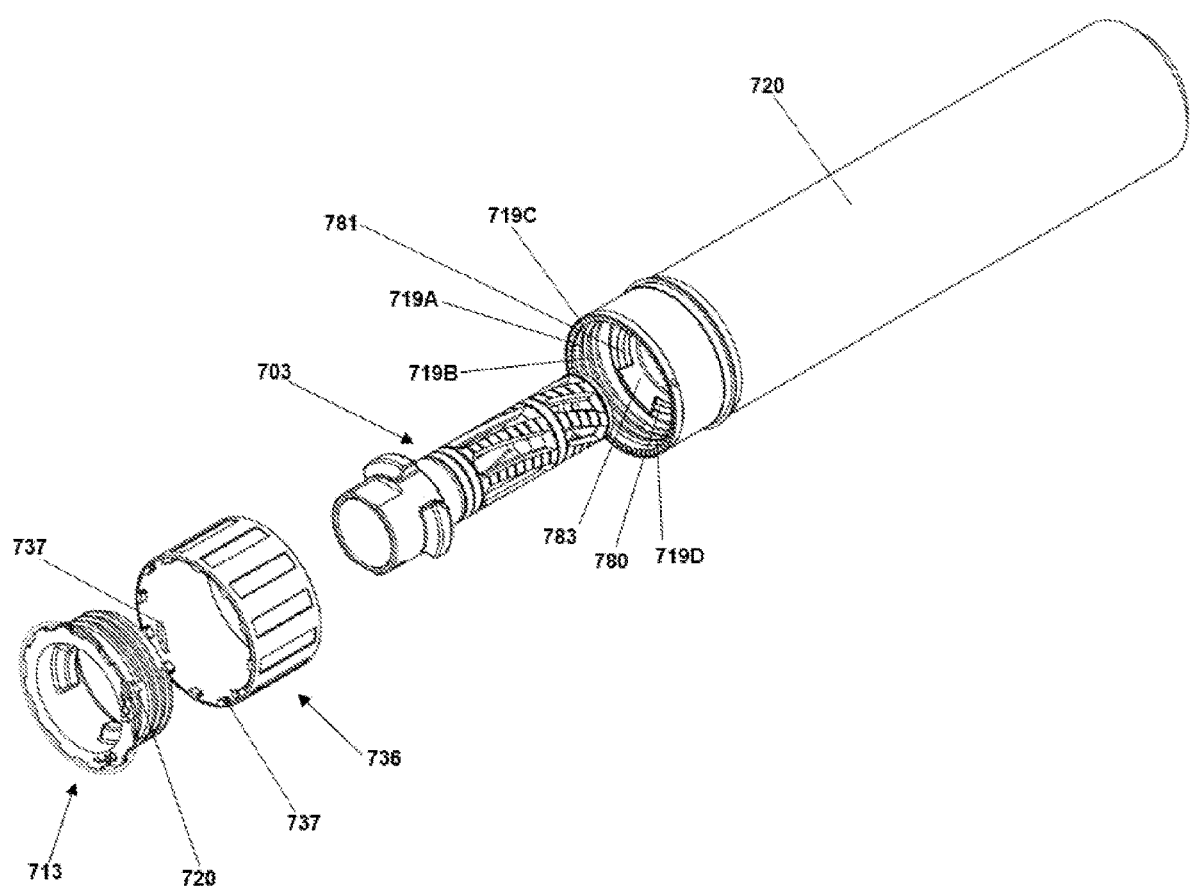
FIG. 72 is a first exploded perspective view of the components of an embodiment of the invention.
Figure 73:
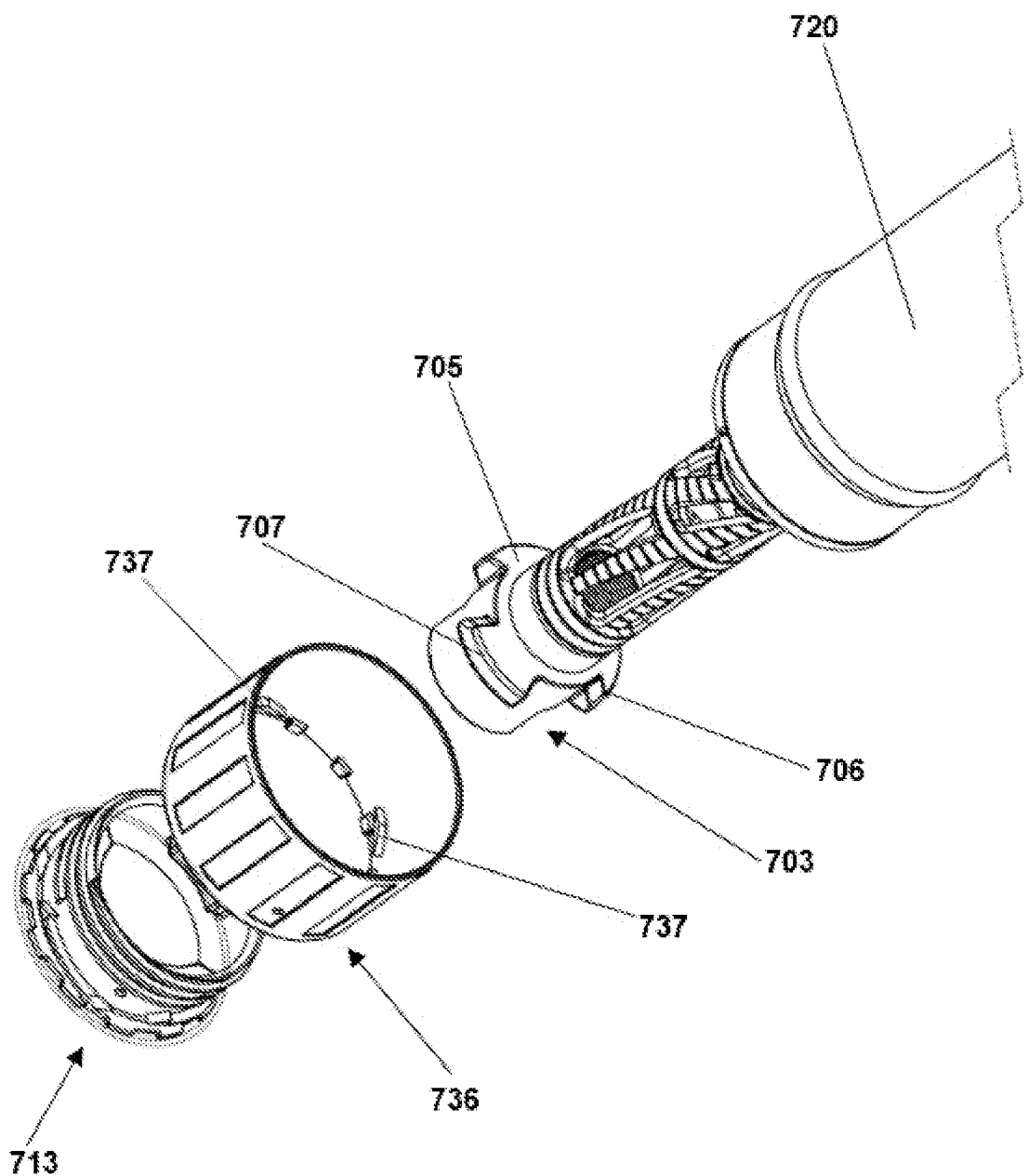
FIG. 73 is a second perspective view of FIG. 73.
Figure 74:
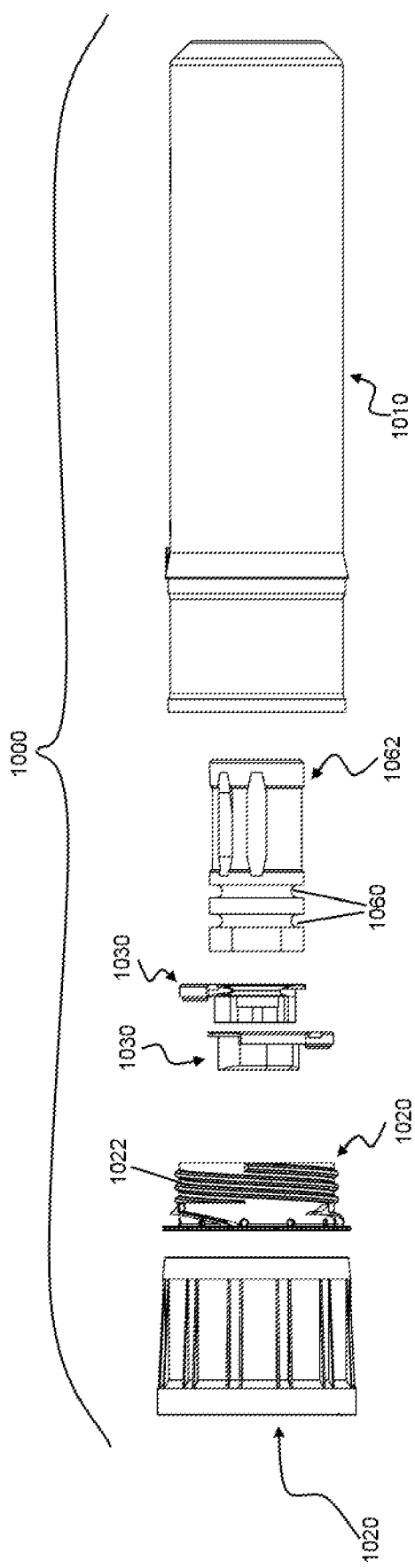
FIG. 74 is an exploded view of a connection system according to an embodiment of the invention.
Figure 75:
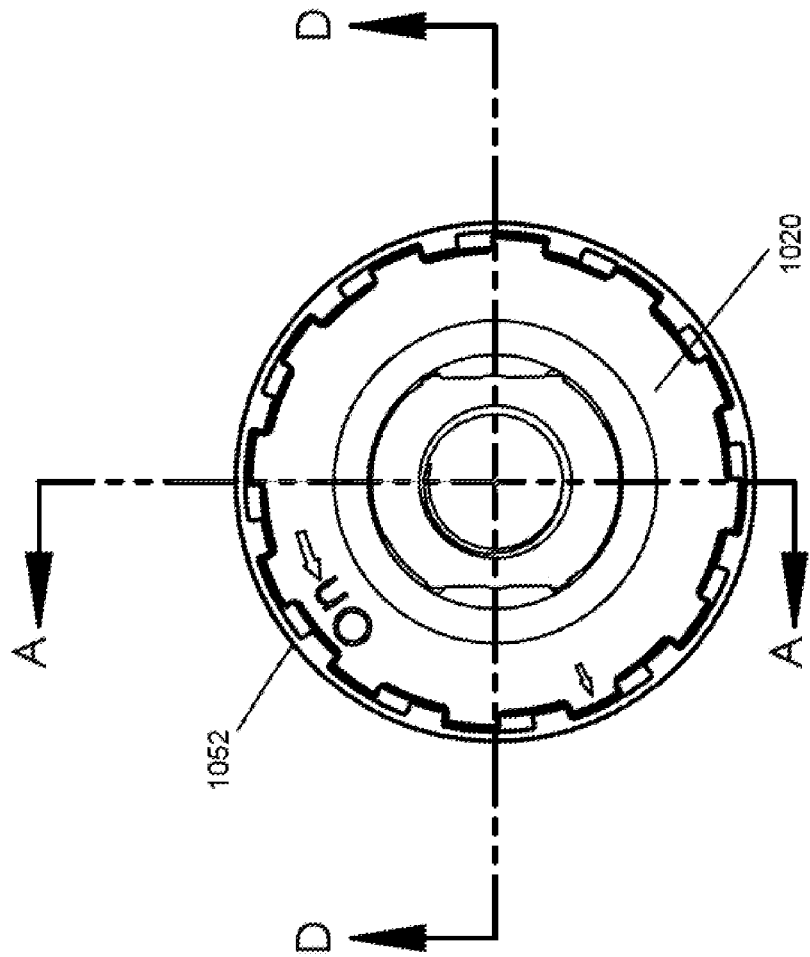
FIG. 75 is an end on view of an assembled connection system according to the embodiment of FIG. 74.
Figure 76:
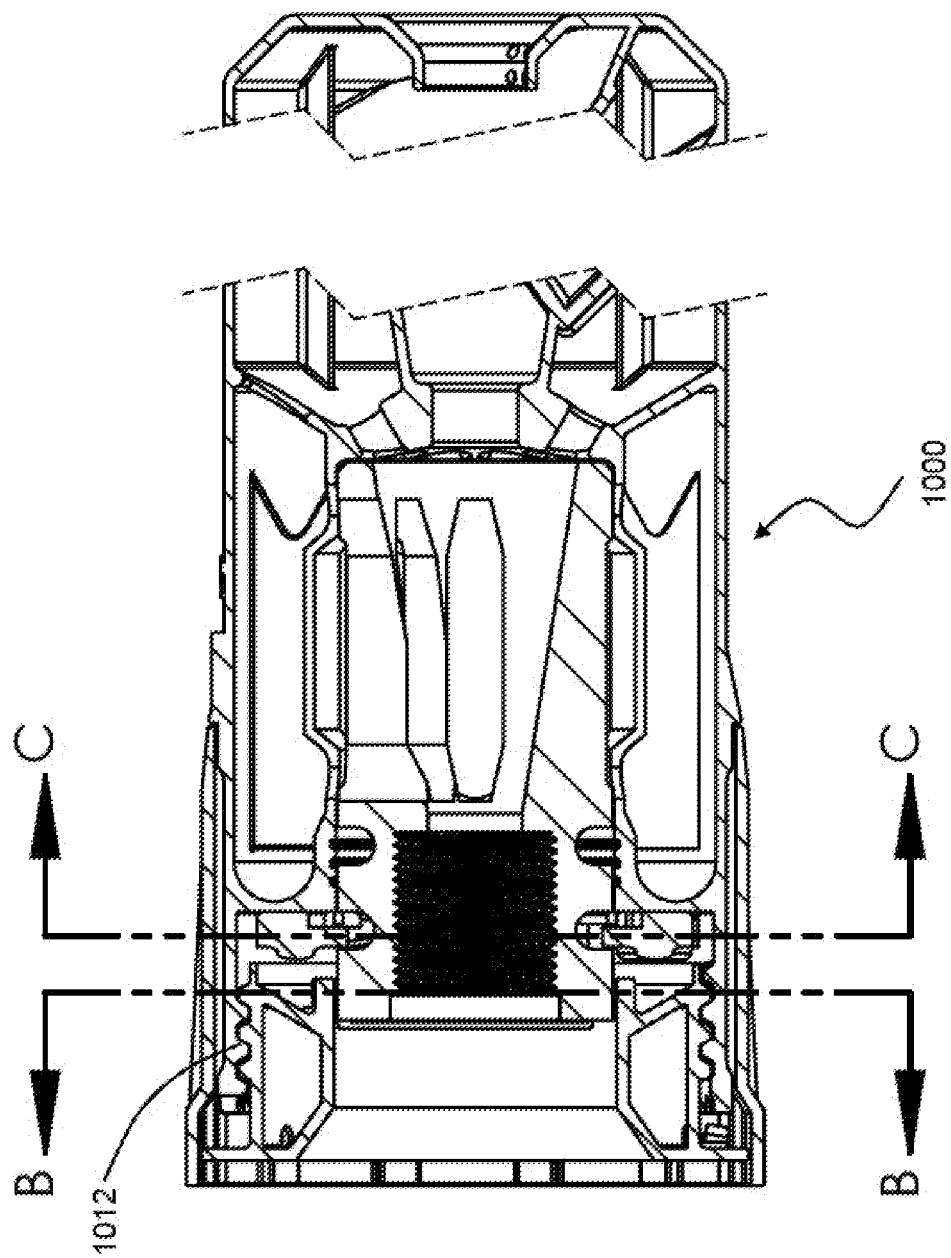
FIG. 76 is a view through section A-A shown in FIG. 75.
Figure 77:
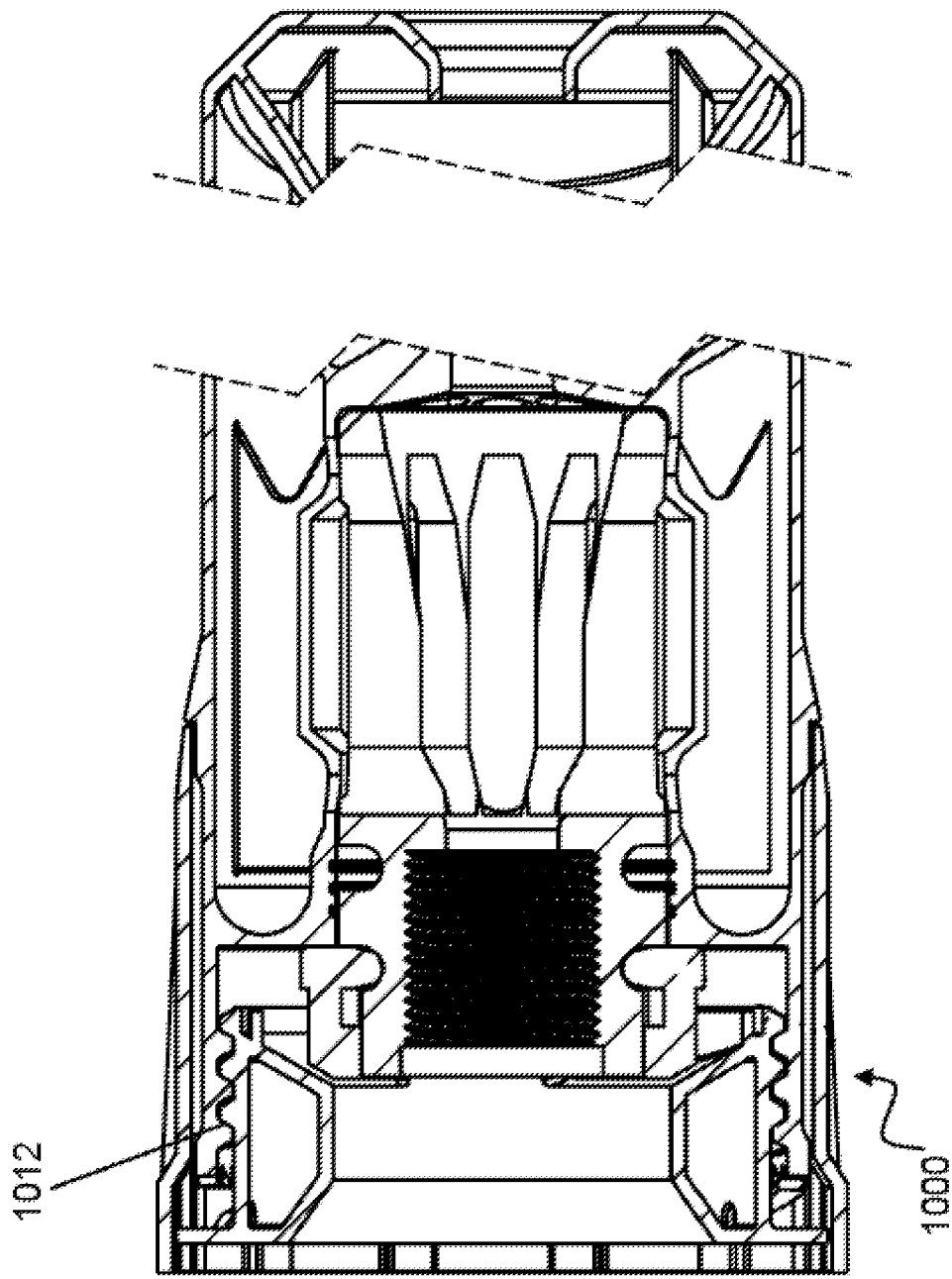
FIG. 77 is a view through section D-D shown in FIG. 75.
Figure 78:
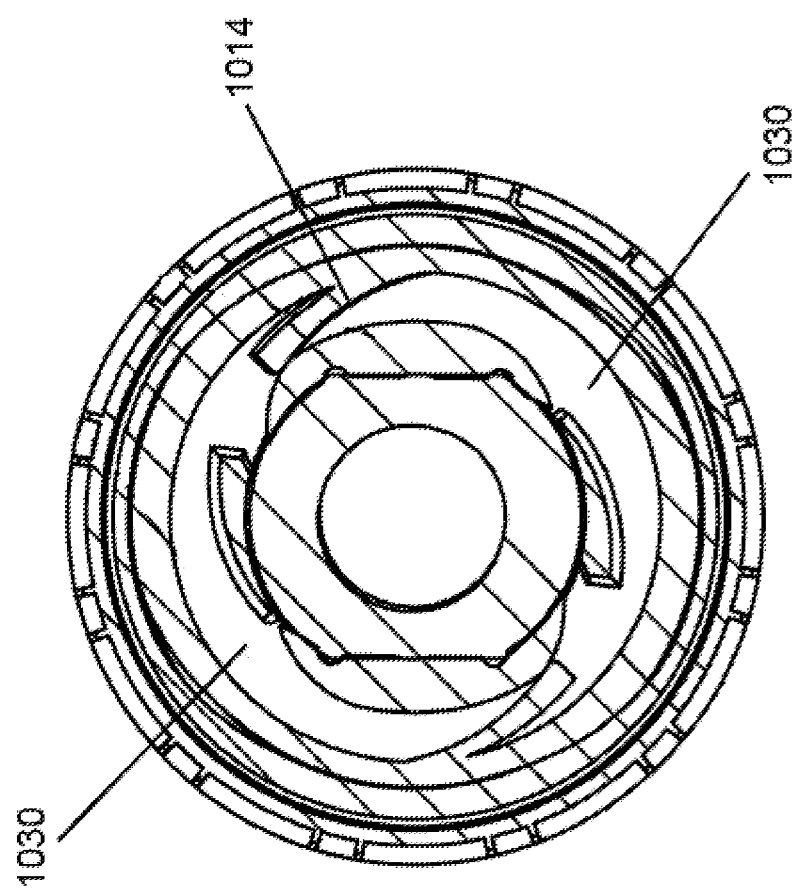
FIG. 78 is a view through section B-B shown in FIG. 76.
Figure 79:
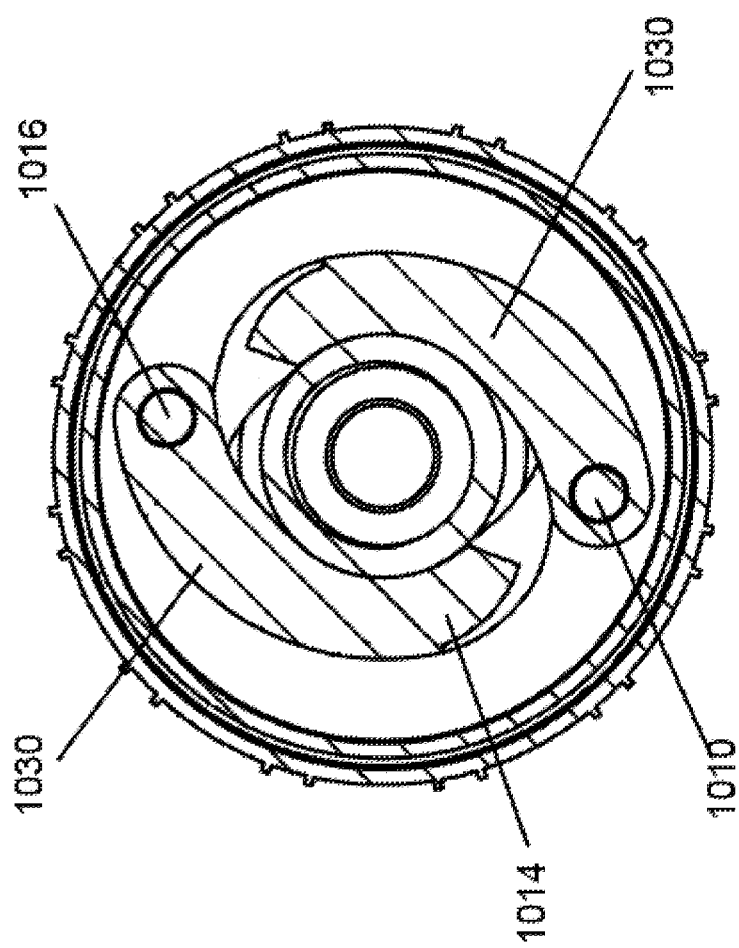
FIG. 79 is a view through section C-C shown in FIG. 76.
Figure 80:
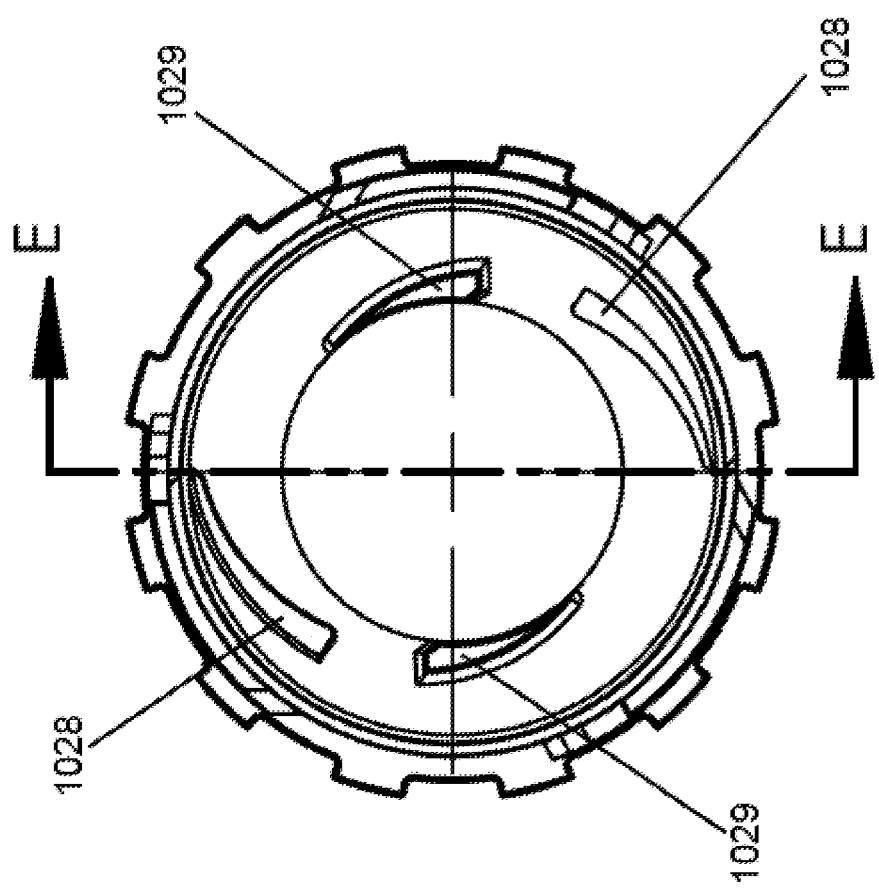
FIG. 80 is an end on view of a component of a connection system according to the embodiment of FIG. 75.
Figure 81:
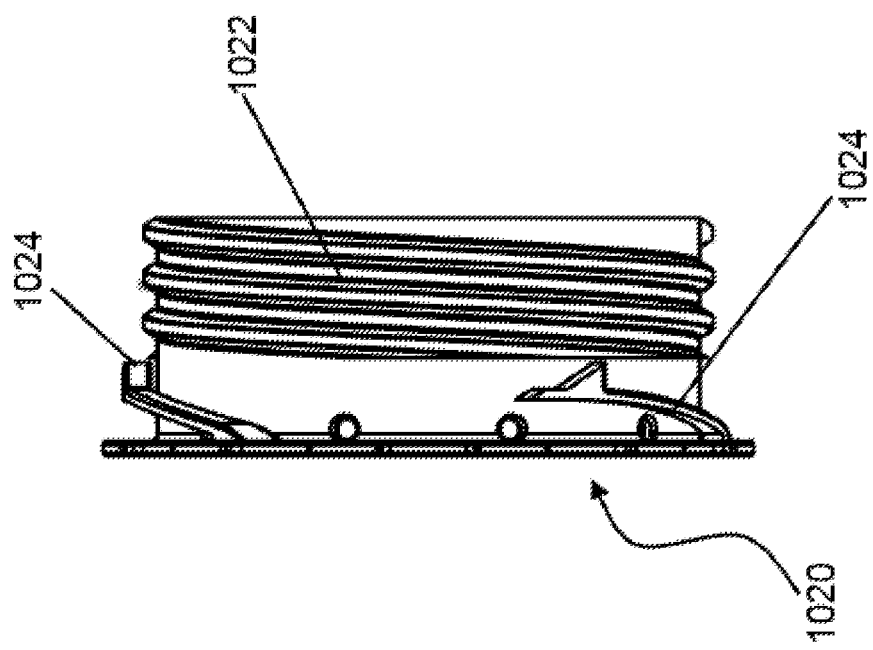
FIG. 81 is a side view of FIG. 80.
Figure 82:
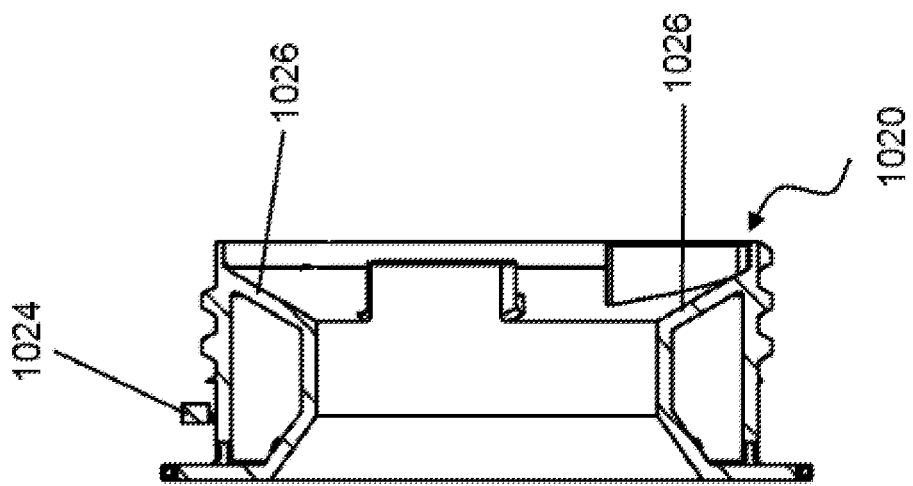
FIG. 82 is a view through section E-E shown in FIG. 80.
Figure 83:
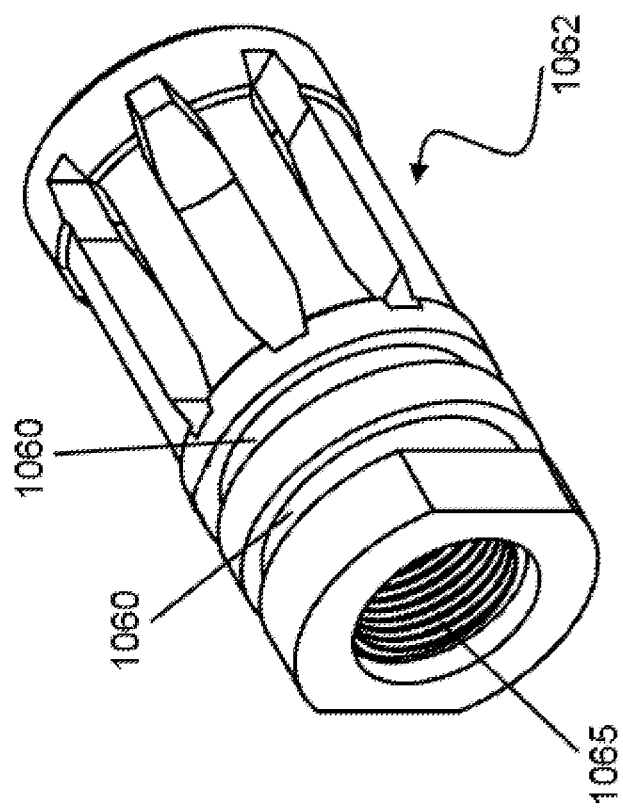
FIG. 83 is a perspective view of a component of connection system according to the embodiment of FIG. 75.
Figure 84:
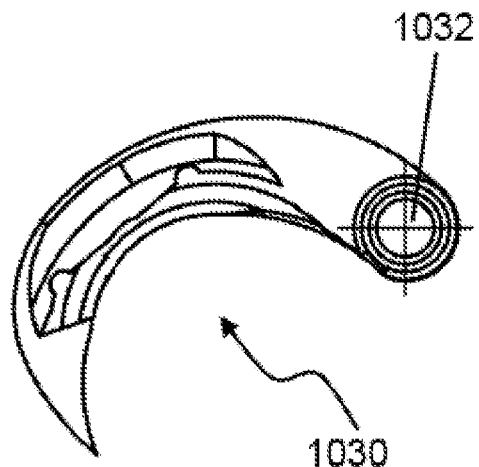
FIG. 84 is a side view of a latching arm forming part of the embodiment of FIG. 75.
Figure 85:
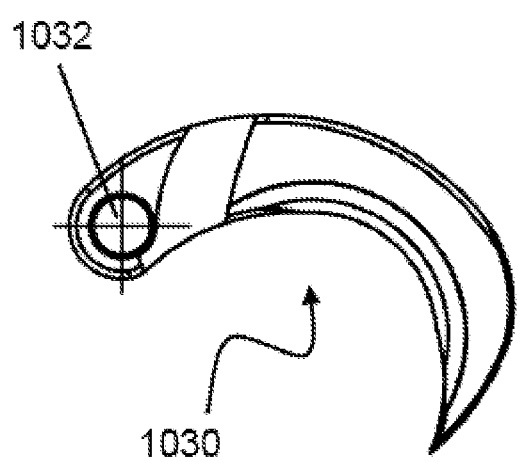
FIG. 85 is a second side view of a latching arm.
Figure 86:
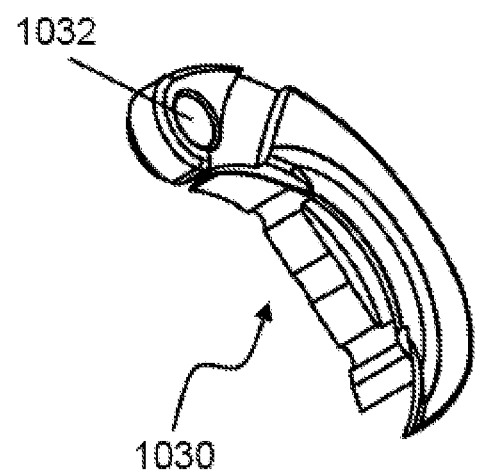
FIG. 86 is a first perspective view of the latching member of FIGS. 84 to 85.
Figure 87:
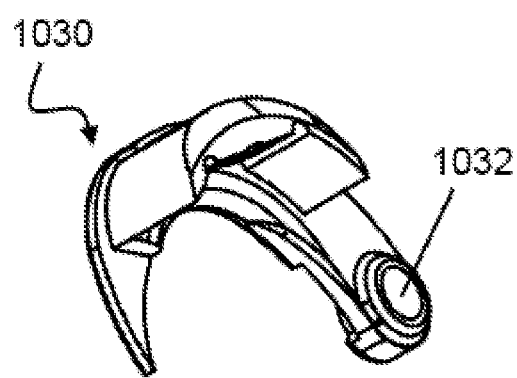
FIG. 87 is a second perspective view of the latching member of FIGS. 84 to 86.
Figure 88:
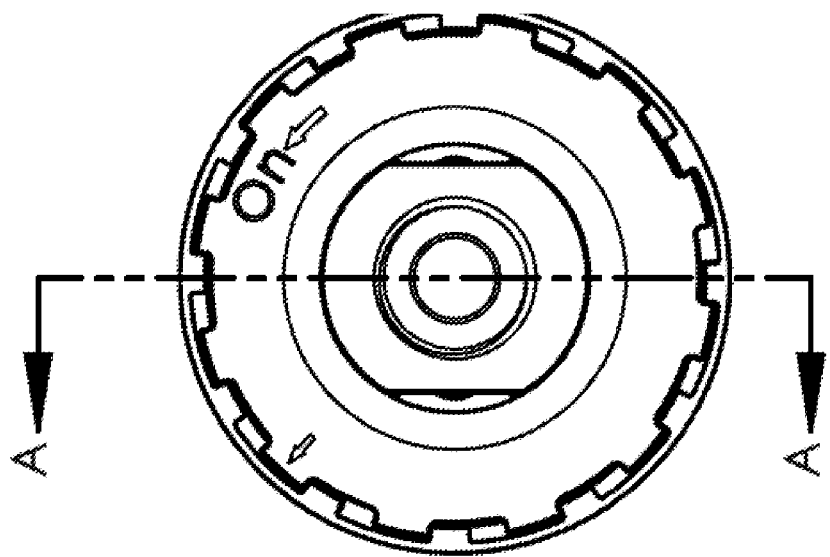
FIG. 88 is an end on view of a connection system according to an embodiment of the invention.
Figure 89:
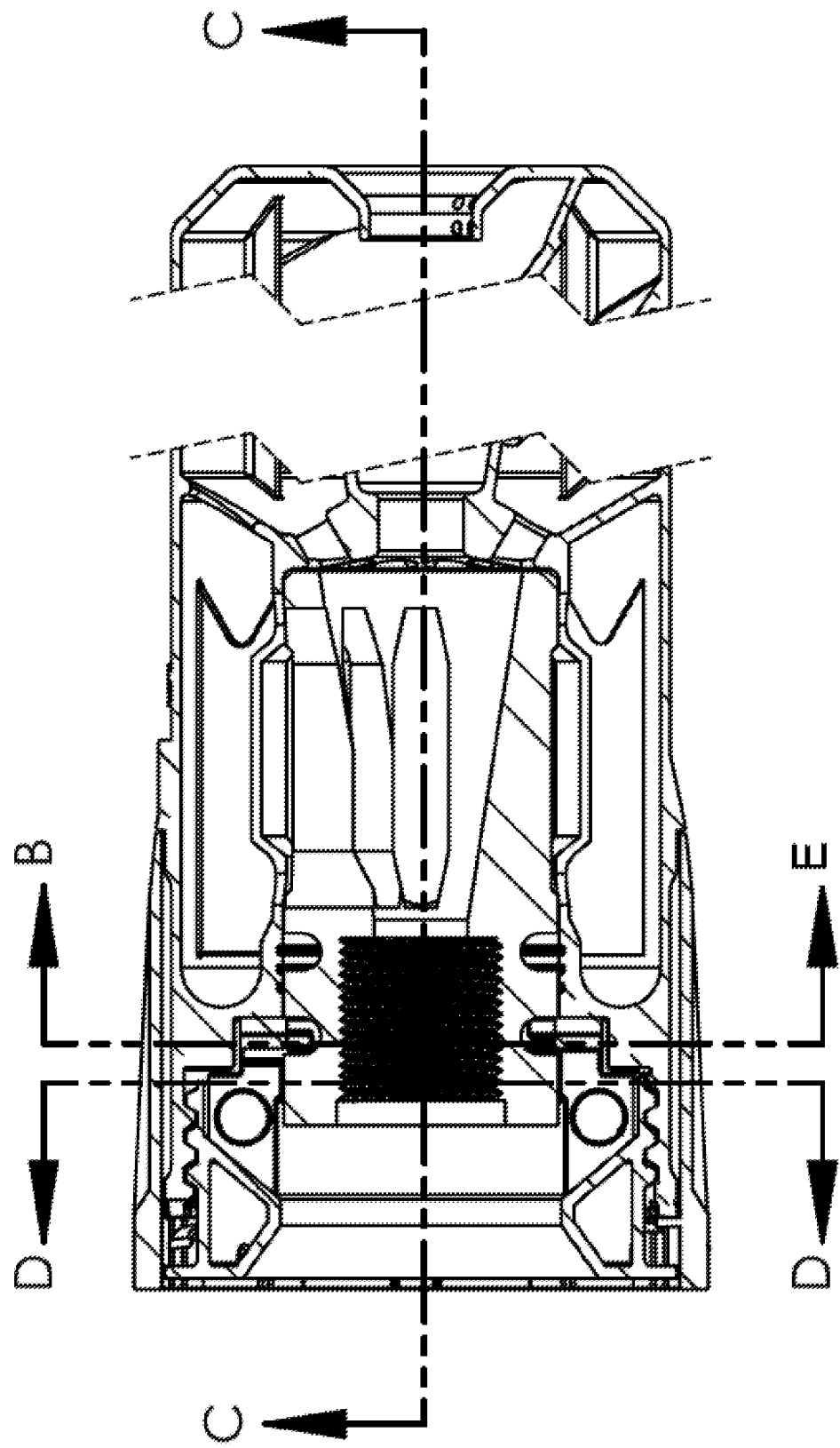
FIG. 89 is a view through section A-A shown in FIG. 88.
Figure 90:
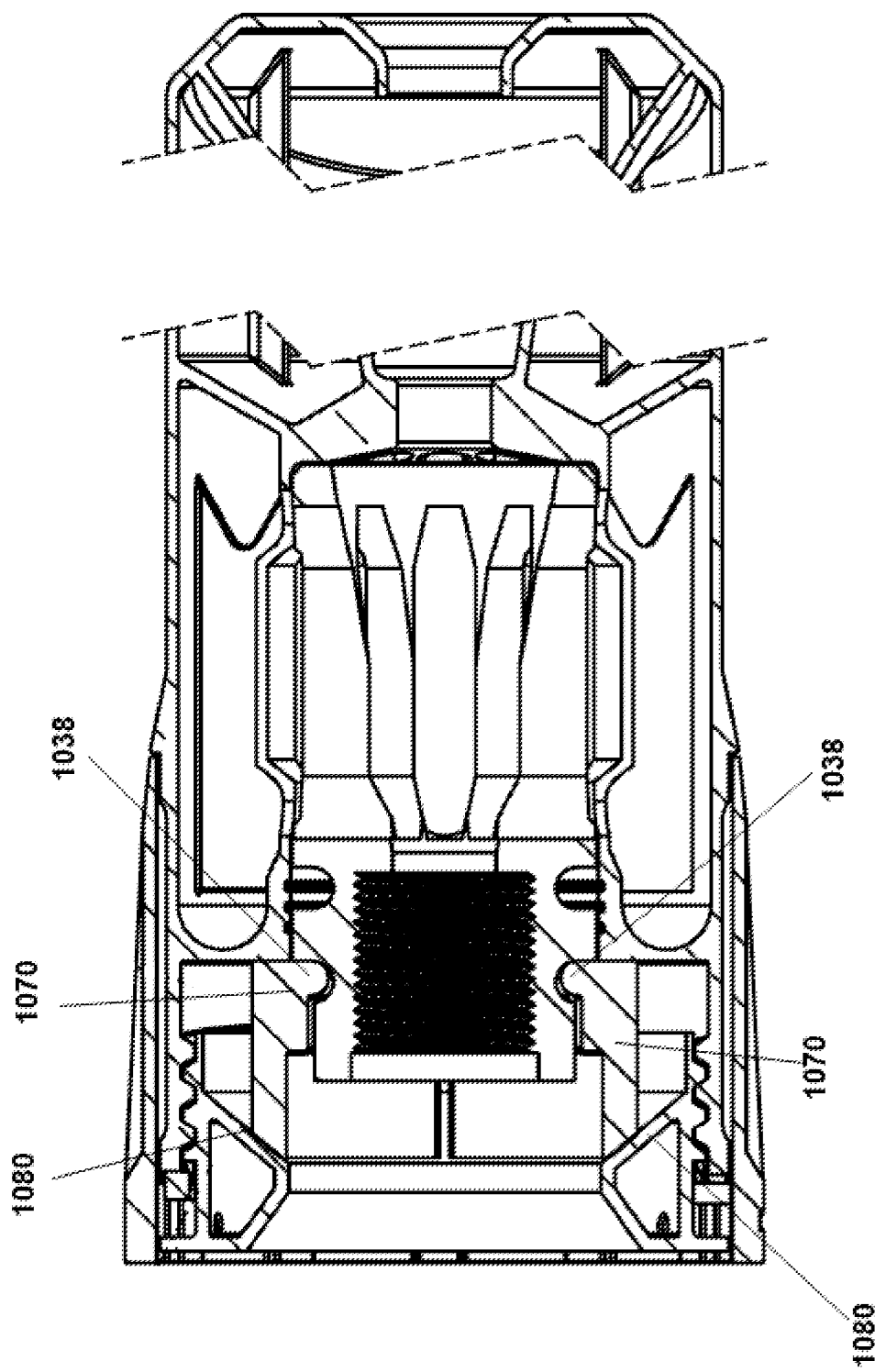
FIG. 90 is a view through section C-C shown in FIG. 88.
Figure 91:
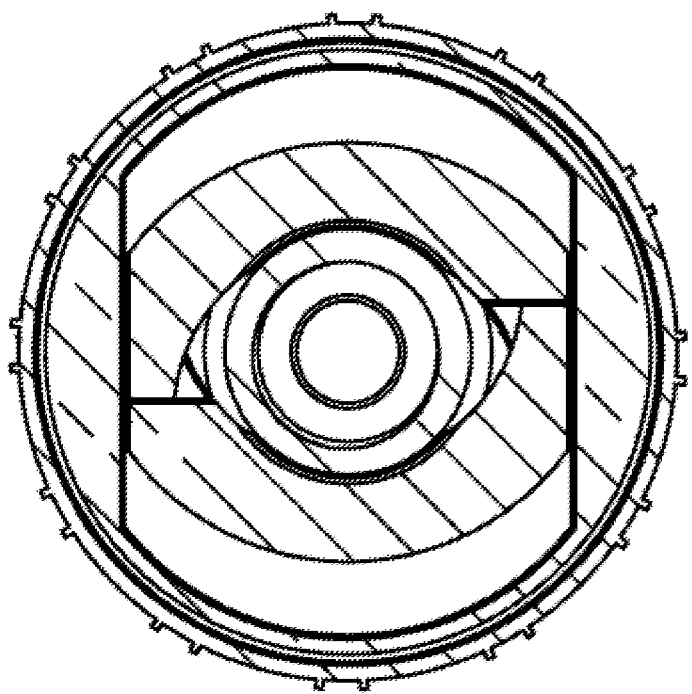
FIG. 91 is a view through section B-B shown in FIG. 88.
Figure 92:
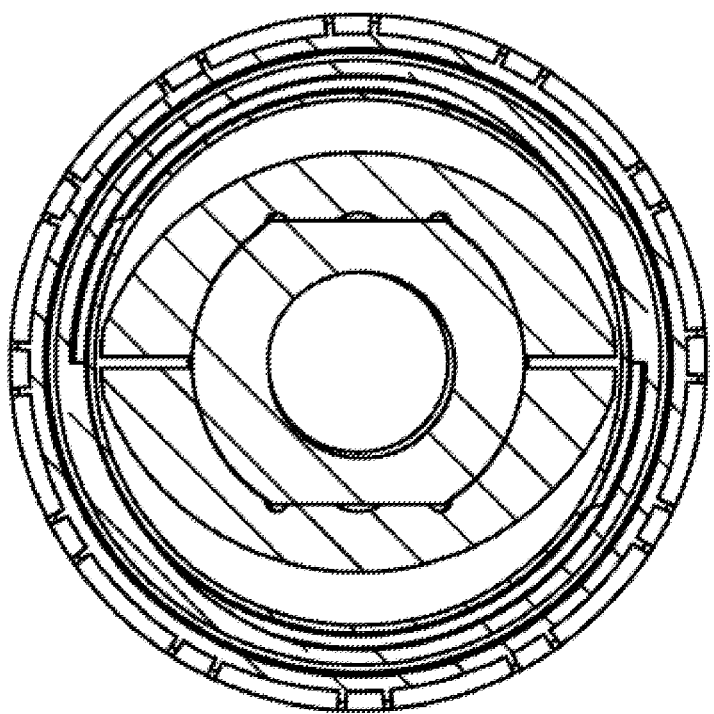
FIG. 92 is a view through section D-D shown in FIG. 88.
Figure 93:
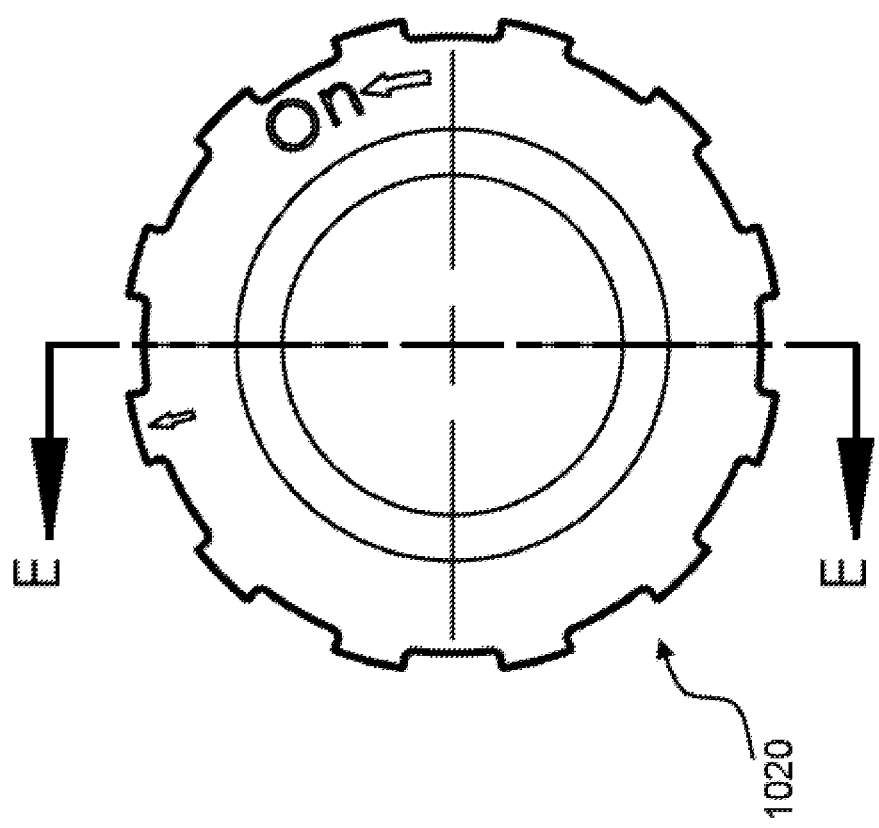
FIG. 93 is an end on view of a second component of the embodiment of FIG. 88.
Figure 94:
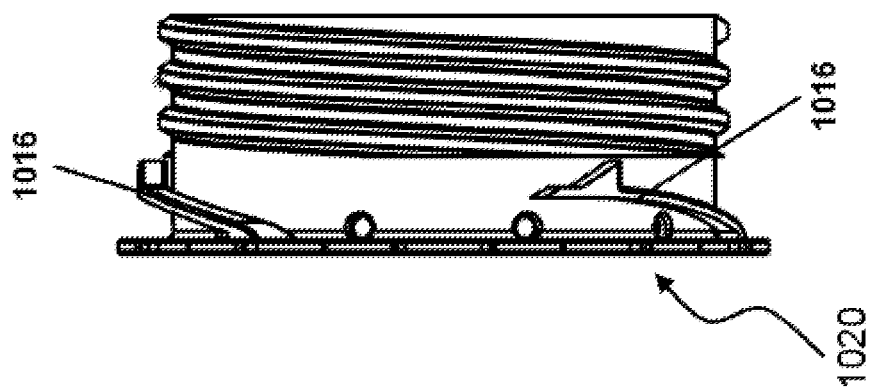
FIG. 94 is a side view of FIG. 93.

The ring (736) and protrusion (737) are visible in FIGS. 72 and 73 which show interaction of the protrusion (737) with the at least one ratchet member (720).

Once the at least one ratchet member (720) has disengaged the ratchet teeth (717), continued rotation of the ring (736) causes body (718) to also rotate. Thereby, channels (733-735) are brought into alignment with protrusions (705-707). Accordingly, the bearing surface (721) and inner surfaces (733-735) do not clamp the protrusion (705-707) to the suppressor (702). Accordingly, the muzzle brake (703) can be moved to cause the protrusions (705-707) to move through channels (726-728). Thereby, the muzzle brake (703) can be released from the suppressor (702). This facilitates removing the suppressor (702) from a gun (not shown).

It should be noted that the configuration of the connection system (700) is such that the components need only be rotated through a small range of angles to secure and release the two components together.

Second Alternate Embodiment of a Quick Connect

Referring now to FIGS. 28 to 38 showing an embodiment of a connection system generally indicated as (200).

The connection system (200) includes a first connector half in the form of a muzzle brake indicated generally as (207).

The muzzle brake (207) includes a main body (208).

An internal screw thread (210) is formed the body (208). The screw thread (210) is configured to in use engage with the corresponding screw thread on the end of a gun barrel (not shown in the Figures).

The interaction of the screw thread (210) and a corresponding screw thread on the gun barrel can in use secure the muzzle brake (207) to the gun.

The muzzle brake (207) may include apertures such as (211) which are shaped and configured so as to control or otherwise direct expansion of gasses when a bullet is fired by a gun.

The connection system (200) comprises a second connector half generally indicated as (213). The second connector half (213) is formed from a first component indicated as (202), and a second component (220).

Figure 16:
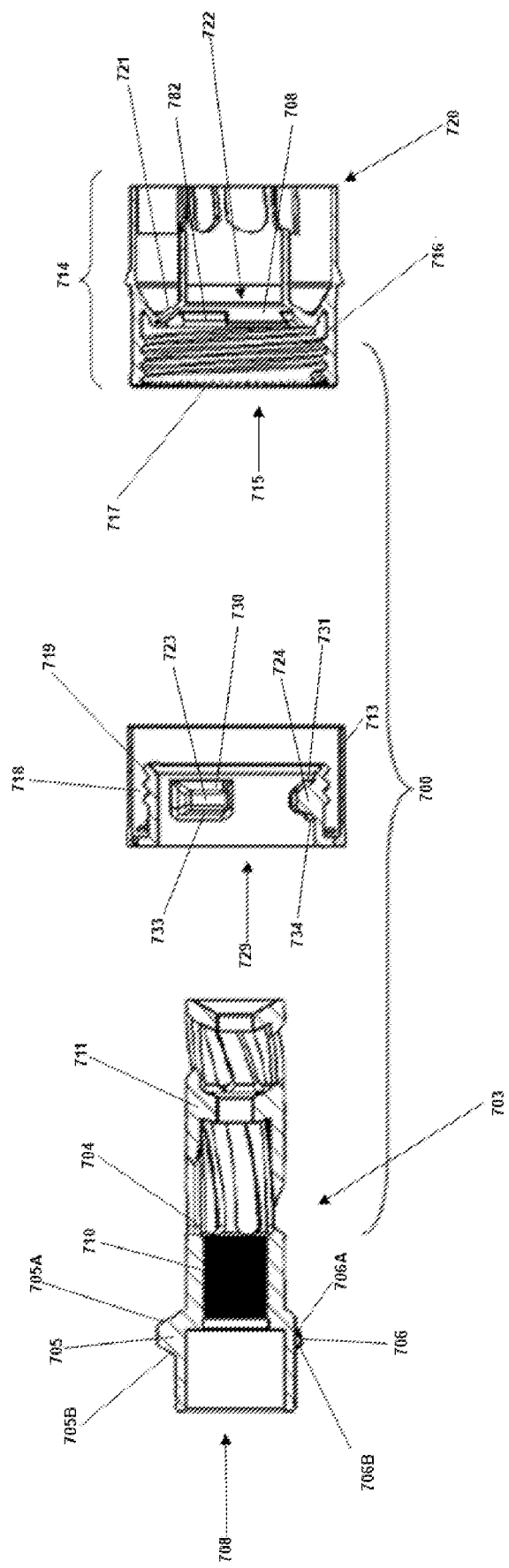
FIG. 16 is a side cross sectional view of FIG. 1.
Figure 17:
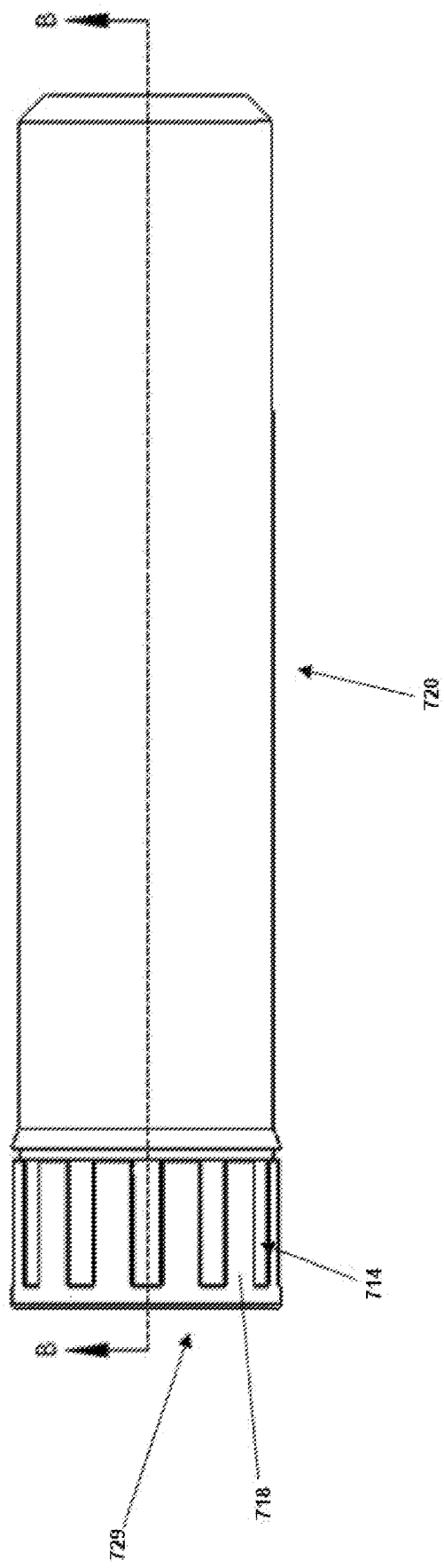
FIG. 17 is a side view showing components of a connection system according to an embodiment of the invention secured together.

The second component (220) includes a main body (230). The main body (230) includes an aperture (232) into a channel (240), as is best seen in FIG. 16.

The second component (202) is formed integrally in a gun suppressor (not shown in FIGS. 28 to 38). The gun suppressor (not shown in FIGS. 28 to 38) may be a suppressor having any known internal baffle structure.

The second component (202) includes an aperture indicated generally as (203) into a channel.

The aperture (203) is configured to receive components of a gun and/or other aspects of the connection system (200).

The second component (202) includes an internal screw thread (201) within the channel (204). A plurality of ratchet teeth (200) are formed integrally to the second component (202), within channel (204) and close to aperture (203).

The first second component (2202) includes an external screw thread (250) formed in the main body (13). The external screw thread (250) corresponds to internal screw thread (203) in the first component (202).

Rotation of the first component (220) and the second component (202) with respect to each other causes screw threads (201, 250) to engage to secure the two components together.

The first component (220) includes at least one, and preferably, three flanges (260, 262, 264). Each flange (260, 262, 264) includes a first surface (260A, 262A, 264A) and a second surface (260B, 262B, 264B).

The gaps between adjacent flanges (260, 262, 264) define channels (266). The channels (266) are configured to receive the protrusions (209) on the muzzle brake (207).

The first component (220) includes two ratchet members (270A, 270B). The ratchet members (270A, 270B) are spring biased protrusion that each have at least one tooth. Pressure applied to the ratchet members (270A, 270B) at engagement points (242, 244) causes the ratchet teeth (272) to more towards the main body (230). This causes the ratchet members (270A, 270B) to disengage any ratchet teeth with which they may be engaged.

The protrusions (209) are substantially identical to the protrusions (5, 6, 7) discussed above with respect to FIGS. 1-13. Accordingly, the shape, configuration, and role of the protrusions (209) will not be discussed herein. It should also be appreciated that the function of connection system (200) is substantially identical to that of connection system (1) as discussed above.

However, a separate disengagement means in the form of a ring is not provided. Rather, the disengagement means is integrally formed to the first component (220) forming part of the first connector half in the form of the ratchet members (270A, 270B).

The engagement points (240, 242) are provided to enable a person to move the ratchet members (270A, 270B) to a release position in which they do not engage ratchet teeth (17). Accordingly, pressure applied to engagement portions (240, 242) overcomes the biasing elements to move ratchet members (270A, 270B) away from ratchet teeth.

Third Alternate Quick Connect

Referring now to FIGS. 65 to 73 showing a connector half (600) of a connection system according to an embodiment of the invention.

The connector half (600) includes a body (602) having a generally cylindrical shape and being hollow. The connector half (600) includes a first aperture (604) and a second aperture (606). The apertures (604, 606) are aligned with each other and define a pathway along which a bullet may travel in use.

The connector half (600) may be incorporated into a suppressor (not shown in FIGS. 65 to 73). In such embodiments, the body (602) is provided by the suppressor.

A track (610) is formed in an outer surface (612) of the body (602). A latch (614) is slidingly mounted in track (610). The latch is connected to a first latching member (616) and a second latching member (618).

Body (602) includes an internal radial surface (618). Each latching member (616, 618) is pivotally mounted to body (602) at pivot points (620). The separation between the radial surface (619) and an underside (not visible in the Figures) of the latching members (616, 618) define a track (622) to receive protrusions on a second connector half such as that on a gun barrel or muzzle brake (not shown in the Figures).

The protrusions on the gun barrel or muzzle brake (not shown) provide a connector half complimentary to connector half (600). Interaction of the connector half (600) with the protrusions (not shown) can secure a suppressor to a gun (neither shown).

In use, sliding the latch (614) along the track (610) causes the latching members (616, 618) to be moved to a release (non-locking) position. This opens channels (624, 626) which are shaped and configured to receive the protrusions (not shown). This enables the protrusions to be brought into alignment with the track (622).

Sliding the latch along the track enables the latching members to reduce the dimensions of the channels (624, 626). Thereby, the protrusions can be secured in the track (622) to attach the suppressor to a gun.

To release the suppressor from the gun the above described process is reversed. That is, the latch (614) is moved slidingly along track (610) to increase the size of channels (624, 626). The protrusions can be withdrawn from the track (622) to release the gun and suppressor from each other.

Fourth Alternate Quick Connect

Referring now to FIGS. 74 to 87 which show a fourth embodiment of a connection system (1000) according to an embodiment of the invention. The connection system (1000) includes a first component which is formed integrally to a suppressor (1010). The first component includes an internal screw thread (1012), which may be a pair of intertwined screw threads which can be described as a double helix.

A second component (1020) has an external screw thread (1022), which may be a double helix as described above. The screw threads (1012, 1022) are configured to engage with each other.

The first component has an internal shoulder (1014) and at least one column (1016) extending therefrom.

The first component (1010) and the second component (1020) have corresponding teeth (not shown) and ratchet members (1024). The ratchet members (1024) can engage the teeth (not shown) to prevent or restrict rotation of the first component (1010) and the second component (1020) with respect to each other.

At least one latching arm (1030) is pivotally mounted to first component (1010), such as by an aperture (1032) which receives the columns (1016).

A ring (1050) is provided which can facilitate rotating the second component (1020) with respect to the first component (1010). The ring (1050) provides a sheath that at least partly surrounds the second component (1020).

In the embodiment shown in FIGS. 75-88, the ring (1050) and the second component (1020) include a plurality of intermeshed teeth which are indicated generally as (1052). The teeth have a small degree of play e.g. the teeth of the ring are larger than the teeth of the teeth of the second component (1052) for e.g., 2 mm. This enables the ring (1050) to rotate slightly relative to the second component (1020) without causing the second component (1020) to move.

However, the intermeshed teeth (1052) enable rotation of the ring (1050) to cause a corresponding rotation in the second component (1020). For instance, rotation of the ring (1050) in a first direction may cause the second component (1020) to rotate to move towards the first component (1010). Likewise, rotation of the ring (1050) in a second direction may cause the second component to rotate to move away from the first component (1010).

The ring (1050) includes disengagement structure (not shown in the Figures) which can engage the ratchet members (1016) to cause them to disengage the teeth (not shown) on the first component (1010) on rotation of the ring (1050) in at least the first direction. Therefore, the ring (1050) is configured to ensure that the ratchet members (1016) do not prevent the first component (1010) and the second component (1020) being rotated relative to each other when desired. However, the ratchet members (1016 are still able to prevent unintentional or undesired rotation of the first component (1010) and the second component (1020) relative to each other.

The embodiment of FIGS. 75 to 88 is configured to engage tracks (1060) provided on a gun (not shown in the Figures) so as to secure the suppressor (1010) to the gun (not shown).

In the embodiment, the tracks (1060) are provided in a flash hider (1062) as should be known to one skilled in the art. The flash hider (1062) has an internal screw thread (1064) which is configured to engage a corresponding screw thread on a gun (not shown in the Figures).

To secure the suppressor (1010) to the gun, the flash hider (1062) is inserted through apertures in the second component (1020), the ring (1050), and disposed in the suppressor (1010). The ring (1050) is rotated in a first direction. The intermeshed teeth (1052) transfer rotation of the ring (1050) to the second component (1020).

Ridges (1028) on the second component (1020) contact latching arms (1030) and transfer the rotational motion of the second component to the latching arms (1030). The latching arms (1030) are caused to pivot about columns (1016). The latching arms (1030) therefore each extend into one of the tracks (1060).

The latching arms (1030) may be shaped or configured to mate with structure of the flash hider (1062) forming the tracks (1060). This may ensure that the latching arms (1030) and therefore the connection system (1000) more stably and/or reliably connects the gun to the suppressor (1010).

A clamping surface (1026) of the second component (1020) presses against the latching arms (1030). This may assist with retaining the latching arms (1030) in engagement with the tracks (1060).

To release the suppressor (1010) from the gun (not shown) the ring (1050) is rotated in the second direction. The disengagement structure on the ring (not shown) causes the ratchet members (1016) to disengage the teeth on the first component (not shown). The intermeshed teeth (1052) transfer rotation of the ring (1050) to the second component (1020), causing the clamping surface to disengage the latching arms (1030).

Ridges (1029) on the second component (1020) engage the latching arms (1030) and transfer rotational motion of the second component (1020) to the latching arms (1030). This causes the latching arms (1030) to pivot about columns (1016) to disengage the tracks (1060). The flash hider (1062) can therefore be withdrawn from the suppressor.

Fifth Alternate Quick Connect

Referring now to FIGS. 89 to 99 which show a connection system (1100) according to an embodiment of the invention. The connection system is a variation of the embodiment described with reference to FIGS. 74 to 88, and therefore like references in the Figures refer to like components.

In the embodiment shown in FIGS. 88 to 99 the latching arms (1070) are slidingly mounted in channels formed in the suppressor (1010). The second component (1020) includes a clamping surface (1080). In use, rotation of the second component (1020) in a first direction causes the clamping surface (1080) to abut a surface (1036) on the latching arms (1030).

Figure 95:
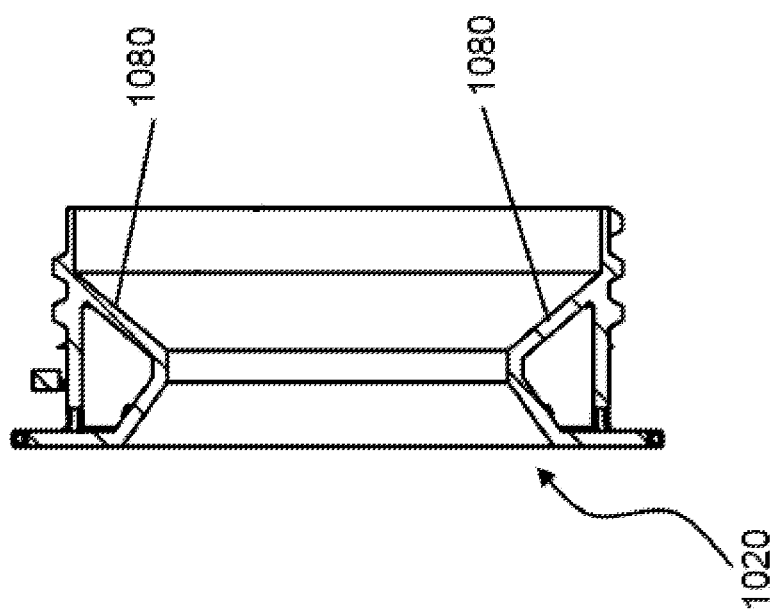
FIG. 95 is a view through section E-E shown in FIG. 93.
Figure 96:
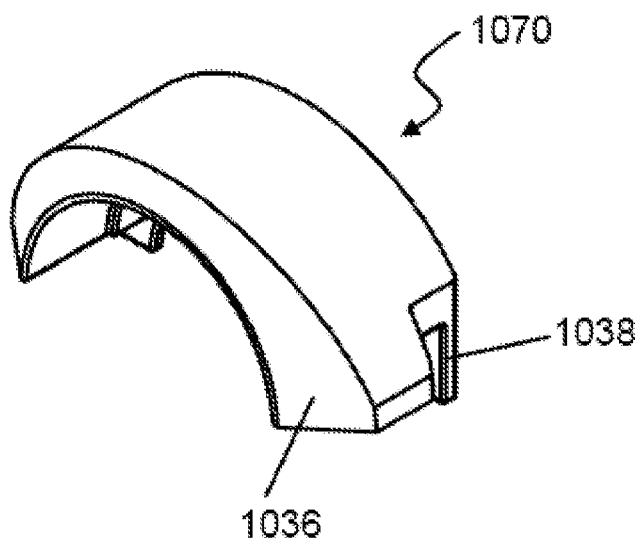
FIG. 96 is a perspective view of a latching arm forming part of the connection system of FIG. 88.
Figure 97:
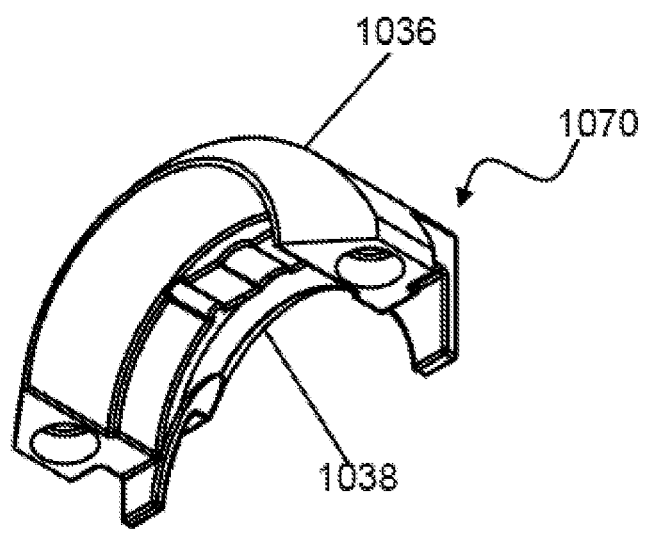
FIG. 97 is a bottom perspective view of FIG. 98.
Figure 98:
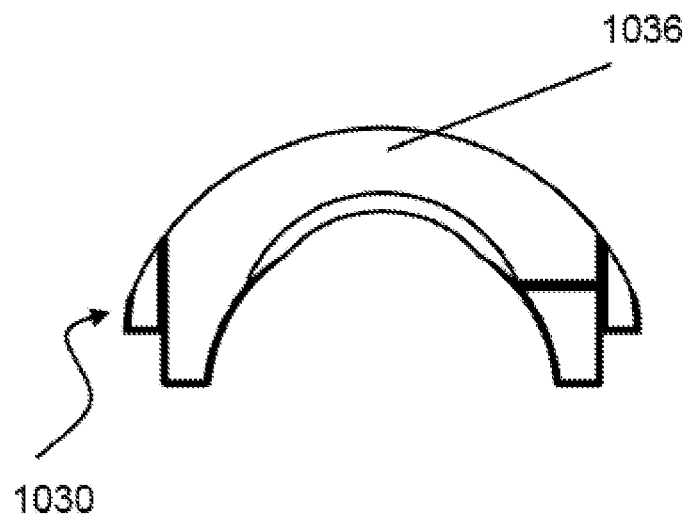
FIG. 98 is a side view of FIG. 96.
Figure 99:
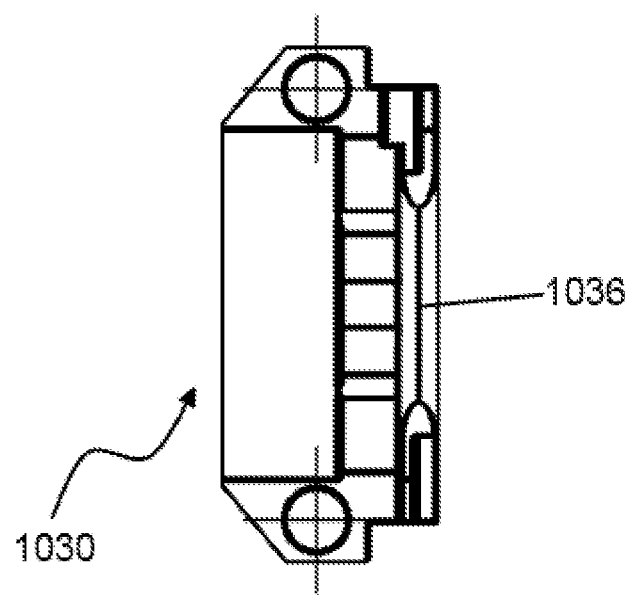
FIG. 99 is a second side view of FIG. 96.
Figure 100:
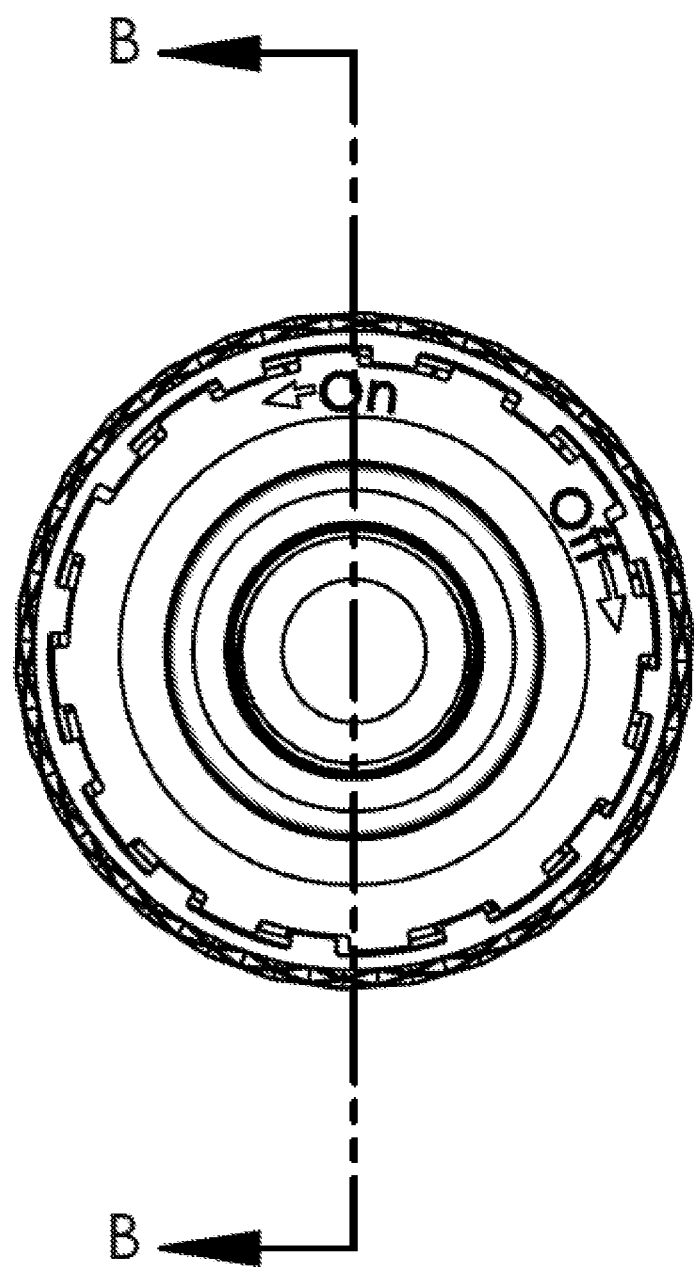
FIG. 100 is an end on view of a connection system according to an embodiment of the invention in an unlocked configuration.
Figure 101:
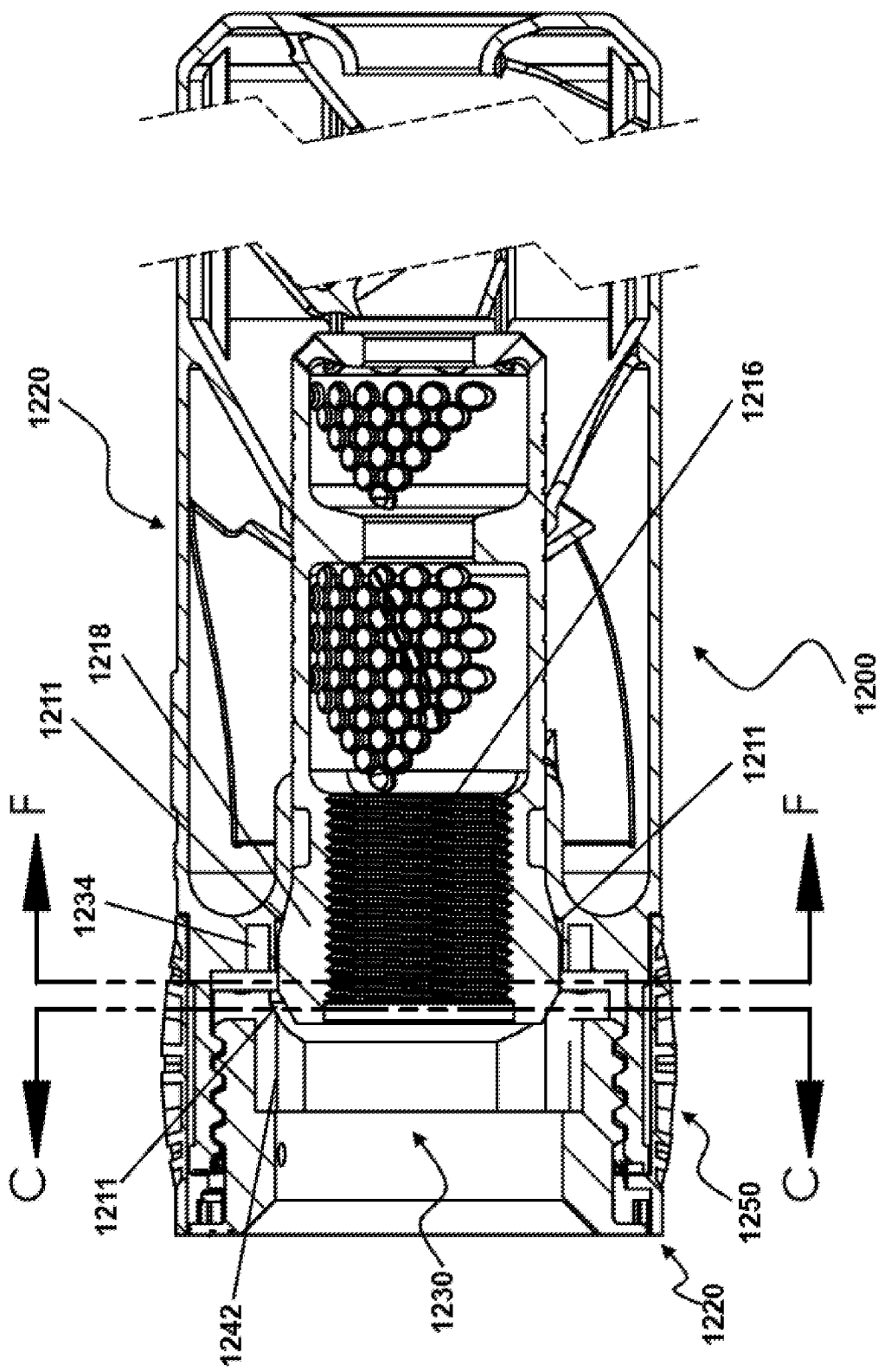
FIG. 101 is a view through section B-B shown in FIG. 100.
Figure 102:
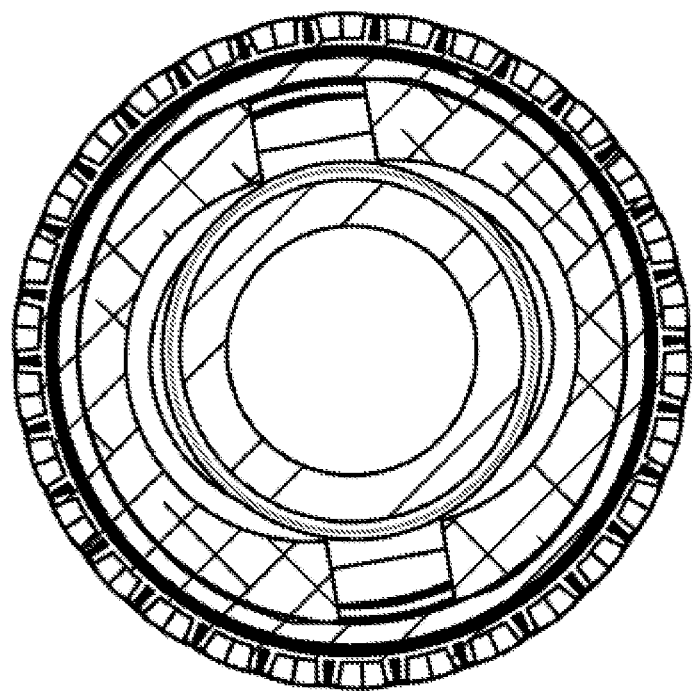
FIG. 102 is a view through section C-C shown in FIG. 101.
Figure 103:
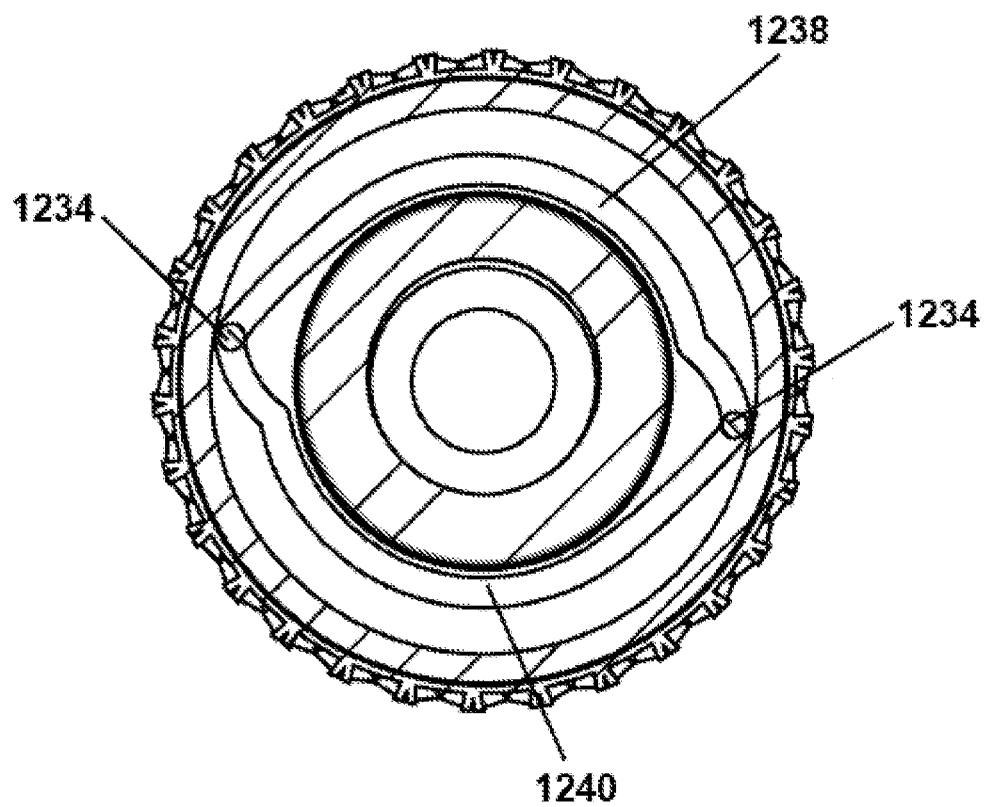
FIG. 103 is a view through section F-F shown in FIG. 101.
Figure 104:
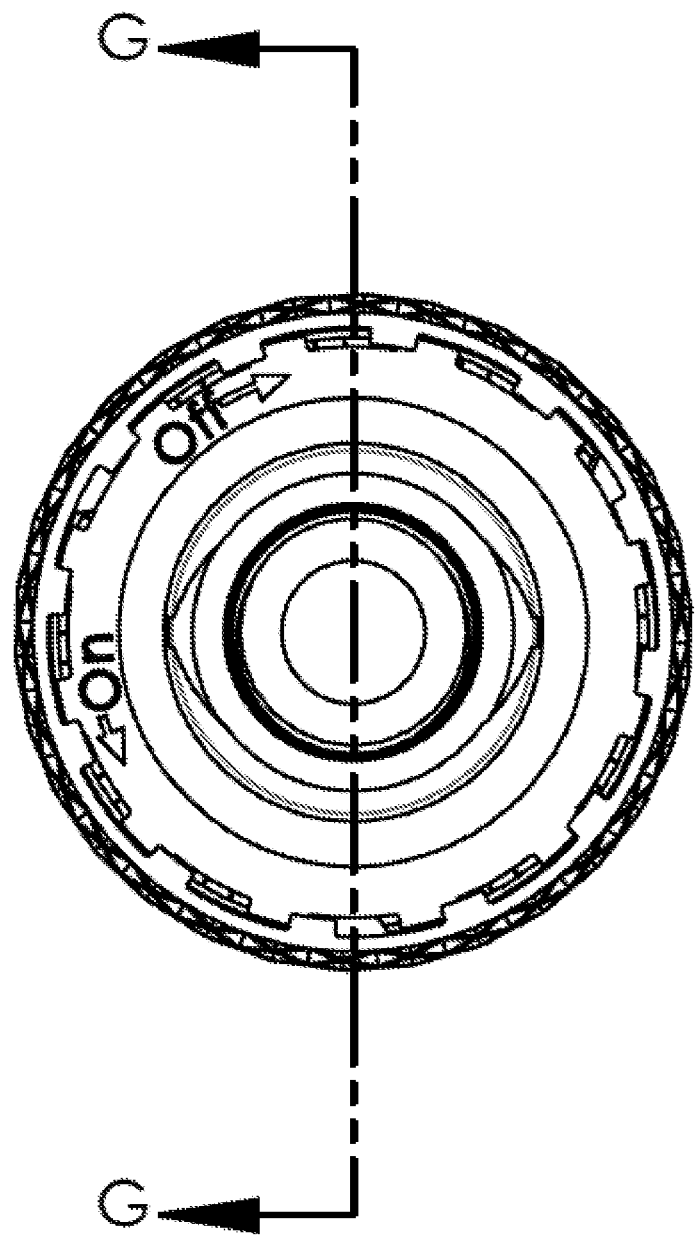
FIG. 104 is an end on view of the connection system of FIGS. 100 to 103 in a locked configuration.
Figure 105:
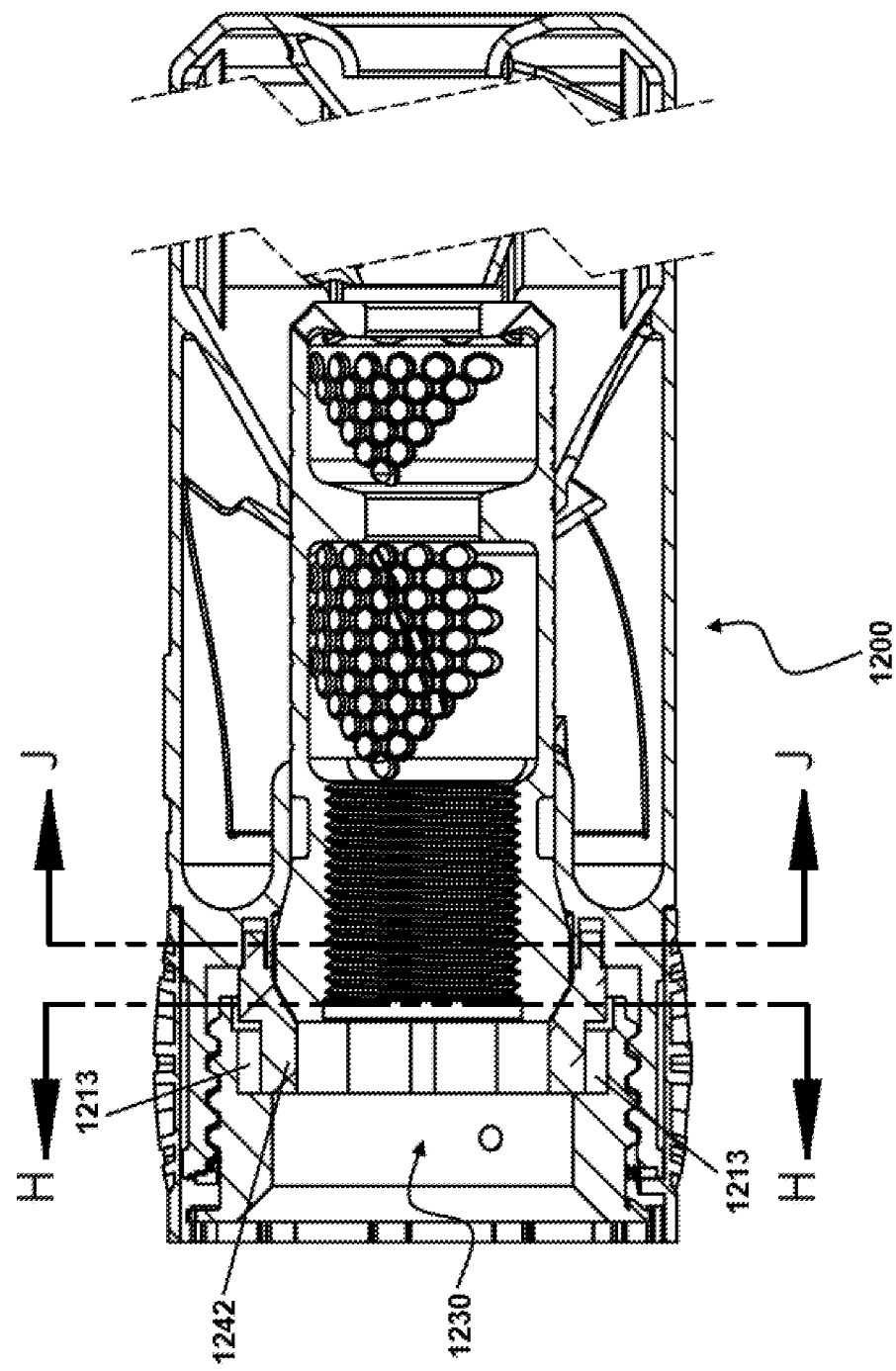
FIG. 105 is a view through section G-G shown in FIG. 104.
Figure 106:
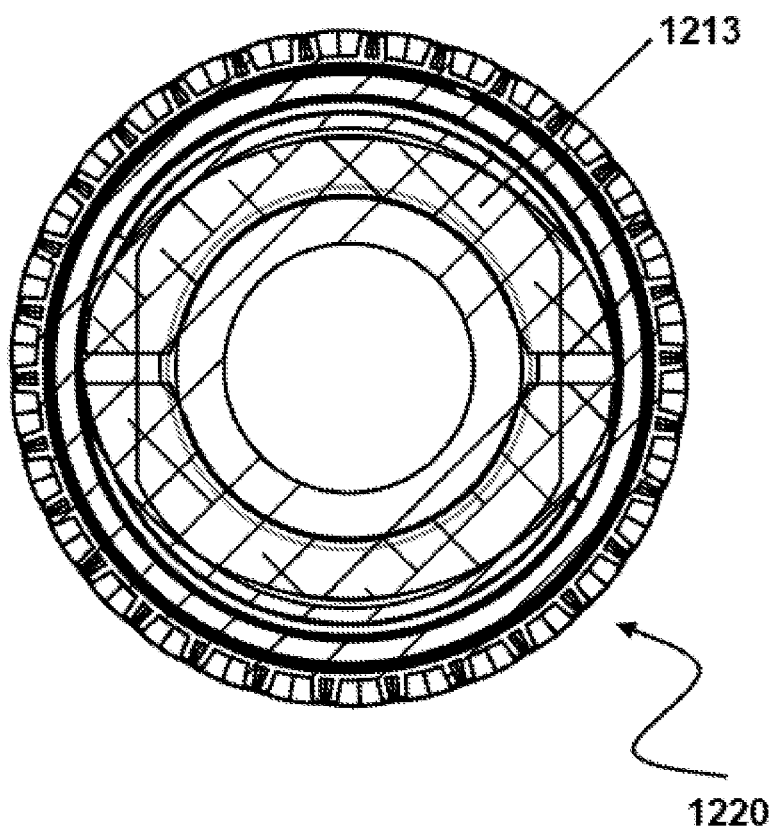
Figure 107:
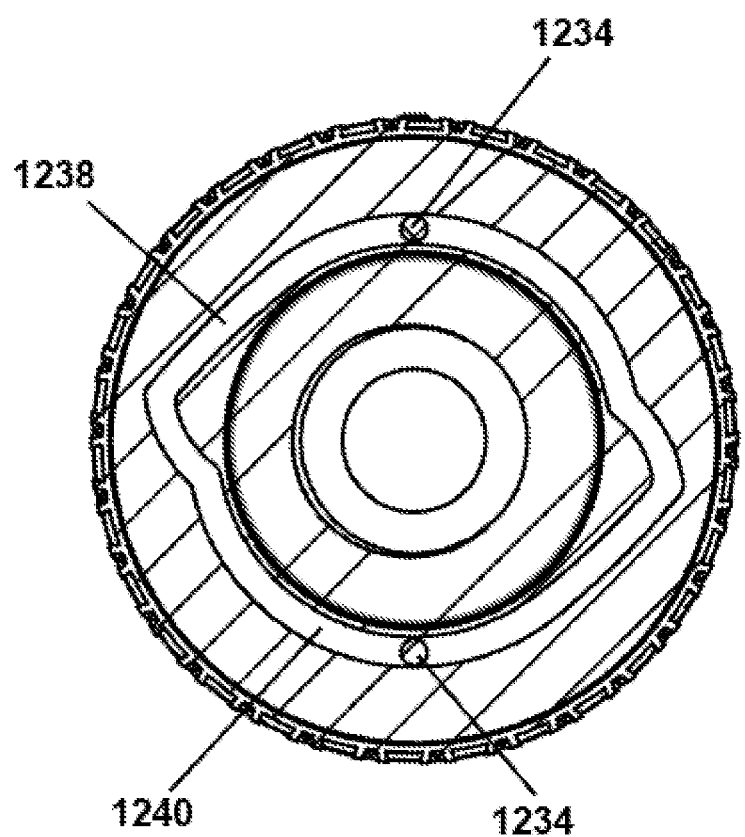
Figure 108:
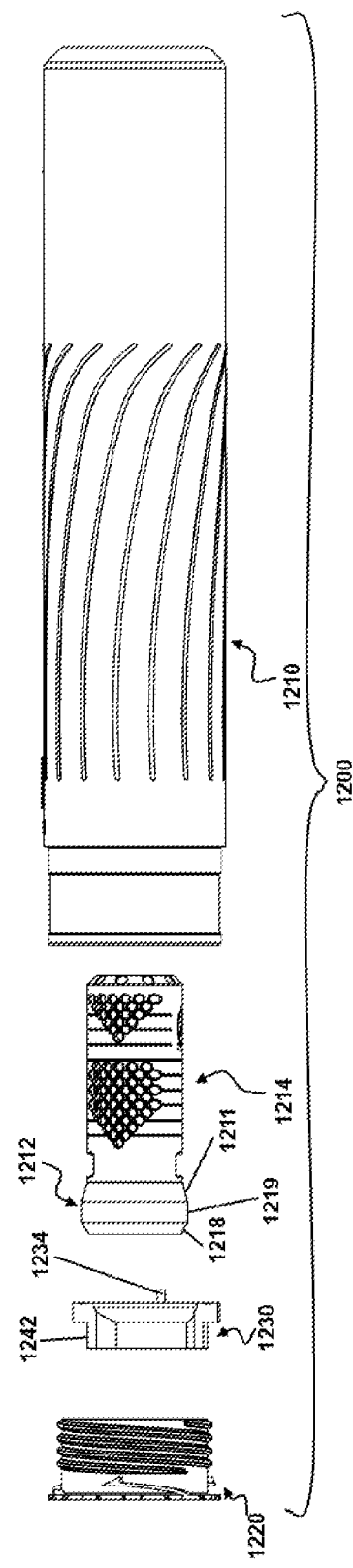
Figure 109:
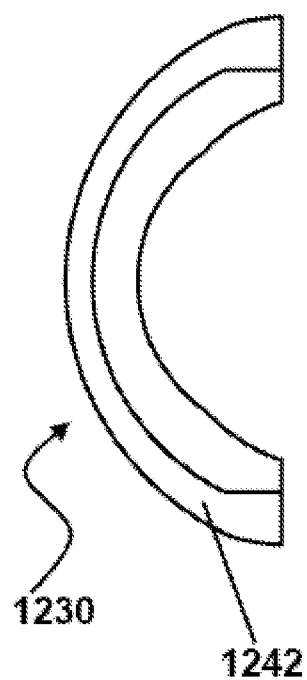
Figure 110:
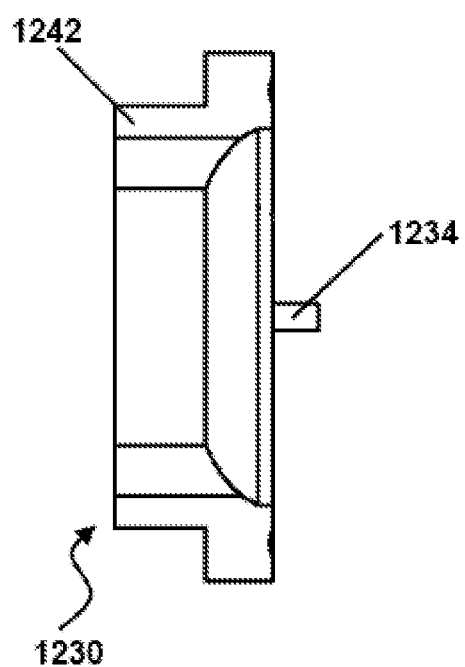

The clamping surface (1080) is angled inwards to create a taper towards the centre of the second component (1020), as is best seen in FIG. 95. The surface (1036) on the latching arms (1030) is angled to create a taper as is best seen in FIG. 97.

The clamping surface (1080) forces the latching arms (1030) towards each other. This causes a collar (1038) on each latching arm (1030) into the recess (1060) on the flash hider (1062).

The collars (1038) on the latching arms (1030) cooperate to form a seal around the diameter of the flash hider (1062). Therefore the connection system may reduce or eliminate blow back from inside the suppressor (1020) towards a gun user.

To release the suppressor (1010) from a gun, the ring (1050) is rotated in a second direction. To release the suppressor (1010) from the gun (not shown) the ring is rotated in the second direction. The disengagement structure on the ring (not shown) causes the ratchet members (1016) to disengage the teeth on the first component (not shown). The intermeshed teeth (1052) transfer rotation of the ring (1050) to the second component (1020), causing the clamping surface to disengage the latching arms (1030).

A biasing means (not shown in the Figures) such as one or two springs may be provided. The biasing means are positioned and orientated to urge the latching arms (1030) apart, and towards an open position. However, contact of the clamping surface (1080) against the surface (1036) can overcome the biasing means to enable the latches to move into the recess (1060) to thereby secure the suppressor (1010) to a gun (not shown).

Sixth Alternate Quick Connect

Referring now to FIGS. 100 to 110 which show an alternate connection system (1200) according to an embodiment of the invention. The connection system (1200) uses similar components to the connection system discussed above. Accordingly, similar references numerals in the Figures refer to similar components.

The connection system (1200) is configured to connect a suppressor (1210) to a gun (not shown in the Figures) which is provided with a single protrusion (1212) which extends around the entire circumference of a gun barrel (not shown in the Figures). For instance, as shown in the Figures, the single protrusion (1212) is provided on a muzzle brake (1214).

The muzzle brake (1214) includes a screw thread (1216) which can engage a corresponding screw thread on a gun barrel (not shown) to releasably connect the muzzle brake (1214) to the gun barrel.

Alternatively, it is envisaged that the single protrusion (1212) could be formed integrally to, or be otherwise permanently attached to, the gun barrel.

The single protrusion (1212) has a first shoulder (1211) and a second shoulder (1218). The shoulders taper (1211, 1218) inwards to provide a ridge (1219). The ridge (1219)

extends around the entire circumference of the muzzle brake (1214). Therefore, the single protrusion is distinct to the embodiments discussed above in which a plurality of protrusions were provided.

The suppressor (1210) includes a shoulder (1211) which in use provides a clamping surface.

The connection system (1200) includes a second component (1220) having an external screw thread (1222) configured to engage a corresponding internal screw thread on the suppressor (1210).

The connection system (1200) includes at least one, and preferably two, latching arms (1230, 1232). The latching arms (1230, 1232) are configured to engage the single protrusion (1212). The latching arm(s) (1230, 1232) are positioned between shoulder (1211) and the second component (1220).

Each latching arm (1230, 1232) includes a detent (1234). The detents (1234) are each slidingly engaged in one of tracks (1238, 1240) formed in shoulder (1211).

The tracks (1238, 1240) are shaped to guide movement of the latching arms (1230, 1232) between a locked position in which they clamp a gun barrel to the suppressor (1210) and a release position in which they enable the protrusion to be inserted into or removed from the suppressor (1210). The locked position is shown in FIGS. 100-103 while the release position is shown in FIGS. 104 to 107.

Each latching arm (1230, 1232) includes a shoulder (1242, 1244). The shoulders (1242, 1244) are configured to abut an internal clamping surface (1223) on the second component (1220) in use.

To secure a gun (not shown) to the suppressor (1210) the single protrusion (1212) is inserted through apertures in the second component (1220) and into suppressor (1210). The shoulder (1217) is adjacent the shoulder (1213) and ridge (1219) is between the latching arms (1230, 1232) and the shoulder (1211). The second component is rotated in a first direction with respect to the suppressor (1210), this causes clamping surface (1213) to move towards shoulder (1211).

The clamping surfaces (1213) abut the shoulders (1242, 1244). The contact causes the latching arms (1230, 1232) to move radially inwards towards a central axis of the suppressor e.g., the collars on the latching arms move towards each other. The movement of the latching arms (1230, 1232) is guided by the detents moving within the tracks.

Continued rotation of second component (1220) causes the latching arms (1230, 1232) to push single protrusion (1212) towards shoulder (1213).

The connection system is structured to create a seal to provide resistance to, or prevent, blow back of gas from within the suppressor (1210) towards the gun barrel.

The seal may be created by various structures and/or configurations. In one embodiment, the latching arms are shaped and configured so that each end or a collar touches an end of another collar. For instance, in these embodiments, the collars may touch. In addition or alternatively, the latching arms may overlap each other.

To release the suppressor from the gun, the above steps are reversed. For instance, the second component (1220) is rotated in a second direction. This causes detents to move along tracks, to guide the latching arms radially outwards.

The connection system (1200) may also be provided with a biasing means such as a spring (not shown). The biasing means can be configured to urge the latching arms apart from each other. Therefore, the biasing means can ensure that the latching arm(s) are moved towards an open position in which they do not restrict or prevent the muzzle brake being inserted into, or removed from, the suppressor (1210).

Accordingly, the biasing means may make it easier to connect and release a suppressor from a gun.

However, in these embodiments, rotation of the second component (1220) can overcome the biasing means to move the latching arms to a locked position. As a result, the biasing means do not prevent assembly of a system as described herein.

Also, as indicated, the connection system (1200) may include structure or visual indications that inform a user which direction a component should be rotated to secure a suppressor to, or release it from, a gun.

Nielson Decoupler

Referring now to FIGS. 39 to 46 showing a suppressor (300) according to an alternate embodiment of the invention.

The suppressor (300) includes a Nielson decoupler configured to at least partially reduce transfer of momentum to a firearm to which the suppressor (300) is secured in use. The momentum may be transferred by gas created on firing a firearm contacting baffles within the suppressor (300). However, the Nielson decoupler provides a mechanism to absorb at least a portion of the momentum transferred to the suppressor (300) in use and thereby reduce the energy which may be transferred to the firearm.

The suppressor includes a piston (320). The piston (320) includes screw thread (322) configured to engage a corresponding screw thread on a gun barrel (not shown in the Figures) to thereby facilitate securing the suppressor (300) to a gun (not shown). The piston (320) includes a body (330) which has a general cylindrical shape and is hollow. Therefore, the body (330) defines a passageway through which a bullet may travel.

The body (330) includes radially spaced apart slot apertures (340).

Figure 29:
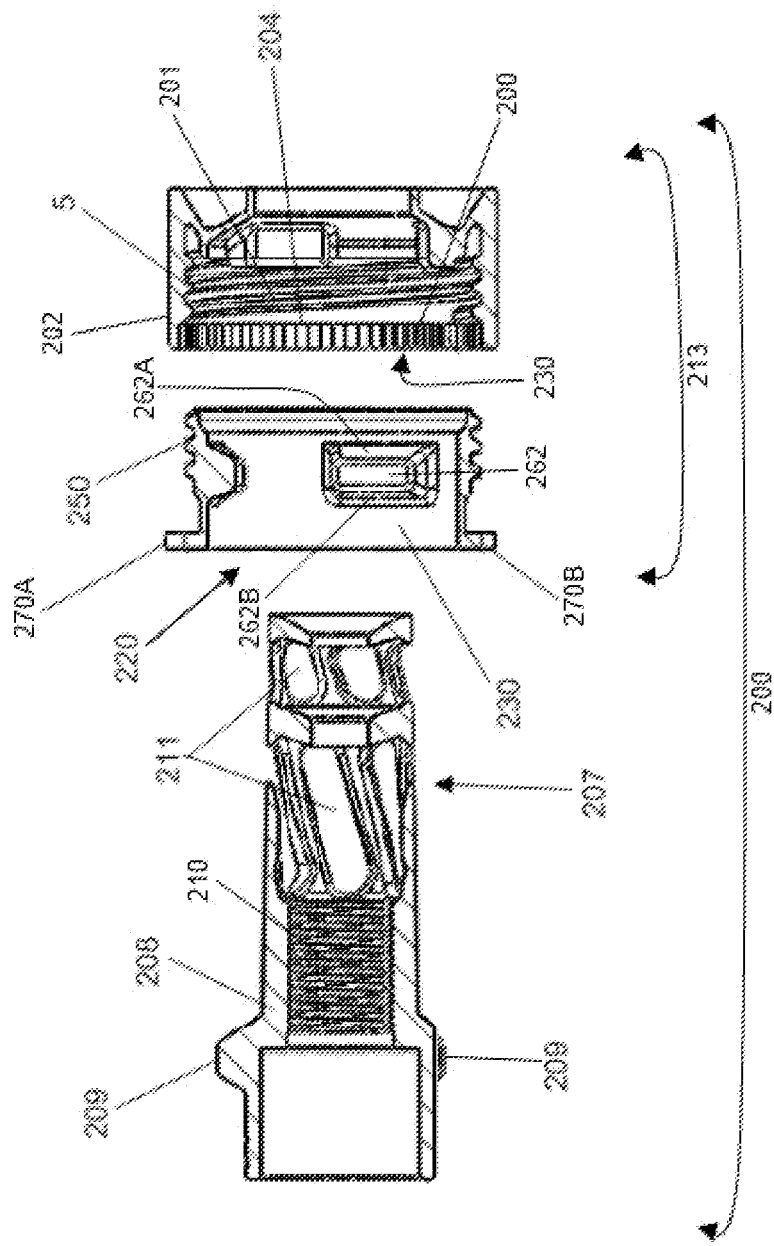
FIG. 29 is a view through section C-C shown in FIG. 28.

Protrusions (350) extend from the body (330). The protrusions (350) define peaks and troughs as are best seen in FIG. 29. The suppressor (300) is a cylindrical body having an internal cavity. Baffles (not shown in the Figures) are secured within the suppressor (300).

The body (330) includes a second series of radially spaced apart slot apertures (352). The slot apertures (352) are orientated to "twist" around the circumference of the body (330).

The suppressor (300) may have any known internal baffle structure, or utilise baffle structures discussed herein.

The suppressor (300) has a first opening (302) and a second opening (304).

Figure 30:
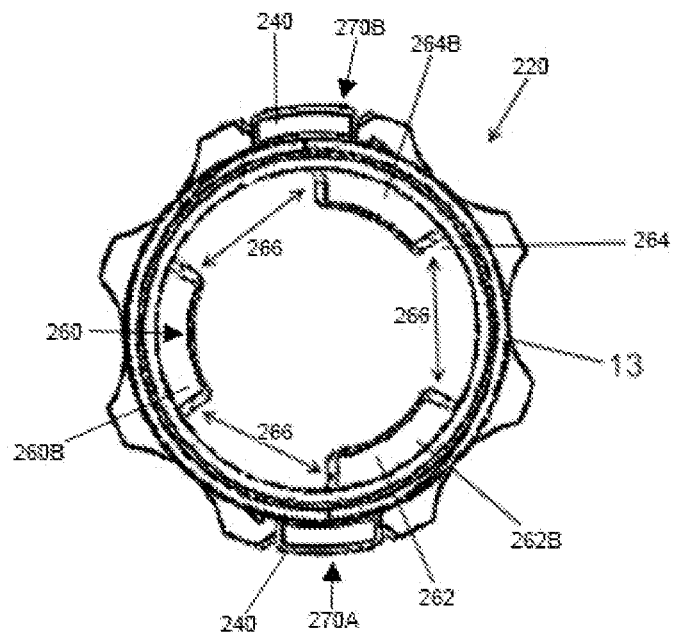
FIG. 30 is a view through section F-F shown in FIG. 28.
Figure 32:
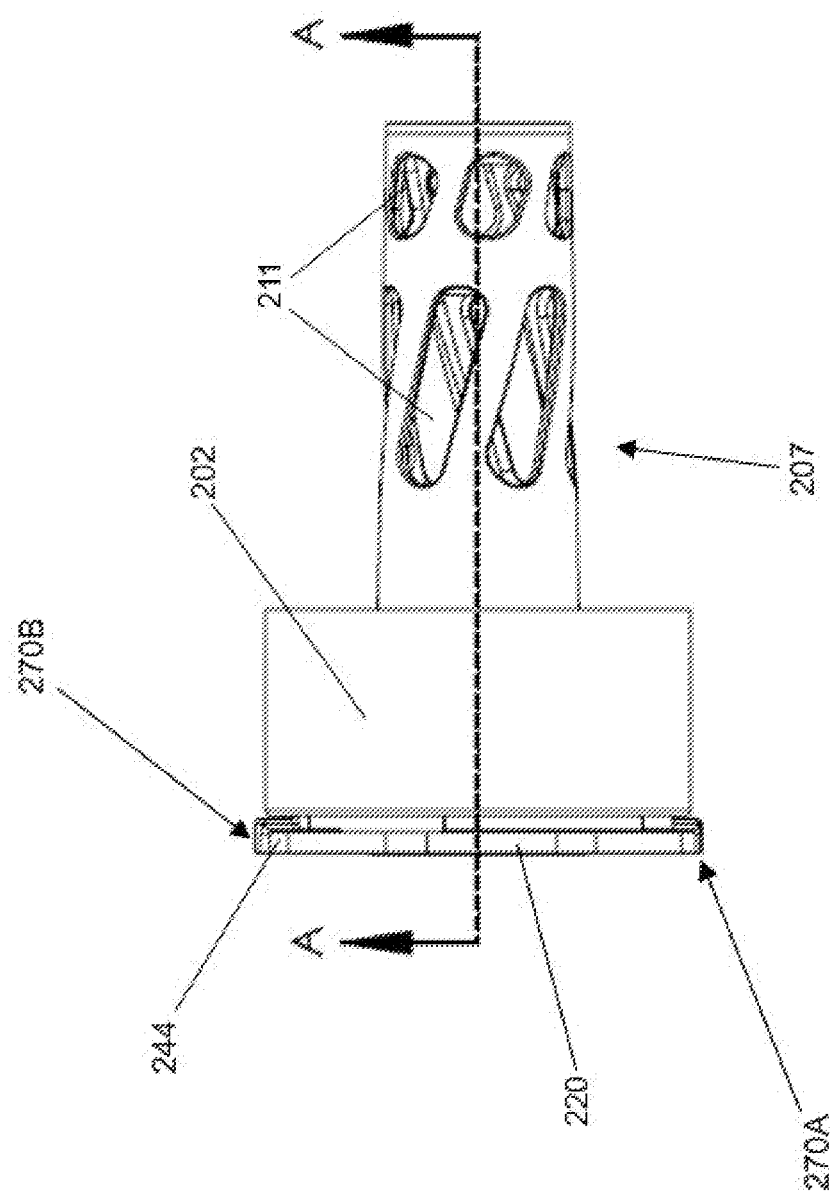
FIG. 32 is a side view of components of the connection system of FIGS. 28 to 31 secured together.
Figure 33:
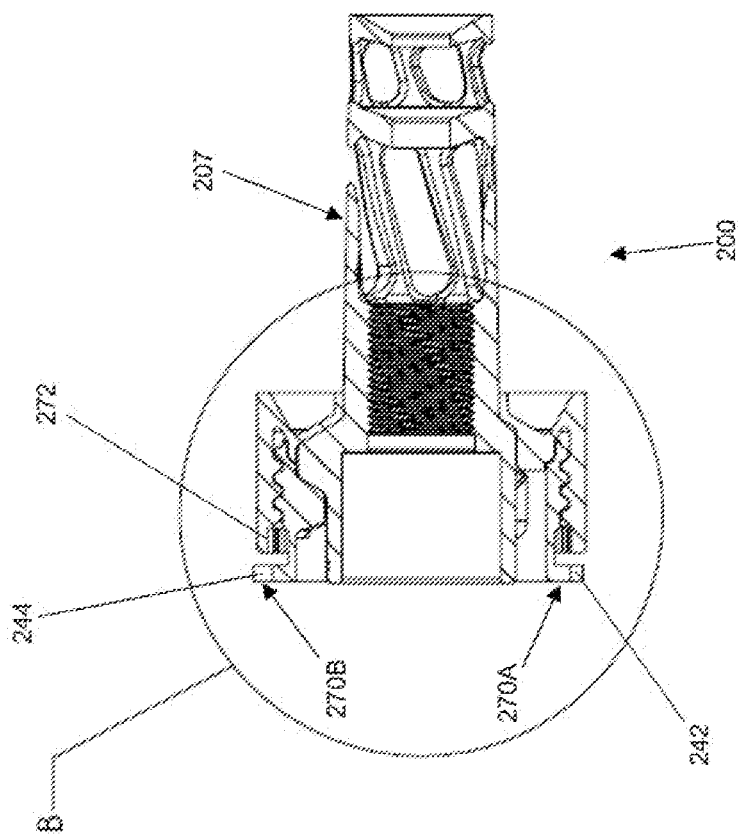
FIG. 33 is a view through section A-A shown in FIG. 32.
Figure 34:
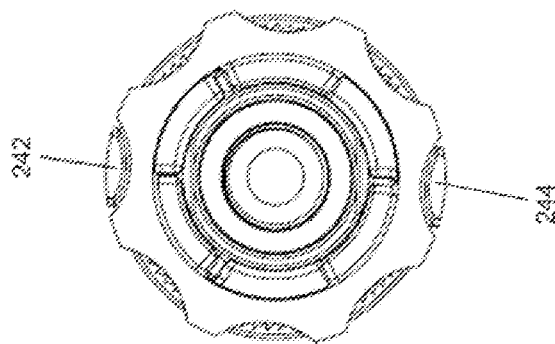
FIG. 34 is an end view of FIG. 32.
Figure 35:
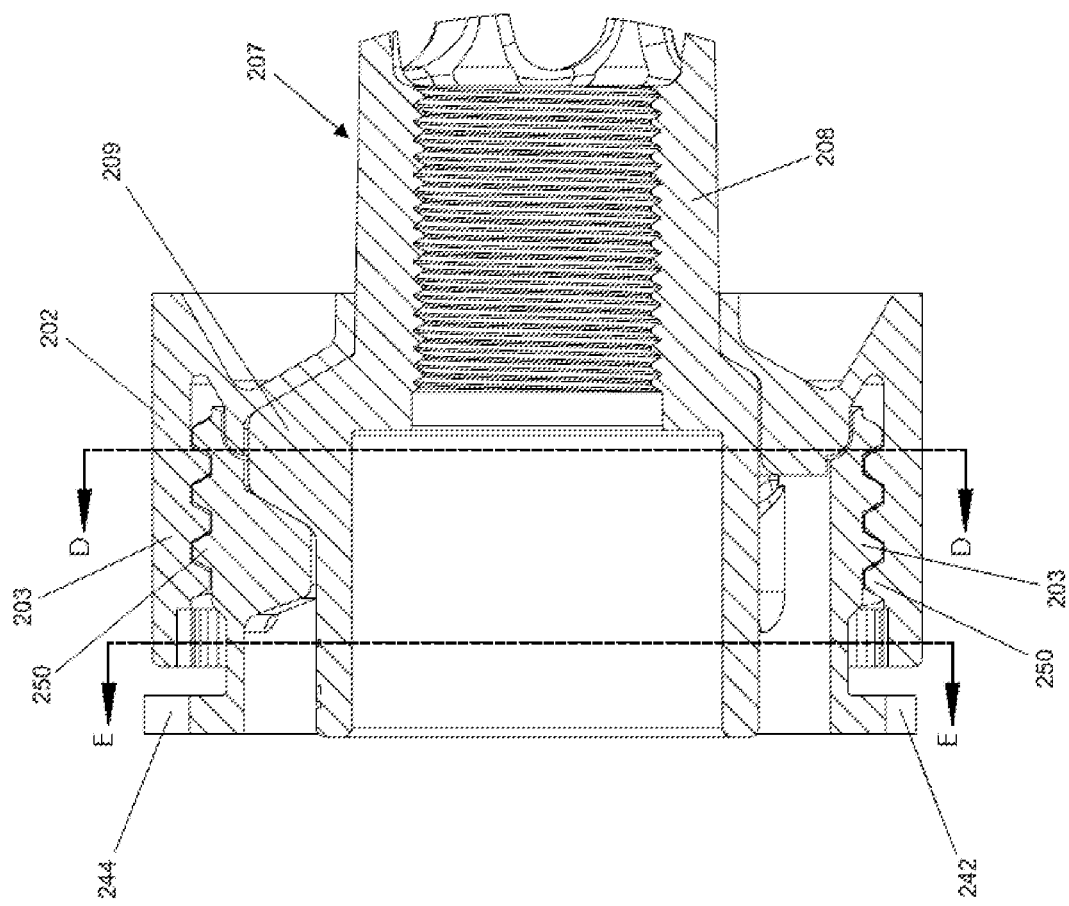
FIG. 35 is a close up view of detail B shown in FIG. 33.
Figure 36:
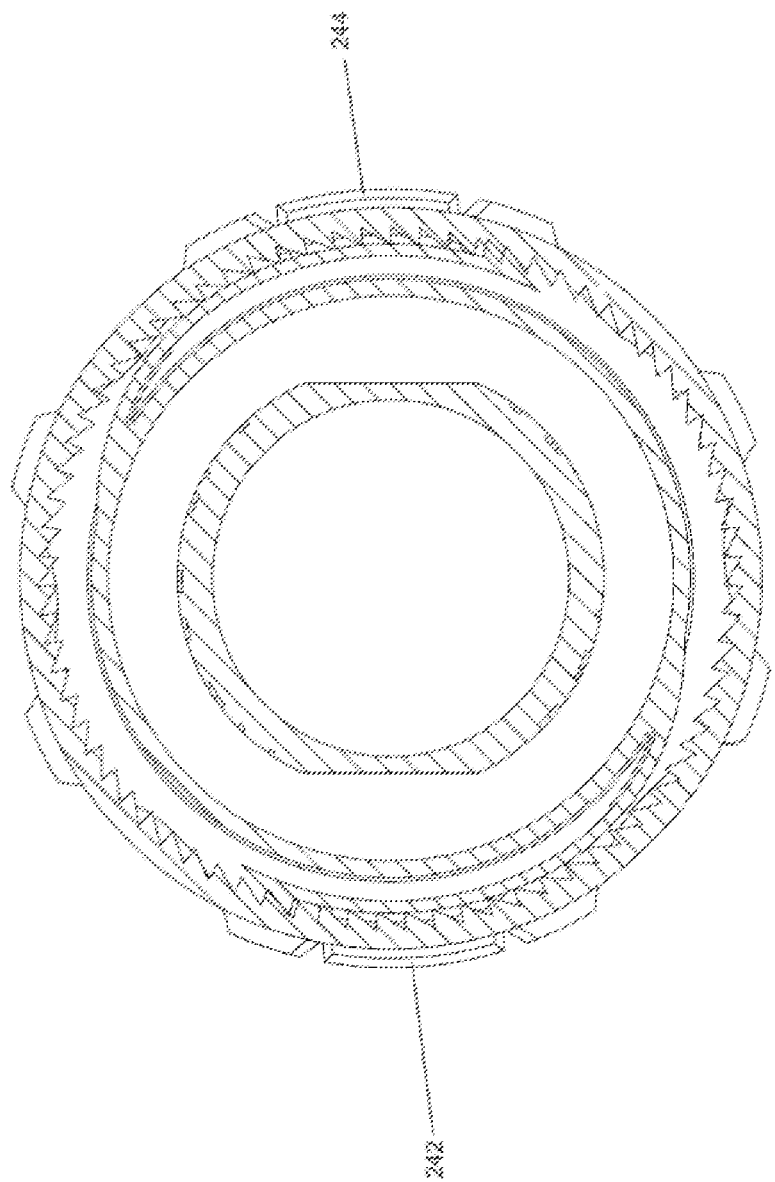
FIG. 36 is a view through section E-E shown in FIG. 33.
Figure 37:
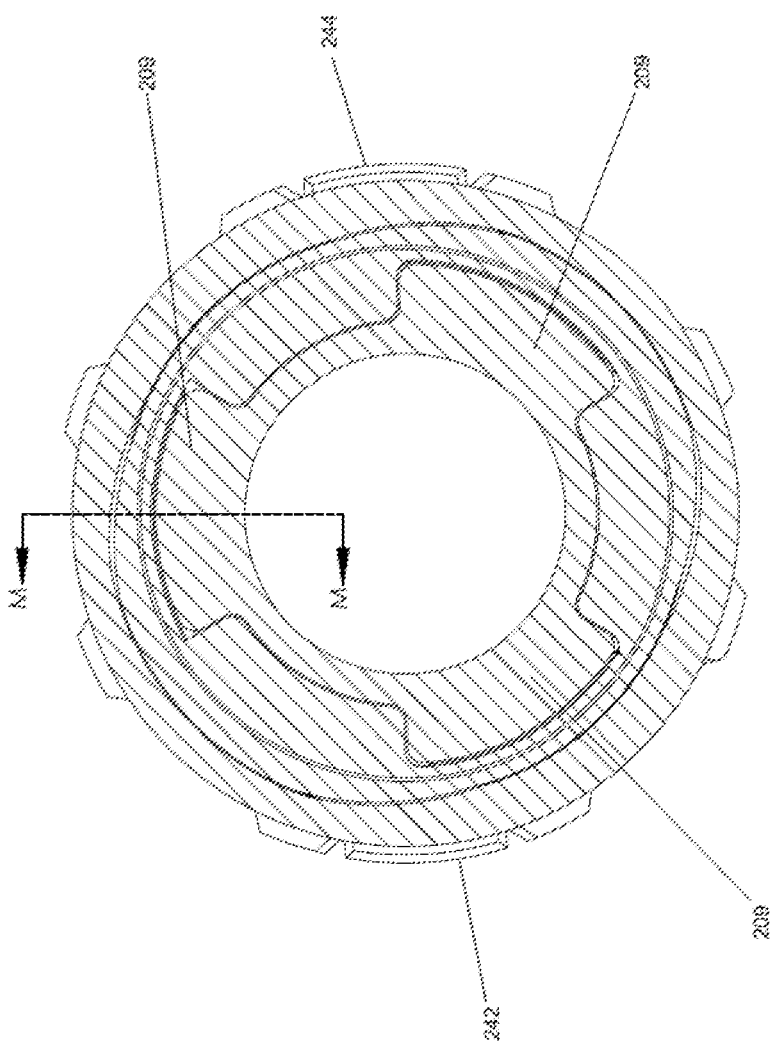
FIG. 37 is a view through section D-D shown in FIG. 33.

The suppressor (300) includes an internal screw thread (309) as is best seen in FIGS. 30 and 32. The screw thread (354) is configured to engage with a corresponding screw thread (356) on a locking nut (360).

A channel is defined by a channel wall (354) that extends from internal screw thread (354) towards an end (360) of suppressor (300).

Channel end wall (368) extends away from channel wall (364).

The channel end wall (368) includes a circular aperture (not labeled in the Figures). The circular aperture has a shape and size corresponding to the diameter of body (330) so that the body (330) can move through the aperture.

To assemble the Nielson decoupler (320), an absorber in the form of a compression spring (370) is provided. In use, the spring (370) at least partially absorbs the gas force against the baffles created on firing of the gun. The compression spring (372) is positioned around the body (330) to bear against a side of the protrusions (350).

The piston (320) is inserted through the opening, moved along the channel, and through the circular opening (not labeled) in the channel end wall (364).

The locking nut (380) is positioned about body (330) and rotated so that screw threads (356, 322) engage each other. This secures the piston (320) to the body (330).

This configuration is shown in FIG. 30 e.g. the spring (370) is not completely or substantially compressed. In other words, in this configuration the spring (370) can still be further compressed if sufficient force is applied thereto.

Referring now to FIGS. 27 & 30-32.

Figure 27:
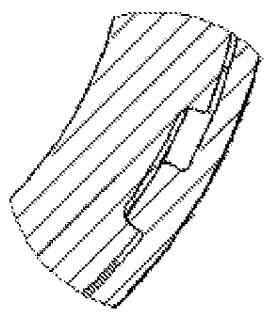
FIG. 27 is a close up view of detail U shown in FIG. 26.
Figure 28:
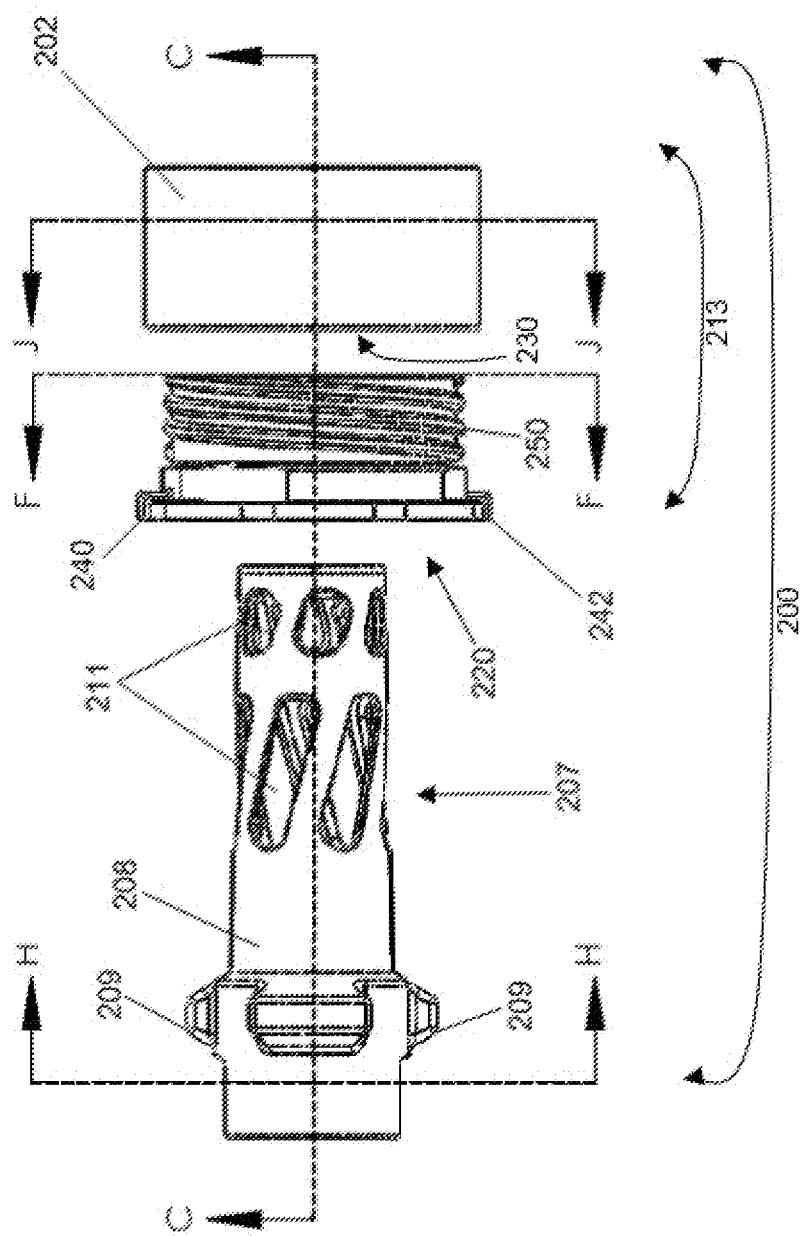
FIG. 28 is a side view of components of a connection system according to an embodiment of the invention.

FIGS. 27 and 30 show views of the suppressor (300) with the spring (370) in an unloaded (non-compressed) configuration. This is the normal configuration.

Figure 31:
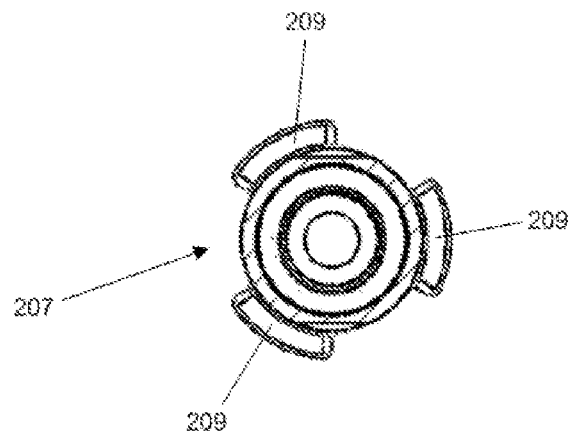
FIG. 31 is a view through section H-H shown in FIG. 28.

However, on firing of a gun (not shown) to which the suppressor (300) is secured, expansion of gases within the suppressor (300) provides an urging force to move the suppressor (300) in the direction shown by arrow X in FIGS. 31 and 32. The urging force causes an end (30) of suppressor (300) to move along the length of body (300). It should be noted that locking nut (360) moves at a corresponding rate to end (30). This is because the locking nut (300) is not fixedly attached to the body (330).

In-effect, channel (362) enables the separation between locking nut (360) and the protrusions (350) to be decreased. This compresses the spring (307) between the locking nut (360) and the protrusions (350). Therefore, the spring (370) can absorb gas forces imported to the suppressor (300) on firing of the gun (not shown).

The spring (370) provides an urging force to move suppressor in a direction opposite to arrow X shown in FIGS. 31 and 32.

The protrusions (350) provide an alignment function. That is, the protrusions (350) touch, and can slide along, an inner surface of channel wall (368) irrespective of the compression of spring (360).

The protrusions are also positioned with respect to the screw thread (350) to provide an alignment function. That is, the protrusions (350) will help to ensure that the suppressor body (300) does not dip or droop which would cause it to be misaligned with the piston (320) and thereby is substantially maintained in alignment with the gun barrel (not shown in the Figures).

Method of Manufacture

Different products according to the present invention can be manufactured using the same method. Accordingly, one method of manufacturing a product is described herein.

Figure 7:
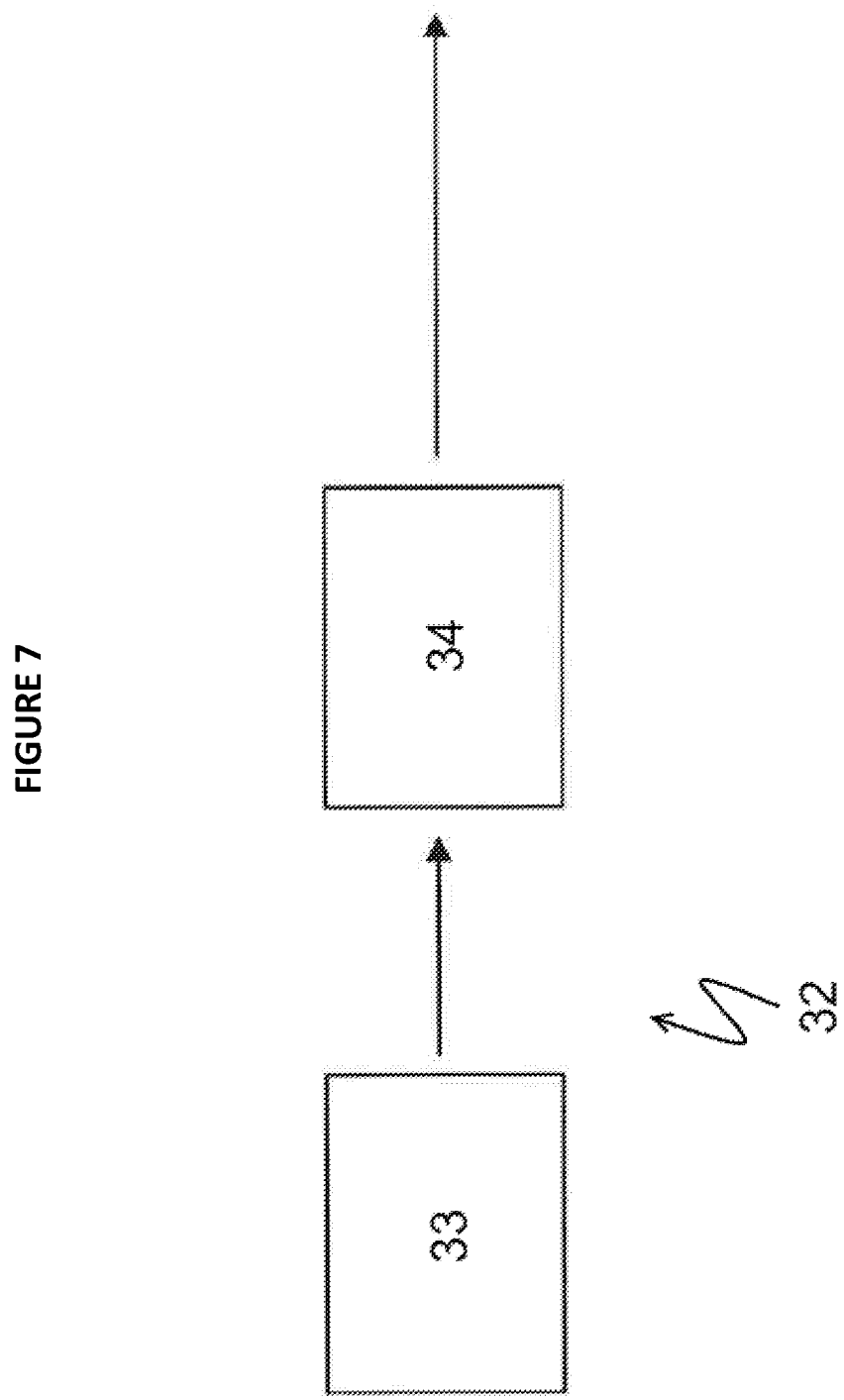
FIG. 7 is a view of an LMS system for use with the present invention.

The method is performed using an additive layering manufacturing system, the representative components of which is indicated as (32) are shown in FIG. 7.

The system (32) includes a computer programming apparatus (33) as should be known to one skilled in the art. The computer programming apparatus is programmed to perform any of all of the steps of the method described herein. In addition, the apparatus is programmed to, or may be configured to, performs steps in the method so as to manufacture the embodiments of the suppressors described herein.

The computer programming apparatus (33) is configured to communicate with a laser metal sintering ("LMS") apparatus (34).

Operation of the LMS apparatus (32) is as should be known to one skilled in the art, and therefore the specifics of the method are not reiterated here. However, parameters such as selection of the starter material, temperature required to achieve necessary fusing of layers of particles of starter material etc. are as known to one skilled in the art.

Figure 8:
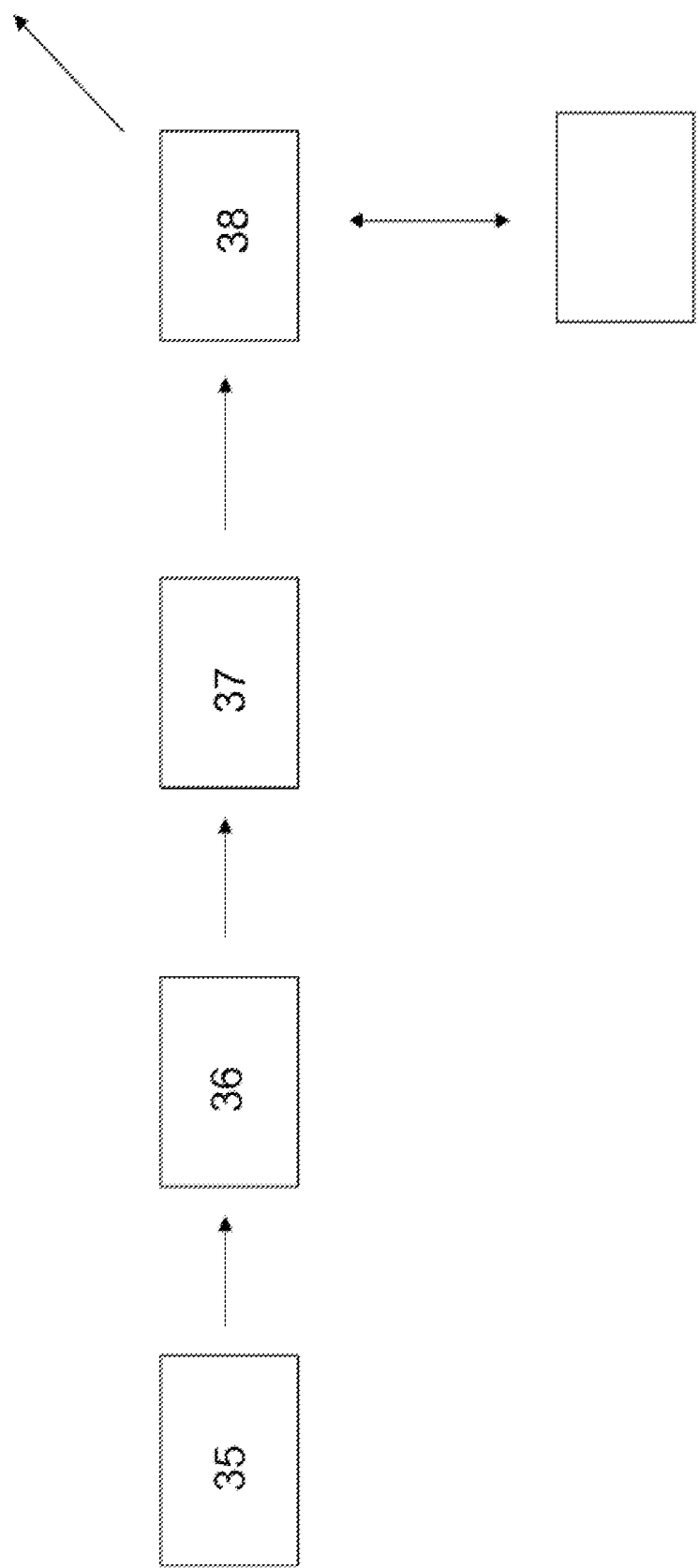
FIG. 8 is a flow chart showing the steps that can be used in a method of manufacturing a suppressor.

Referring now to FIG. 8 showing a schematic of the steps involved in manufacturing a product according to the present invention.

At step (35) an electronic model of a suppressor is created using a modelling package such as CAD Solid Works on computer programming apparatus (33).

Developing the CAD model involves the step of determining a build direction for the product. The build direction is an orientation for a product to be manufactured such as a suppressor with respect to a substrate in the LMS Apparatus (34). The build direction defines the order in which layers of the powdered material are deposited and sintered so as to form the product.

In a preferred embodiment, the build direction requires building a suppressor such as (1) from the second end wall (4).

Developing the model of a product to be manufactured involves the step of determining the angle between various components. For instance, in manufacturing a suppressor (1), a person would determine the angle between an underside of a baffle and a substantially horizontal plane (28).

In addition, internal structures inside a cavity in the product are determined. These will depend on the shape and configuration of the product to be produced. The features of the components are selected according to the relationships described herein so as to ensure that the product can be manufactured using the LMS apparatus.

At step (36) the CAD model is separated into a number of layers of a nominal thickness between 0.01 mm-0.03 mm.

The model and information on the layers is transmitted from the computer programming apparatus (33) in which the model is created to the LMS apparatus (34).

At step (37) a build substrate (not shown) in the Figures is provided in the LMS apparatus (34).

The substrate provides a surface on which the product can be manufactured.

At step (38) the LMS apparatus (34) applies a layer of a titanium oxide alloy in a powder form onto the substrate. A laser (not shown) forming part of the LMS apparatus (34) selectively applies a laser beam to portions of the layer of titanium oxide powder deposited on the substrate (not shown). This causes the laser to selectively heat the titanium oxide powder so as to fuse adjacent particles together. The laser heats a portion of the layered titanium oxide powder corresponding to a first layer of the model of the product generated at step (35). This forms a first sintered layer.

At step (39) a wiper (not shown in the Figures) forming part of the LMS apparatus (34) is used to apply another layer of titanium oxide powder on top of the first sintered layer. This corresponds to the second layer of the CAD model generated at step (36).

Steps (38 and 39) are repeated so as to substantially form the product.

The formed product can be removed from the LMS apparatus (34) and separated from the substrate (not shown).

Unsuccessful Suppressor Design

Figure 12:
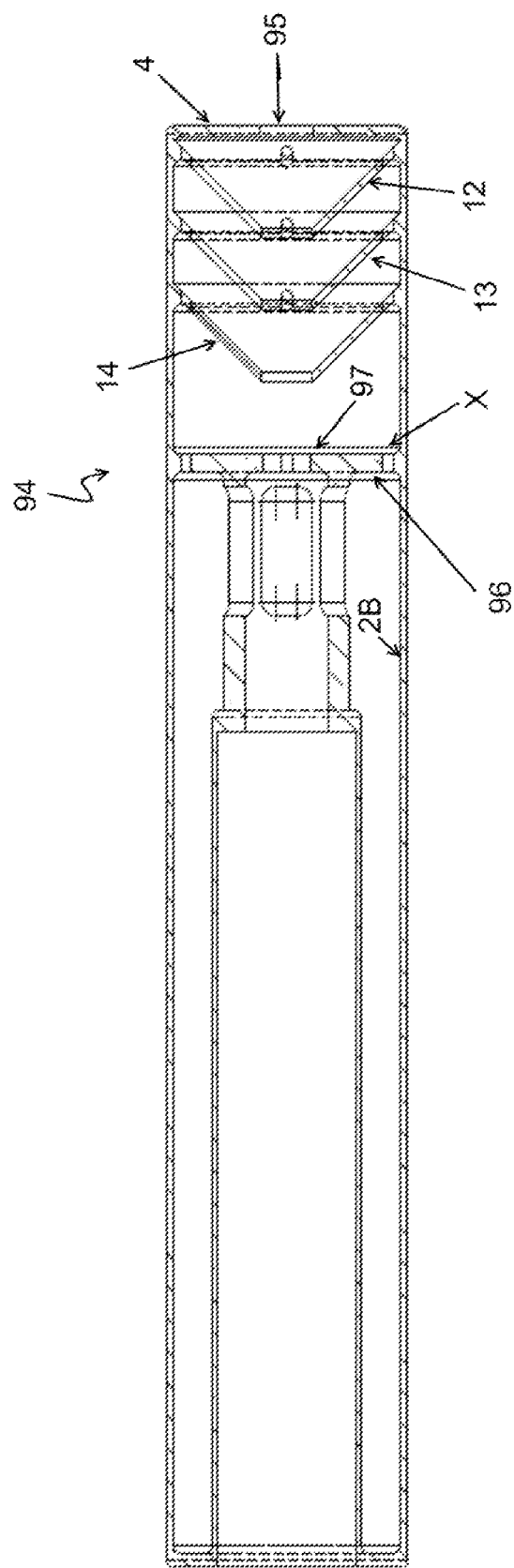
FIG. 12 is a side cross sectional view of a suppressor design that would not successfully build using LMS techniques.

Referring now to FIG. 12 showing a suppressor (94) that is unlikely to be successfully manufactured using LMS techniques.

The suppressor (94) is designed so that build direction indicated by arrow (95) in FIG. 12 starts from second end wall (4).

The baffles (12-14) would build successfully.

However, the suppressor (94) includes a shelf (96).

The angle (X) between an underside (97), of shelf (96) and an inner wall (2B) of the suppressor is substantially 90 degrees.

As a result, there is insufficient support for layers of the powdered feed material deposited through a manufacturing of the suppressor (94). As a result, the shelf (96) would not successfully build using an LMS technique.

In addition, the shelf (96) and baffle (14) integrally joined to the shelf (96), have different thicknesses. This is necessary to try to ensure that sufficient material is deposited to enable building of a subsequent baffle up from the shelf (96). However, the different thicknesses lead to thermal gradient throughout the components of the suppressor (94). Those thermal gradients are a result of parameters of the LMS apparatus (34) being fixed (invariable) during the manufacturer of a particular part. As a result, it is not possible to vary the amount of energy which laser of the LMS apparatus (34) imparts to different parts of the suppressor (94) during its manufacture. As a result, the parameters of the laser are often selected so as to provide an average suitable for use in preforming all parts of the suppressor any given part. However though, the average chosen will not work with all particular components, meaning that selection of design features is particularly important to successfully building of suppressors.

Aspects of the present invention have been described by way of example only and it should be appreciated that modifications and additions may be made thereto without departing from the scope thereof as defined in the appended claims.

While the invention has been described in connection with what are presently considered to be the most practical and preferred embodiments, it is to be understood that the invention is not to be limited to the disclosed embodiments. On the contrary, it is intended that the specification covers various modifications and equivalent arrangements included within the spirit and scope of the invention. Also, the various embodiments described above may be implemented in conjunction with other embodiments, e.g., aspects of one embodiment may be combined with aspects of another embodiment to realise yet other embodiments, Further, each independent feature or component of any given assembly may constitute an additional embodiment.

What I claim is:

1. A method of manufacturing at least a part of a suppressor, wherein the at least one part of the suppressor includes an end wall and at least one sidewall defining an outer housing with an internal cavity, an outlet in the end wall for a bullet to exit the suppressor, and at least one baffle within the cavity,
    wherein the method comprises manufacturing the part of the suppressor using selective metal melting by:
    a. depositing a starter material onto a substrate;
    b. melting the starter material to form a layer of the part of the suppressor; and
    c. repeating steps (a) and (b) in a build direction parallel to the side wall of the outer housing so as to form the outer housing and the at least one baffle within the cavity, with the outer housing and the at least one baffle monolithically formed together in a monocoque structure.

2. The method as claimed in claim 1, wherein step c includes forming the at least one baffle within the cavity monolithically formed with an inner surface of the at least one sidewall of the outer housing.

3. The method as claimed in claim 2, wherein the method forms the at least one baffle monolithically formed with the inner surface of the at least one side wall of the outer housing substantially about an inner circumference of the inner surface of the at least one sidewall.

4. The method as claimed in claim 1, wherein steps a-c include forming an aperture in the at least one baffle and the outlet in the end wall such that the aperture and outlet are aligned with each other and define a pathway for the bullet to travel through the suppressor.

5. The method as claimed in claim 1, including a step of forming a fastener integrally to the part of the suppressor to attach the suppressor to an end of a barrel of a firearm.

6. The method as claimed in claim 1, wherein the step of forming the baffle involves monolithically forming the baffle with the at least one side wall of the outer housing such that an internal angle between an internal surface of the at least one side wall and the at least one baffle is in the range of 10 to 85 degrees.

7. The method as claimed in claim 1, wherein steps a-c form an outer side wall and an inner side wall within the outer side wall so as to create the outer housing with a double wall structure and with the at least one baffle monolithically formed with an inner surface of the inner side wall by an integral join.

8. The method as claimed in claim 1, including a step of forming a fastener half of a quick connect in the suppressor.

9. The method as claimed in claim 8, wherein the fastener half is positioned in an overlap channel formed in the suppressor.

10. The method as claimed in claim 1, including a step of forming ridges on an outer surface of the at least one side wall of the outer housing.

11. The method as claimed in claim 1, including the step of selecting a feed material from the list of: titanium or a titanium alloys, pure titanium (TI), TI6A14V, NITI(45-55NI), TI6A17 MB, TI5A12.5FE, TI3NB13ZR, TI12MO6ZR2FE, NITICU alloys, TI15MO, TI35NB7ZR, 5TA, TI3A1 2.5V, or Inconel 718.

* * * * *